(12) United States Patent
Kirsch

(10) Patent No.: US 12,443,749 B2
(45) Date of Patent: **\*Oct. 14, 2025**

(54) METHOD AND SYSTEM FOR FULLY ENCRYPTED REPOSITORY

(71) Applicant: Neustar, Inc., Reston, VA (US)

(72) Inventor: Steven Todd Kirsch, Los Altos Hills, CA (US)

(73) Assignee: NEUSTAR, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,127

(22) Filed: Apr. 30, 2024

(65) Prior Publication Data

US 2025/0036801 A1 Jan. 30, 2025

Related U.S. Application Data

(63) Continuation of application No. 14/321,495, filed on Jul. 1, 2014, now Pat. No. 11,972,013, which is a
(Continued)

(51) Int. Cl.
*G06F 21/62* (2013.01)
*G06F 21/31* (2013.01)
(Continued)

(52) U.S. Cl.
CPC .......... *G06F 21/6245* (2013.01); *G06F 21/31* (2013.01); *G06Q 20/0855* (2013.01);
(Continued)

(58) Field of Classification Search
CPC . G06F 21/6245; G06F 21/31; G06Q 20/0855; G06Q 20/12; G06Q 20/382;
(Continued)

(56) References Cited

U.S. PATENT DOCUMENTS

| | | |
|---|---|---|
| 5,715,314 A | 2/1998 | Payne et al. |
| 6,209,091 B1 | 3/2001 | Sudia et al. |

(Continued)

FOREIGN PATENT DOCUMENTS

| | | |
|---|---|---|
| EP | 0683582 A1 | 11/1995 |
| KR | 20130083619 A | 7/2013 |

OTHER PUBLICATIONS

Abe, T. et al. "Implementing Identity Provider on Mobile Phone" 2007, ACM, pp. 46-52.

(Continued)

*Primary Examiner* — Yonas A Bayou
(74) *Attorney, Agent, or Firm* — Sterne, Kessler, Goldstein & Fox P.L.L.C.

(57) ABSTRACT

According to an embodiment of the present invention, a method for using information in conjunction with a data repository includes encrypting data associated with the information with an encryption key, sending at least the encrypted data to the data repository, and possibly deleting the information. The method also includes receiving a request for the information from a remote device, and sending a request for the encrypted data to the data repository. The method further includes receiving the encrypted data from the data repository, decrypting the encrypted data using the encryption key, and sending the information to the remote device.

20 Claims, 18 Drawing Sheets

Related U.S. Application Data continuation of application No. 13/524,432, filed on Jun. 15, 2012, now Pat. No. 8,769,304.

(60) Provisional application No. 61/497,865, filed on Jun. 16, 2011.

(51) Int. Cl.
  *G06Q 20/08* (2012.01)
  *G06Q 20/12* (2012.01)
  *G06Q 20/38* (2012.01)
  *G06Q 20/40* (2012.01)
  *G06Q 30/0601* (2023.01)
  *G06Q 40/02* (2023.01)
  *H04L 9/40* (2022.01)

(52) U.S. Cl.
  CPC ............ *G06Q 20/12* (2013.01); *G06Q 20/382* (2013.01); *G06Q 20/38215* (2013.01); *G06Q 20/3829* (2013.01); *G06Q 20/401* (2013.01); *G06Q 20/405* (2013.01); *G06Q 30/0609* (2013.01); *G06Q 40/02* (2013.01); *H04L 63/0435* (2013.01); *H04L 63/061* (2013.01); *H04L 63/08* (2013.01); *H04L 63/105* (2013.01); *H04L 63/205* (2013.01)

(58) Field of Classification Search
  CPC ......... G06Q 20/38215; G06Q 20/3829; G06Q 20/401; G06Q 20/405; G06Q 30/0609; G06Q 40/02; H04L 63/0435; H04L 63/061; H04L 63/08; H04L 63/105; H04L 63/205
  See application file for complete search history.

(56) References Cited

U.S. PATENT DOCUMENTS

| | | |
|---|---|---|
| 6,263,446 B1 | 7/2001 | Kausik et al. |
| 6,381,331 B1 | 4/2002 | Kato |
| 6,826,690 B1 | 11/2004 | Hind et al. |
| 6,850,951 B1 | 2/2005 | Davison |
| 7,266,695 B2 | 9/2007 | Nakayama |
| 7,320,073 B2 | 1/2008 | Zissimopoulos et al. |
| 7,428,750 B1 | 9/2008 | Dunn et al. |
| 7,522,723 B1 | 4/2009 | Shaik |
| 8,023,647 B2 | 9/2011 | Shaik |
| 8,301,745 B1* | 10/2012 | Wohlgemuth .... G06F 15/17375 709/223 |
| 8,401,968 B1* | 3/2013 | Schattauer ............ G06Q 30/06 705/37 |
| 8,769,304 B2 | 7/2014 | Kirsch |
| 9,177,005 B2 | 11/2015 | Mehta et al. |
| 9,197,673 B1 | 11/2015 | Gaddy et al. |
| 9,203,819 B2 | 12/2015 | Fenton et al. |
| 9,215,223 B2 | 12/2015 | Kirsch |
| 9,344,413 B2 | 5/2016 | Kirsch |
| 2001/0024502 A1 | 9/2001 | Ohkuma et al. |
| 2002/0076055 A1 | 6/2002 | Filipi-Martin et al. |
| 2002/0194163 A1 | 12/2002 | Hopeman et al. |
| 2003/0065947 A1* | 4/2003 | Song ........................ H04L 63/08 713/150 |
| 2003/0147534 A1 | 8/2003 | Ablay et al. |
| 2003/0177400 A1 | 9/2003 | Raley et al. |
| 2003/0204511 A1 | 10/2003 | Brundage et al. |
| 2004/0062400 A1 | 4/2004 | Sovio et al. |
| 2004/0088587 A1 | 5/2004 | Ramaswamy et al. |
| 2004/0205342 A1 | 10/2004 | Roegner |
| 2005/0010447 A1 | 1/2005 | Miyasaka et al. |
| 2005/0044402 A1 | 2/2005 | Libin et al. |
| 2005/0097320 A1* | 5/2005 | Golan ................ G06Q 20/4014 713/166 |
| 2005/0220080 A1 | 10/2005 | Ronkainen et al. |
| 2006/0005020 A1* | 1/2006 | Hardt .................. H04L 63/1416 713/166 |
| 2006/0080534 A1 | 4/2006 | Yeap et al. |
| 2006/0083187 A1 | 4/2006 | Dekel |
| 2006/0090166 A1* | 4/2006 | Dhara ...................... G06F 9/451 719/318 |
| 2006/0129817 A1 | 6/2006 | Borneman et al. |
| 2006/0131385 A1* | 6/2006 | Kim ...................... G06Q 20/425 235/379 |
| 2006/0206709 A1* | 9/2006 | Labrou .................. G06Q 20/18 713/167 |
| 2006/0224508 A1 | 10/2006 | Fietz et al. |
| 2006/0236095 A1 | 10/2006 | Smith et al. |
| 2007/0061263 A1 | 3/2007 | Carter et al. |
| 2007/0228148 A1 | 10/2007 | Rable |
| 2008/0016232 A1 | 1/2008 | Yared et al. |
| 2008/0028453 A1 | 1/2008 | Nguyen et al. |
| 2008/0046987 A1 | 2/2008 | Spector |
| 2008/0089520 A1 | 4/2008 | Kessler |
| 2008/0141313 A1 | 6/2008 | Kato et al. |
| 2008/0189778 A1 | 8/2008 | Rowley |
| 2008/0222711 A1 | 9/2008 | Michaelis |
| 2008/0250248 A1 | 10/2008 | Lieber |
| 2009/0037994 A1 | 2/2009 | Buss |
| 2009/0080408 A1 | 3/2009 | Natoli et al. |
| 2009/0089625 A1 | 4/2009 | Kannappan et al. |
| 2009/0157799 A1 | 6/2009 | Sukumaran et al. |
| 2009/0249014 A1 | 10/2009 | Obereiner et al. |
| 2009/0249497 A1 | 10/2009 | Fitzgerald et al. |
| 2009/0260064 A1 | 10/2009 | McDowell et al. |
| 2010/0077457 A1 | 3/2010 | Xu et al. |
| 2010/0100945 A1 | 4/2010 | Ozzie et al. |
| 2010/0100950 A1 | 4/2010 | Roberts |
| 2010/0161969 A1 | 6/2010 | Grebovich et al. |
| 2010/0174439 A1 | 7/2010 | Petricoin, Jr. et al. |
| 2010/0182283 A1 | 7/2010 | Sip |
| 2010/0210240 A1 | 8/2010 | Mahaffey et al. |
| 2010/0275009 A1 | 10/2010 | Canrad et al. |
| 2010/0306107 A1 | 12/2010 | Nahari |
| 2010/0316217 A1 | 12/2010 | Gammel et al. |
| 2011/0067095 A1 | 3/2011 | Leicher et al. |
| 2011/0078439 A1 | 3/2011 | Mao et al. |
| 2011/0179475 A1 | 7/2011 | Foell |
| 2011/0222466 A1* | 9/2011 | Pance .................. H04Q 3/0029 370/316 |
| 2011/0246765 A1 | 10/2011 | Schibuk |
| 2012/0050455 A1 | 3/2012 | Santamaria et al. |
| 2012/0124379 A1 | 5/2012 | Teranishi |
| 2012/0155637 A1 | 6/2012 | Lambert et al. |
| 2012/0158725 A1 | 6/2012 | Molloy et al. |
| 2012/0233685 A1 | 9/2012 | Palanigounder et al. |
| 2012/0265631 A1 | 10/2012 | Cronic et al. |
| 2012/0324076 A1 | 12/2012 | Zerr et al. |
| 2012/0331296 A1 | 12/2012 | Levin et al. |
| 2013/0198078 A1 | 8/2013 | Kirsch |
| 2013/0198516 A1 | 8/2013 | Fenton et al. |
| 2013/0198598 A1 | 8/2013 | Kirsch |
| 2013/0205136 A1 | 8/2013 | Kirsch |
| 2013/0246272 A1 | 9/2013 | Kirsch |
| 2013/0246280 A1 | 9/2013 | Kirsch |
| 2014/0344904 A1 | 11/2014 | Venkataramani et al. |
| 2014/0351596 A1 | 11/2014 | Chan |
| 2015/0089300 A1* | 3/2015 | Tejerina ............ G06F 11/3476 714/45 |
| 2015/0134511 A1* | 5/2015 | Ghosh .................. G06Q 20/227 705/39 |
| 2015/0321557 A1 | 11/2015 | Kim et al. |
| 2016/0241509 A1 | 8/2016 | Akcin |
| 2016/0261413 A1 | 9/2016 | Kirsch |
| 2017/0324564 A1 | 11/2017 | Knopf |
| 2018/0013569 A1 | 1/2018 | Knopf |
| 2018/0013570 A1 | 1/2018 | Knopf |
| 2018/0013786 A1 | 1/2018 | Knopf |
| 2018/0013824 A1 | 1/2018 | Knopf |
| 2018/0131665 A1 | 5/2018 | Joffe et al. |

(56) References Cited

OTHER PUBLICATIONS

Balasubramaniam, S. et al. "Identiy Management and its Impact on Federation in a System-of-Systems Context" Mar. 23-26, 2009, IEEE, pp. 179-182.

Beasley, J. et al. "Virtual Bluetooth Devices and Means of Extending Pairing and Bonding in a Bluetooth Network" 2002, IEEE, vol. 4, pp. 2087-2089.

Chakchai So- n et al., "Virtual D: A Technique for Mobility, MultiHoming, and Location Privacy in Next Generation Wireless Networks", Jan. 9-12, 2010, IEEE, pp. 1-5.

Chen, Liqun et al., "Multiple Trusted Authorities in Identifier Based Cryptography from Pairings on Elliptic Curves," Mar. 19, 2003, HP, pp. 1-26.

Jansen, Wayne et al., "Guidelines on Cell Phone and PDA Security," Oct. 2008, NIST, pp. 1-52.

Kholmatov, A. et al. "Identify authentication using improved online signature verification method" ScienceDirect, Nov. 2005, vol. 26, Issue 15, pp. 2400-2408.

Masmoudi, K. et al. "Building identity-based security associations for provider-provisionial virtual private networks," Dec. 2008, Springer, vol. 39, Issue 3, pp. 215-222.

Mayrhofer, Rene et al., "Shake Well Before Use: Intuitive and Secure Pairing of Mobile Devices," Feb. 27, 2009, IEEE, vol. 8, Issue 6, pp. 792-806.

Nguyen, Lang et al., "Secure Authorization, Access Control and Data Integrity in Bluetooth," 2002, IEEE, pp. 428-433.

Novotny, J. et al. "An Online Credential Repository for the Grid: MyProxy" IEEE, 2001, pp. 104-111.

Squicciarini, A. et al. "Access Control Strategies for Virtualized Environments in Grid Computing Systems" Mar. 21-23, 2007, IEEE, pp. 48-54.

International Search Report and Written Opinion mailed Sep. 18, 2012 for International Patent Application No. PCT/US2012/042743, 19 pages.

International Search Report and Written Opinion mailed Mar. 29, 2013 for International Patent Application No. PCT/US2013/022207, 13 pages.

International Search Report and written Opinion mailed Jul. 25, 2017 from the U.S. Search Authority for PCT/US17/31438, 8 pages.

International Search Report and Written Opinion mailed May 30, 2018 from the U.S.International Search Authority for PCT/US18/21877, 8 pages.

\* cited by examiner

METHOD AND SYSTEM FOR FULLY ENCRYPTED REPOSITORY

CROSS-REFERENCES TO RELATED APPLICATIONS

This application is a continuation of U.S. patent application Ser. No. 14/321,495, filed Jul. 1, 2014, entitled "Method and System for Fully Encrypted Repository", which is a continuation of U.S. patent application Ser. No. 13/524,432, filed Jun. 15, 2012, entitled "Method and System for Fully Encrypted Repository", which claims priority to U.S. Provisional Patent Application No. 61/497,865, filed on Jun. 16, 2011, entitled "Secure Transfer of Sensitive Data". Each of the above-referenced patent applications is incorporated by reference herein.

The following two regular U.S. patent applications were filed concurrently with parent U.S. patent application Ser. No. 13/524,432, and the entire disclosure of the following two applications is incorporated by reference into this application for all purposes:

Application Ser. No. 13/524,748, filed Jun. 15, 2012, entitled "Method and System for Determining Authentication Levels in Transactions";

Application Ser. No. 13/524,463, filed Jun. 15, 2012, entitled "Method and System for Delayed Authorization of Online Transactions".

BACKGROUND OF THE INVENTION

As many everyday transactions move to an online environment, a large amount of personal information must be sent over the Internet. Many experts consider the insecurity of online identities to be the most important problem to be solved on the Internet today. Users of social networks, online banking, e-commerce, online transactions, and/or email are in constant danger of phishing, malware, and key logging attacks, as well as massive centralized data breaches that expose users' passwords and financial account information.

Despite the widespread use of transactions over the Internet, there is a need in the art for improved methods and systems to secure these transactions.

SUMMARY OF THE INVENTION

The present invention relates generally to protecting encrypted data. More specifically, the present invention relates to methods and systems for using a fully encrypted repository to store data. Merely by way of example, the invention has been applied to a method of storing and retrieving encrypted data from a fully encrypted repository for use in an online transaction. The methods and techniques can be applied to a variety of information and retail systems.

According to an embodiment of the present invention, a method for using information in conjunction with a data repository is provided. The method includes encrypting data associated with the information with an encryption key, sending at least the encrypted data to the data repository, and possibly deleting the information. The method also includes receiving a request for the information from a remote device, and sending a request for the encrypted data to the data repository. The method further includes receiving the encrypted data from the data repository, decrypting the encrypted data using the encryption key, and sending the information to the remote device.

According to another embodiment of the present invention, a system for protecting information is provided. The system includes a data repository configured to receive encrypted data, receive a first request for the encrypted data, and send the encrypted data in response to the first request. The system also includes a user module operating on a user device, configured to receive a second request for information from a remote device, and send the first request for the encrypted data to the data repository. The system is also configured to receive the encrypted data from the data repository, recover the information from the encrypted data, and send at least the information to the remote device.

According to an alternative embodiment of the present invention, an information protection system is provided. The information protection system includes a user device coupled to a network and including a data processor and a non-transitory computer-readable storage medium comprising a plurality of computer-readable instructions tangibly embodied on the computer-readable storage medium, which, when executed by a data processor, provide encrypted data protection. The plurality of instructions include instructions that cause the data processor to encrypt data associated with the information with an encryption key, to send at least the encrypted data to the data repository, and possibly to delete the information. The instructions also cause the data processor to receive a request for the information from a remote device, and to send a request for the encrypted data to the data repository. The instructions additionally cause the data processor to receive the encrypted data from the data repository, to decrypt the encrypted data using the encryption key, and to send the information to the remote device.

Numerous benefits are achieved by way of the present invention over conventional techniques. For example, embodiments of the present invention provide for storage of encrypted data and encryption keys at separate locations. Additionally, embodiments of the present invention allow users to securely store sensitive transaction data away from vulnerable personal devices. These and other embodiments along with many of its advantages and features are described in more detail in conjunction with the text below and attached figures.

DETAILED DESCRIPTION OF SPECIFIC EMBODIMENTS

Figure 1:
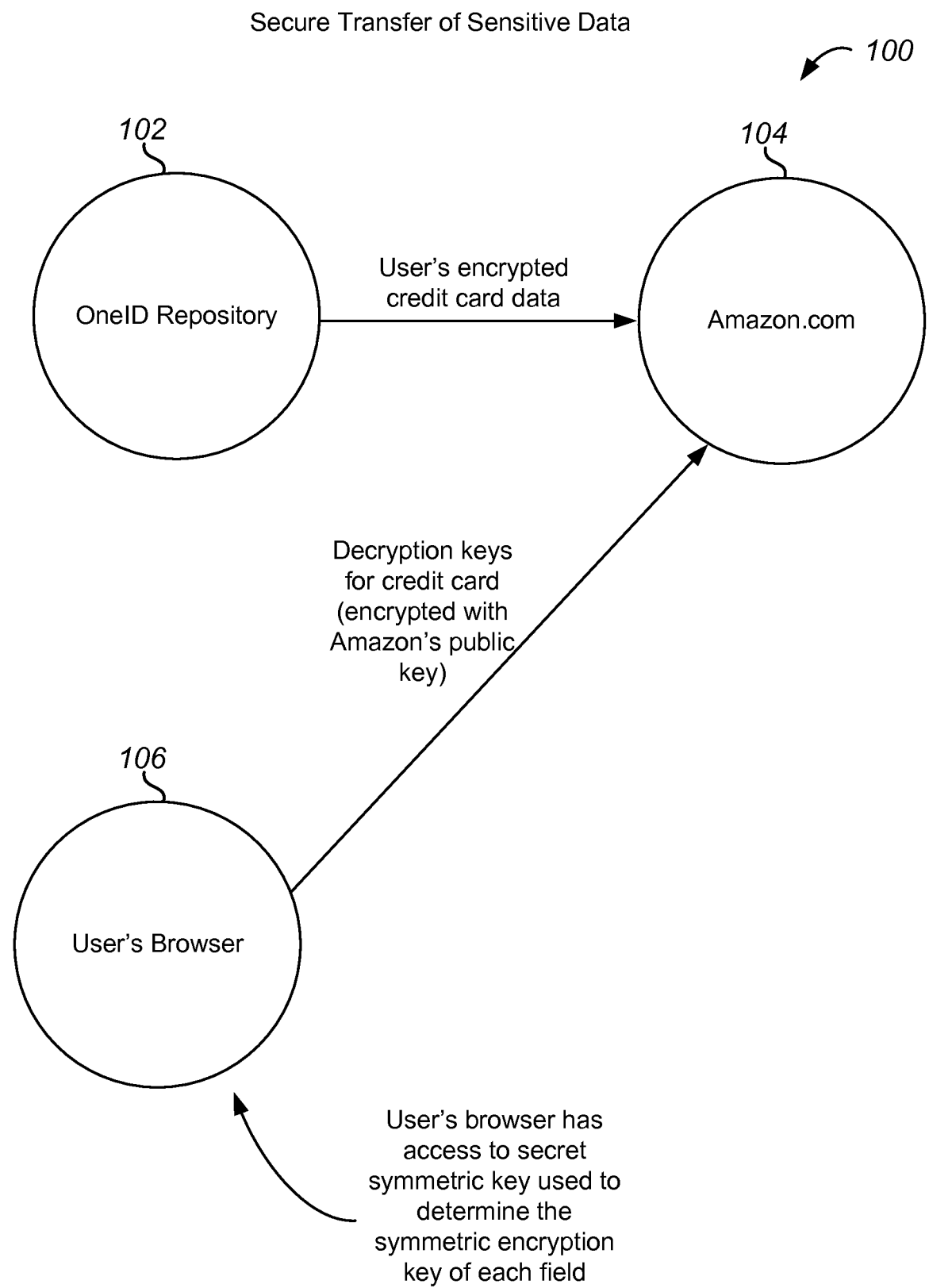
FIG. 1 is a simplified block diagram illustrating a transaction according to an embodiment of the present invention.

Embodiments of the present invention, which may be referred to as the OneID system or OneID, make identity management simple, secure, and convenient among other benefits, including achieving a vision of universal PKI. The OneID system makes people's lives easier and more secure many times in a typical day. The OneID system may impact how you do things including, without limitation:

1. logging into a website
2. filling out a form on-line or off-line
3. making a purchase or micropayment
4. paying a bill
5. voting in an election
6. checking into a hotel
7. renting a car
8. making an airline reservation
9. changing your email address
10. getting a replacement credit card number
11. changing your bank or being forced to change your account number
12. authenticating your identity over the phone to a bank or health care provider
13. renting skis
14. buying lift tickets
15. logging into websites from a public terminal
16. finding out who has access to your information
17. finding out which machine was compromised if the is a security breach
18. eliminating the need to know your loyalty numbers for airlines, hotels, cars, etc.
19. voting your stock certificates Frustrating tasks that used to take hours using current methods (such as completing the paperwork to switch health care providers for one employee) can be accomplished securely in seconds, and in most cases without typing because the OneID system leverages information that has previously been entered into the system. Among other benefits, the OneID system applies both to on-line and off-line tasks.

For example, if you have a OneID account, you can securely log in to a website, even a web site that you've never logged in to before, with a simple wave of your hand without typing. Similarly, you can make a purchase, pay a bill, or fill out a form the same way: without typing anything. This new method is not only more convenient for users, but it is also orders of magnitude safer than what people are using today (including people using those hard-to-use RSA tokens). OneID is secure against attackers, even if the attacker completely controls your machine.

OneID replaces the need to maintain hundreds of credentials for a single person (user names and passwords) with a single digital identity that is based on using two Elliptic Curve Cryptography (ECC-160) public key pairs (one pair for signing and authentication and the other pair for encryption). That digital identity is then used to authenticate to websites and other services both on-line and off-line. The authentication is peer-to-peer so there is no bottleneck or single point of failure. The use of two different keys (signing vs. encryption) is relatively rare today, yet it is core to the security and usability of some embodiments of the present invention. Accordingly, these key pairs are treated very differently in some embodiments.

OneID should not be confused with today's enterprise "single sign on" which are simply password managers often lacking the use of any public key pairs at all. Today, enterprise single signon is basically: enter your password and we'll log in to each system using the proper username and password for that machine or we'll use SAML or OpenID or OAUTH. That is perpetuating the past. Embodiments of the present invention transition people to the future: a paradigm shift to easy-to-use, state-of-the-art public key cryptography-based authentication that changes how people think about identity. Usernames and passwords will cease to exist (other than the username and PIN code to log into your OneID account which is so secure that you could publish it in the newspaper and not have to worry that your account will be compromised!).

An example of an off-line task would be a charitable donation request sent in a letter. By scanning the QR code in the letter, a recipient can complete a charitable donation in seconds, all securely, and without any typing.

Embodiments of the OneID system utilize a combination of novel hardware, software, services, standards and protocols that build upon existing standards to complete the ecosystem needed for simple identity management. It begins where SSL ends.

For example, today SSL certs exist, but it is not common for a public website to use SSL client side certs to perform mutual authentication. The procedure for getting a cert is cumbersome and insecure (the key pair is generated on the server, not on my machine, for example). The mechanism for backup tells me to store the keys on a CD that I could potentially lose. Once I have the key, and I figure out how to insert it in my system, there is no friendly way to determine which certificate to use for which purpose: the user is asked to select the proper key to use. Nor do most browsers allow for easy key switching where more than one person is using the system. It would be impossible to use this approach for a public computer, for example. The browser on the iPhone doesn't allow any certificates to be used at all; there is no support for client side SSL.

OneID protocols put in place the infrastructure to enable a core set of services and applications that third parties can leverage to build applications.

In an embodiment, using a small, reasonably priced (e.g., $10) OneID "magic" device attached to a user's keyboard, a user can securely log into any OneID-enabled website, just by waving his hand above the device. No typing is needed, no biometrics are used. No user names or passwords are used. OneID uses secure signature private keys that cannot be forged, extracted, or duplicated by anyone, including the owner or an attacker who has complete control of the user's hardware and software. OneID devices are all compatible, but have different forms, e.g., a card, a chip in a mobile phone or keyboard, data in a TPM, etc.

OneID allows you to log in to any OneID-enabled website from any mobile device, including iPhones and iPads. Jail breaking is not required because no browser plug-in is needed and no additional hardware is necessary (although phones without an NFC chip are more at risk). It is working on PCs, iPhones, and iPads today demonstrating that full public key, peer-to-peer mutual authentication can be done in Apple's Safari without jailbreaking the iPhone.

Logging in from public terminals is also secure; in fact, it is even more secure than using the industry standard RSA time-varying token method.

OneID provides a specific federated identity management (FIDM) system that is designed to secure and simplify the type of tasks listed below. It is a system that is NSTIC compliant and compatible and interoperable, but that offers features and functions that are a super set of the required functionality.

Key management (creation, distribution, revocation) is completely invisible to users. It all happens transparently under the covers.

The OneID architecture is simple, yet extremely powerful. Most operations are peer-to-peer with no bottleneck or single point of failure. It is designed to provide the utmost in security while actually making things vastly more convenient for the users. Users can determine the convenience/security tradeoff for each device at any time. Web sites that want to be OneID enabled need to do no more work than they did to add "Facebook Connect" to their site.

Because it is peer-to-peer, OneID works in closed environments where you are cut off from the Internet, e.g., a desktop application on your own computer can know it is really you even when you are off-line. There is no logging in to a central OneID server to get your credentials.

OneID is designed to operate in today's insecure environment. Our designs keep an attacker from performing any significant transaction even when that an attacker has complete control of the user's computer. User data is only available at endpoints. All private keys are generated and kept with endpoints. There are special provisions for preventing attacks, for discovering attacks, and for preventing any irreversible damage in the worst possible case.

Although some embodiments are described as particular designs, these examples are not intended to limit the scope of the present invention but to provide exemplary implementations.

In some implementations of OneID, actions that would have been performed by the client are done instead by a OneID web service (the "OneID service"), which is a component of some embodiments. This keeps the system modular and keeps the interfaces to the remote website exactly the same. In some embodiments, the split is different since a local client is not just moving the OneID server code to the client because things are done differently to be more secure (such as unique signature keys on every client). But as far as the remote site is concerned, it cannot tell whether the user has a client or not. But the remote site can determine by asking for a signature from the hardware whether OneID certified hardware and clients are installed so a security level can be known by the website.

The key is to assume endpoints are secure, since if they aren't all bets are off We notify on cell phone of any "key event" like logging into bank or releasing credit card info or completing a purchase if he downloads our cell phone OneID which shows him OTP numbers and also alerts he's set up like logging into bank account or gave someone a credit card.

All the strong operations here are with ECC (e.g., Curve K-163), AES-256, and SHA-2.

Here's how it works for login. We'll do a purchase and info request next as examples. Login button looks like: http://oneid.com/c?url="http://amazon.com/oneidlogin?session=1234" in an embodiment.

Where the url=xxxx is the URL to call which begins the PKI mutual authentication conversation and which at the end will tell me where to go. Note the session=1234 argument is passed to OneID so OneID can make use of it when it calls the site. What's nice is that OneID doesn't know about sessions at all, since it is the site that determines what info it needs to include in the URL so when the mutual auth (or signature if a purchase or info release if it is an info release request) is done in OneID, the site will be able to authenticate the session that is already cookied in the user's browser.

OneID is thus called by the user's browser with a command to do (c for call the URL in the url=arg). The cookie in the browser's request to oneid.com is a symmetric key to allow OneID to decode the user's signature private key. That way, OneID isn't storing anything of value to anyone, which is good since if someone broke into OneID, since we don't want to reveal everyone's private key.

Oneid.com then converses with the remote site to prove OneID has the user's credentials (i.e., we do a full mutual auth where the challenge is tied to the socket so it can't be reused anywhere and since the remote website has our public key, they can verify the signature on the OneID in an embodiment). At the end of the conversation, oneid.com then gets rid of the decoded private key in RAM, and responds to the user's initial request with a redirect to YYY where YYY is a URL provided by the site at the end of the conversation.

In the normal case where the user is logged in and says "keep me logged in" then our page never even displays and it hops right to the final jump page that the user's browser was told to load by the redirect response from the OneID server.

The security is such that OneID on its own CANNOT log into the website because it lacks sufficient info to decode the private keys that it has on file for the user so it cannot prove that it is the user. That extra info is provided in the cookie of the user's browser . . . basically a random number which is the symmetric key used to give to OneID to decode the user's private key and that was established when the device (in this case the specific browser) was registered with OneID.

In reality, each browser is holding a unique symmetric key (call them B1 for browser 1, B2 for Browser 2, etc.). And there is just one copy of the private keys, which are both encrypted using symmetric key A. So oneid.com is holding several items of the form aes(A using B1), aes(A using B2), etc. So the Browser key decrypts the key held at oneid.com for that browserID/OneID and then the result is used to decode the private keys. That way, we have a record of which device is doing what so in the event a key is compromised, we know which place it came from (which is better than conventional techniques).

Using embodiments of the present invention, if the PC is keystroke logged, the attacker can't use the username and password from his own PC. The attacker would have to also log the cookie in the SSL request. That's no problem for any reasonable attacker with access to the PC to do, but at least we give the user that extra small amount of safety (and we will let him know of previous logins, and email him when he logs in from a new place). But the big margin we get is that both our oneid.com service and our core repository has nothing of value since it is all encrypted. The extra margin on the user side was a free gift and of course is minimal extra security. If you want real security, get the client and use waveauth, which keeps the secrets under lock and key until you wave.

If we could use special hardware that might make key usage very secure on our servers, the big risk is on the PC . . . getting keystroke logged or an attacker piggybacking on an open session ID, all stuff that wave auth handles.

Note that we could use WaveAuth with the private keys in a cloud service. If waving my hand generated a signed statement from the WaveAuth device that I just waved (or tells OneID via a shared secret which is easier to implement than asymmetric crypto), then can be used to tell the OneID cloud service to allow a signing operation to take place.

Here are some of the cases that are satisfied by embodiments of the present invention:

1. New OneID user [0081] 2. How is the data like Name, Address, etc. stored. [0082] 3. if user changes his PIN [0083] 4. if user forgets his PIN [0084] 5. if user forgets his OneID username [0085] 6. user changes his OneID username [0086] 7. what happens if the cookie with sym key is lost [0087] 8. new device initialization: what if the user wants to use another browser on the PC or another PC [0088] 9. new account creation (you don't already have an account on the remote website) [0089] 10. old account association [0090] 11. how do we handle attackers who are trying every 4 digit PIN in the book [0091] 12. what security is there if someone types 4 digit PINs from your computer? [0092] 13. what happens if user notified his browser got compromised (changing the sym key) [0093] 14. how do we handle things if there is a web client and on an iphone so we don't have to change the URL on the website [0094] 15. how do you limit the number of OneIDs, e.g., attacker creates millions a day [0095] 16. what if an attacker changes the user's PIN The following definitions are used for ease of explanation and are not intended to limit the scope of the present invention:

Browser=user's browser

Client=the version of OneID that is a downloadable client that installs in the browser and provides REAL security and WaveAuth Website=remote website that user is trying to log in to Service=the OneID helper service that in conjunction with the browser looks like our OneID browser client to a website. It stores the signing and encryption key pairs. But these are both encrypted with a symmetric key so that an attacker breaking into the service gets nothing of value. This is not a secure system (since unencrypted data is present briefly), but a technique to enable people to use this without a client. If you want additional security, use the client.

Repository=the OneID secure repository where endpoints possessing the private encryption keys can access any of the info in the repository. Here data is extremely secure. At NO POINT is data ever unencrypted.

Info in the repository=data stored in the repository. The repository has stuff like the Name, Address, etc. as well as stuff dropped for others like ACL and decryption keys for each field group. It also has email:OneID # and username: OneID number (dual keyed) so you can help a user if he forgets stuff and provide resolution of OneID username-> UID for storing stuff since names can be reassigned but numbers are not.

For simplicity, OneID numbers start at 0 and increment from there. Other embodiments generate pseudo random 8 byte numbers and check for a duplicate before issuing.

Embodiments of the present invention utilize one or more of the following common ideas, although they are not required by the present invention.

There is one Username/Password to log you in. If you have a mobile device, you typically stay logged in and use a PIN code to unlock you phone for security. You can bookmark a page to the OneID website to log you out.

User accounts can have different key sizes. Free accounts generally get really small key sizes. Paid accounts can pick their key size (typically up to a limit).

In the ideal OneID world, each endpoint has secret things that are written once and cannot be used, and reset, but not read out:

1. LSK: the symmetric key that is created when you login with your Username/password on a DeviceID. It is a 128 bit hash of the 3 values in some embodiments. This symmetric key is used to decrypt your private keys (encryption and signature). Therefore, your private keys are going to be different on disk on all devices.

2. FSK: the Field Symmetric Key used for encrypting/ decrypting both fieldname and value data in the repository (shared among all endpoints). This is separate from the LSK. The fieldname/value data for a user will be identical on all devices. It is all encrypted.

3. PrEK: the Private encryption key (shared among all endpoints)

4. PrSK: the Private Signature Key (unique to each endpoint). This is ideally never revealed to anyone and stays inside the device. The other two keys are sent encrypted with the public signature key so that can be sent securely to a new device. This keeps all three secrets unexposed in the ideal world where all endpoints are secure. This key will often expire, e.g., I log into a public terminal, I can provide my username, password, OTP (to prevent keylogging and to tell OneID to download me all the data which I promptly encrypt using username/password/deviceID before writing to disk so that the private keys on disk are unique to this machine and not stored in the clear even though my username/password/ deviceID hash is stored on disk so I don't have to keep logging in) and I get a public key signed by OneID with an expiration date and time. I also download the data from the OneID repository and all of that I can decrypt locally. OneID is programmed to give me all the fields in the repository if I have the OTP that matches the OTP lists in the repository.

5. The PIN code for accessing the card (user typically picks any length he wants)

6. His login password (either PIN or password can be used to login depending on the device)

7. OTP list: the OTPs are of length set by the user. You can have 10 OTP devices. The first digit of the OTP is the device number that generated it so we can look at the right list when verifying OTPs. The OTP list is maintained at the OneID server which is trained to allow all fields to be sent to the recipient and trained to sign a signature key for that OneID if you provide this OTP and tell it how long to make the signature valid for). The user can use the secure hash (username/password) to decrypt the PReK key on the server.

It should be noted that for really "rare" events like authorizing an OTP app on a cell phone (that app can then burn an OTP to get more OTPs), we use both PIN and password reasoning that an attacker will likely be able to get one but not both.

The endpoints also have the following non-secrets stored in the clear:
1. the OneID UID
2. the OneID verified email addresses
3. the OneID login aliases (e.g., primary email, number, shortname)
4. two public keys (for the 2 secret keys), so, for example, we can give the smartcard the PIN code for the OneID by encrypting it with the encryption public key.
5. A certificate that the PuSK is associated with the OneID. The public signature key certificate is signed by OneID and includes 1) the expiration date, 2) the deviceName that it is stored on, e.g., "Steve's laptop", 3) the OneID UID that it is associated with. That way if your private key gets exposed, you'll know which PC had the problem. So each device you have has a unique PuSK. When it issues that certificate, the reason for including the device name is that some sites may limit which signature key(s) can be used, e.g., for your bank, you may tell them to ONLY accept signatures from your "Home PC" and the CIA may only allow logins from a device that they have preapproved, not from any of your devices.
6. A certification of email addresses associated with the OneID. This isn't in the OneID certificate for privacy reasons. This certificate is self-signed by the OneID (any of the ones you own) and stored in the repository in plain sight (not as an user data field) so it can be used at login time to associate your OneID with email addresses owned by you in case the site doesn't recognize your OneID, i.e., the first time ever you login with your OneID to a site, you'll need to present this to link your legacy account to your OneID.
7. a statement "the public signature key XXXXX belongs to OneID UID #23432—signed OneID"
8. a statement "OneID UID #23432432 controls the following email addresses X, Y, Z—signed OneID" (used for associating accounts). A given email address can only be assigned to a single OneID so an attacker can't read your email and pretend to be you.
9. eFieldname: eFieldValue, version which is a local copy of the info in the repository so that if repository is down, everything still works. It is decrypted using FSK when required. Endpoints rarely give out info, and before they do, they check with the repository to make sure they are giving out the latest data. They basically send in the eFieldName and FieldVersion and get the updated eFieldValue.

The biggest objective is we want any data stored on disk in the service to be immune from a break-in (we already know it is vulnerable in RAM since without a smartcard and client, this is typically the best you can do). Second, we want to make logins reasonably secure against password guessing and phishing.

For each OneID, the service permanently stores 1) the encryption key pair (encrypted with FSK), 2) the signing key pair (encrypted with FSK). The FSK is stored in the browser so that the service is safe relatively against attack (the stuff is decrypted during use). These key pairs are keyed by his OneID number. Only the 2 private keys are encrypted (signing and encryption).

The browser gets cookied by oneid.com with three cookies:
1. SessionID: 234nmasdHUIDb$% which expires whenever the user specified when he logged in (and removed when the user logs out of OneID). This value is base64. It is an AES 256 key and it was randomly chosen when the user logged in. It is basically the decryption key to be able to decrypt an EK that can decrypt the private keys.
2. DeviceID: 3kdfalUJkjjL (this is permanent and done once; a random value assigned to the device which is basically a browser in the clientless case, so two browsers will have different deviceIDs)
3. the currently logged in Oneid: kksd823nndf (the UID in base64)

So at the service, there is a key of OneID-DeviceID whose value is a number, the EK "encrypted key". When the user comes in with a request, the Session ID is used as a symmetric decryption key to unencrypt that the EK. The result is a symmetric key that is capable of unencrypting the two private keys so they can be used. So that means that without someone logged in and in the middle of an http request, there is no way to use those private keys. That way, the original login credentials are long gone, essentially replaced with a unique SessionID on each login.

The service also has an entry of DeviceID: friendly name so it can show the user a record of logins from each device.

The OneID-DeviceID:EK key-value is created at login and deleted when the user logs off, or after the time limit that the user specified, i.e., it is session specific.

When a user logs in with his OneID username plus the PIN plus the deviceID, there is a lookup done using a key of hash(OneID+PIN+deviceID) whose value is an EK. That entry was created when the device was originally registered and the entry never gets deleted unless the user expires or the user says he is no longer using the device or if it hasn't been used in, for example, 3 months (since it can be regenerated e.g., from backup tape or from another device that is active). The deviceID is used to decrypt that key. That key is then used to unencrypt the signature private key and then we sign something simple to verify we match what the correct key singed (this is how we know our login is successful). Next we pick a random 256 bit number (the Session ID) and use that to encrypt the symmetric key that was used to encrypt the private keys.

The repository keeps all the other fielded data of the user, e.g., his Username, PIN, First Name, Home.Address, etc.

The sessionID is remembered it for as long as the user requested. When you logout, this cookie is removed. If you login as another user, the cookie is replaced.

Each browser also has a cookie for the name of the device, e.g., "Steve's laptop" (the translation to friendly name is done at the service). This identifies the various devices to the system. It is a security measure as well since it is combined with the login information so that logins from unknown devices for that account will be put through a higher level of scrutiny.

For any info release that a website requests, we ask what role the user wants for the info release, e.g., home, work1, etc. depending on how many profiles the user has put in. The profile name is appended to the field name, e.g., if the site asks for "Phone" then if you select work, it will try to retrieve work.phone. The site can also request work.phone directly. If a site requests work.phone and there is no entry, then we'll return the entry in "phone".

So there is only one signature private key and encryption private key when using the service. But there are multiple encrypted symmetric keys so each device can log in. But these can only be unlocked with a proper combination of OneIDUID/PIN/device on login, or OneID/Device/Session.

Embodiments of the present invention don't compromise the security of the private keys by leaving them exposed on the service. Encryption keys are used for decrypting the info in the repository. The encryption keys are held by the service (if you had a client, it would be held at the client).

As for the OneID client case as well, data stored in the repository is stored in encrypted form where each field (or group of fields) has a symmetric key to decrypt it that is derived from the randomly chosen FieldID. So a reader who possesses the OneID's encryption private key can request a specific field (if you know the field name) or a list of field names and decode it. The field names are encrypted with the encryption private key. The fields themselves are encrypted with a symmetric key whose value is encrypt(fieldname, encryption private key). So you can hand out fields to people by giving them the symmetric key for that field encrypted using their public key.

Logging into a Website

OneID is given the URL to call to login. It opens up a normal http://connection (for example, not a secure one since there is nothing of value to someone watching so no need for the overhead). The conversation goes like this:

1. Website: shows a login button that looks like http://oneid.com/login?url=www.amazon.conn/oneIDlogin?sessionID=xxx
2. Browser: opens connection on port 80 to oneid.com Service and issues a GET login?url=www.amazon.com/oneIDlogin?sessionID=xxx
3. Service: the service has to do a little work to determine the response to the browser, which normally is a re-direct back to amazon using a page that is determined after it has a side conversation with amazon. So the service has to login to amazon first, referencing the sessionID, and after doing that, it will tell the browser to load the page amazon tells the service. So it will open an http connection to Amazon and do a GET oneIDlogin?SessionID=xxxxxx & challenge="please sign a hash of MY IP, my Socket Number, and this random number that I just thought of just now, but I'm just giving you the random number since you know the rest yourself, but I'll send it to you anyway, just to remove all doubt (just double check I'm telling the truth). So all that info means the info can't be reused anywhere else. And please sign that hash with a OneID associated with your domain name I used to get to you (e.g., www.amazon.com), ok? And by the way, since you generated the sessionID yourself, I'll consider that a challenge for me, and here's my signature of a hash that mutually agreed earlier on of the socket #, the session ID, and your IP address. You already know all that info, so I'm just sending you the signature you need so we can avoid a round trip (but I'll include all the elements anyway just for debugging purposes, but you should derive and check it yourself). That signature was signed by my signature public key, and here's signed proof from OneID that that the signature public key belongs to OneID #122 and also here's another signed statement from OneID that OneID #122 owns the email addresses A, B, and C" so if you can't find me via my OneID, look me up by those emails to find my account. OK?
4. Website: "ok, got all your info and found your account and verified everything and I set the status for SessionID to be logged in so when the user's browser hits me in the near future with the page I'll give you, it will be logged in. Here's the signature you wanted signed by this public key and here's proof signed by OneID that I own this domain. You can then look up the reputation of my domain to show to the user. I paid extra for a verified account so you can show the trust mark too when he logs in to let him know I'm not a scammer. So if everything looks ok at your end, why do you re-redirect the user into my site to URL=https://www.amazon.com/welcome.htm. I've already cookied his browser with the session so there is no need to pass that to you. Just have him load that page assuming my reputation looks good. He'll then be logged in when he gets there.
5. Service: Unless the site has lots of complaints, return a "redirect" to the user's original request to me with the welcome.htm page amazon gave me (or if no account was found, amazon would have given me an error page).
6. So this is cool because in a SINGLE regular HTTP request we did a strong crypto mutual auth!

New OneID User

In normal operation there are two cookies that are presented to Oneid: symkey which is the symmetric key to unlock the private key on the OneID server and login=stk/1234 which is the user's OneID and 4 digit PIN. Using a 4 digit PIN for a symmetric key may present some issues. This just proves it is the user on that machine. Users can pick how many digits they want their PIN to be. To decrypt the secret key, we need the PIN and the symmetric key. That's because if the user has his login expire, the username/PIN is gone, but the symkey remains. So there's a level of safety in requiring both.

So let's start with the case where the user has never seen OneID before. OneID basically gets called and there are no cookies. So the system says to please login with your username and PIN or create an account. User hits create account. He's prompted to enter a username and PIN, the system generates a random number and then cookies his browser with the symkey and creates an encryption key for that OneID and signs it (just the unique number) with OneID's private signature key, and a specific private key that is tied to the symkey and PIN and thus tied to that browser on that machine. That way, when that sig key is used, if it is compromised, we know EXACTLY where the leak happened and it's consistent with the overall OneID approach is private signature keys are unique to a device.

Record Structure: How the Data Including Name, Address, Etc. is Stored in the Repository The repository has 4 columns: OneID, Version FieldID, eFieldName, eFieldValue.

OneID is my 8 byte OneID UID.

Version is a 4 byte overall version number giving the overall version number that was in effect when this value was changed. Therefore, any client can instantly tell whether any field has changed and ask to get any field value that the client uses which has a higher version number than the last version number the client was up to date with, e.g., I can send a version and list of fieldIDs to OneID I have rights to and get back any updates. If the server version number is less than my version number, then download all fields again since things wrapped around (when the version number wraps, all Version numbers for all fields are set to 0.

FieldID is a unique, random 4 byte fieldID that is permanent for all time that is randomly picked when the field is created. When sites are given an access list, they are given a set of fieldIDs to use. Also, ACLs use those fieldIDs. The thing is if the FSK changes, the fieldID is completely unaffected, allowing a user to "rekey" but still allow people with access to get the new information.

eFieldName is the name of the field. But the value is encrypted using FSK for privacy reasons. This means the owner can easily query by field and easily decode every field since only the owner knows FSK.

Fieldnames are a mix of flat (e.g., FirstName) and hierarchical, e.g., Home.Phone, Home.Street, Home.Fax, Propel.Phone, Propel.email. Or they can be flat, e.g., Social Security Number. The fields are all standardized and well defined (perhaps CardSpace did a good job of standardizing field names and their meanings). The eFieldname is not usually given out. It is there so the owner can determine the right fieldname corresponding to the request (e.g., joe wants your home.phone, you can then determine the encrypted name, and then return to the requestor the permanent FieldID for the field).

Fieldvalue is simply the value of the field as a printable string, e.g., "123 Spring Street". It is encrypted with a symmetric key=AESencrypt(FieldID, FSK). That way, each field has a unique decryption key that can be handed out to people authorized to read the field.

Everyone will have the same decryption key for that field. The repository only hands out field values you have rights to. That way, if someone broke into our repository and got a copy of the data, they couldn't leverage a decryption key for one field to use on another. So an attacker who asked for your name and got it, can't then decrypt everything.

When giving out data to people, sites will commonly ask for nuggets of data, i.e., groups of fields like a business card has Name, work.address, work.email, etc.

We can also define nuggets of info, like CardSpace, from the individual fields, e.g., "business card for Propel". These nuggets can be overlapping with each other (i.e., share fields). That can then be defined as a set of FieldIDs and their decryption keys as the "value" part. That way, you can define meta elements. So since a Value can be a text string or a list of eFieldIDs (some of which might be nuggets and some of which might be regular fields, the possibilities for building hierarchies are unlimited though in practice we should likely just stick to a field value being either a string or a list of fieldIDs that have values that are strings. Therefore, to give out a business card, we'd only have to give out the decryption key for that nugget field since it then has all the fields and decryption keys in it in the value section. Although nuggets may not be used, it is a convenient way to leave stuff since you only have to give out one decryption key instead of 20 or more. So just like there are standard field names, we can define standard nuggets.

The owner can view all info, and hand out the symmetric keys to people he likes. Those symmetric keys for each field could be encrypted with the public encryption key of the person who is given access and left on the repository for later pickup and use, e.g., here's the decryption key for my home address nugget so when you mail me each month, be sure to check your mailing address is the latest one.

Or the symmetric keys could be given, peer to peer using an SSL sockets. Or we can just transfer the data requested from endpoint to endpoint, unencrypted (but encrypted on the socket layer). So if Amazon asks for my Name and Email, it's easy enough for me to just send them exactly what they requested over SSL. That's really the simplest. Endpoint to endpoint.

Another way to give out keys is leave them at the repository. I might leave a signed ACL containing field tuples of the form: (fieldID, access rights, decryption key) in the repository for "Jeff" where the decryption keys are encrypted symkeys for that field that only Jeff can read. That authorization can be removed (or listed) by me any time. So I can see what permissions are out there for my data and can remove that at any time. This is useful if I want people to always use my latest email or latest mailing address for example.

When Jeff comes in, he can examine his ACLs and know what he can access and can decode the data when he gets it. Similarly, OneID repository knows what fields he's allowed to get. So Jeff can say "give me a list of people I can access" or "give me the ACL that Steve left for me."

There are two good ways to define nuggets: 1) pre-define them, e.g., business card, personal card and 2) create them every time a website asks for a set so that for any request, the vendor can simply ask for the same nugget he asked for before so he only has to remember and use a single symmetric key to decode the nugget then use the individual field keys in the data he gets.

In an embodiment, the system does a "peer to peer" info release so if you ask for fields 1, 2, 3, then we get confirmation from the user and then give you want he authorized.

If user changes his PIN?

If user goes directly to the OneID site he can change his PIN (we also show a link to change your info on the login screen when he logs in so can see what info we kept on file for you and can change any of it like your email, password, picture, preferred screen names, preferred user names, etc.)

The way the PIN operation works is we get his old pin and new pin. Once we have the old PIN, we can decode the signature private key and the encryption private key, and then re-encode these keys using the username/new PIN/old sym key. The user data (e.g., Name, Address, etc.) is left alone . . . encrypted with the encryption key.

What if user forgets his PIN?

Same procedure as you forgot your username (see next). We'll mail you the "PIN hint text" that you wrote when you made your PIN (or changed it).

If the user changes or forgets his OneID username?

There is a forgot PIN or forgot password link on every login page. Type in your email (or email us) and we'll email you back the OneID associated with that email address. We store that in plaintext on our site (but not that the public can see).

What happens if the cookie with the browser sym key is lost?

Without that sym key, your signature private key (OneID can sign a new one) and encryption private keys held by the OneID service are unreadable.

There are two options:
1. you authorized a second device
2. you asked for and wrote down your symkey somewhere (or stored it on a USB)

For case 1, it's easy. You just do a new device procedure on your PC, using the old device to authorize it.

For case 2, we let you enter in that number and cookie the browser.

Otherwise, you start over from scratch entering all your data. If you can verify any of your email address, we will let you use your OneID UID number so all your websites will not have to be updated (they only store your UID 8 byte number)

New device initialization: what if the user wants to use another browser on the PC or another PC?

Each new device has to get a copy of the encryption private key from an existing authorized device.

There are two ways to do that:

New account creation (you don't already have an account) Old account association What security is there if someone types 4 digit PINS on your computer? What happens if user notified his browser got compromised (changing the sym key) How do we handle things if there is a web client and on an iphone so we don't have to change he URL on the website Four ways:
1. on the website, if the client was installed, you could generate a oneid:xxx style of request instead of the http:// style which would directly call the client.
2. There is javascript in your button code which makes the right call depending on whether the plug in or app is installed.
3. plug-in will cause any web requests of the form www.oneid.com/c to go to the client. For the iphone, if OneID is installed, it uses the same method as Onavo: a profile which is a web proxy server that acts as a complete pass through proxy EXCEPT for a www.oneid.com/c request where it will return a page saying "calling OneID" (or just not return might work better visually) and for those it will call the OneID client in the iPhone (which will then call safari when done).
4. The simplest and easiest way is for www.oneid.com/c to know that this device has the plug-in installed (when plug is installed it will tell oneid.com) and when the service is called, simply redirect to the oneid: protocol so it is handled locally. This involves a quick hit to our server on every oneid request.
5. WaveAuth for the browser can of course look at the URLs and interpret them as oneid: calls before calling them. This is similar to #3. How do you limit the number of OneIDs, e.g., attacker creates millions a day user has to enter their physical street address. We check IP against the address they provide.

We look for anomalies on an IP, e.g., never got a registration before, now getting 10/day.

If either of those isn't clean, we require SMS verification where we send them a code to type in to their SMS number. Each SMS number can only be used once a month.

If they don't have SMS, they can pay us $1 via paypal and we'll give them an account. The paypal account cannot have been used before.

How do You Handle all the CPU Cycles You Need for all this Crypto?

Free accounts get really weak keys so computation is fast, e.g. small ECC and AES keys. That also helps our websites since they don't have to burn cycles on strong crypto either.

If you get a Premium, you get 160 bit ECC, ability to remember credit cards, more storage of fields remembered, etc. You get additional aliases for your account: a friendly name of your choosing, and a numeric name of your choosing to use over the phone.

What if an Attacker Changes the User's PIN

User uses the web to prove it is him by showing he controls the email and SMS numbers. We can then restore his records to what they were before the PIN change (we always backup his records to disk on a PIN change and only allow one PIN change a day) and have him immediately change his PIN. That way, he can decode all his data again. We don't know his PIN . . . only that it changed without his consent.

How Authenticate Over the Phone, e.g., Auto Attendant.

Use your OTP. Give the person your OneID number (or name if speaking to someone) and you're next OTP. They can type that in and you're authenticated.

How does a Site Stay Current with Info if they Notice it Changed?

Site has fieldname:(value, fieldID, version) for each field it gets. It can ask the repository if the FieldID/version is out of date (fieldID is the encrypted fieldname). If it is, it can request an update for those fields by just dropping the field. When you login, you'll see all the requests and can mass approve them, encrypting the answers with the public key of the recipient.

So basically, the repository has two functions: holds the user's data, and also acts as a dropbox so people can communicate requests asynchronously between each other.

What's Difference Between Free and Paid Account?

Free: Typically uses preferred email address as login, no SMS used, can't bypass captchas on site, etc.

Paid: SMS verified, $1/mo, add a shortname and a number, can restore account if hacked, can store credit card numbers, bypass captchas, get access to special sections on sites, etc.

Disabling the Account

Since if an attacker controls your machine, he can pose as you (unless you get our hardware solution), it's important to have some safety measures put in place to put your account on hold until you clean your machine.

Access Control

ACL with read, write and expiration of those rights. One or more of the following may be applied:
1. Data isn't public
2. Can leave in repository using http leave for h
3. Kdf is double encrypt the fieldname
4. Keep acl list in the repository for everyone. If have to rekey, just re-do the value.
5. If attacker asks for lots of data on a user from the repository,
6. If attacker stole someone's rights, he could see updates
7. Site stores the decryption keys for each field
8. Repository stores, at the signed request of the OneID, ACLs for anyone with permanent access like: OneID 234 has read access to fieldID numbers 1, 3, 16, 128 until 12/13/11
9. Where the expiration can also be never (so user can remove it at any time)
10. Each field has a 4 byte permanent ID #which is randomly chosen when the field is created.
11. User can re-key the info at any time. If he does that, he'll leave the new keys for each site for them to pickup. When the site picks them up, they are removed from the server to save space. Those keys are stored in the storage space of each site who should always snarf them once a day.
12. Here's what a field decryption list looks like: OneID 234 can use decryption keys X, Y, Z for the fields in the ACL. These are 256 bit keys, and they are AES encrypted using a random 256 bit key that is encrypted using the public key of OneID 234. So when you check in, please take this and store it on your site for future use so you can always access the user's data.

Security

If anyone asks for lots of fields for lots of OneIDs, but it is not the right "time of month" for the monthly billing, that should generate a red flag.

Javascript Implementation of this

Amazon has a page that refers to a .js file at OneID as part of their page and it can also call a function in that page as part of the amazon page.

That page might in fact be a pure static page, so it can be cached in the browser so that no server hit is required.

That .js file can talk to OneID servers and use cookies stored in the user's browser associated with OneID, but it cannot see the cookies on Amazon, but when the amazon page called my function, it might have passed in an argument (like "I want his credit card number").

So that javascript then uses my OnID.com cookies holding my secret keys and the encryption and signature can be done inside my browser while it is talking to oneID and executing that javascript. So it can ask OneID for some stuff in OneID's repository so the browser can decrypt it and pass it directly to Amazon.

An advantage of this approach is that the BROWSER is decrypting all the info from the repository, and then that info is passed directly to the site via the return from the javascript result. That means, in some embodiments:

1. OneID server NEVER sees any decrypted personal information,
2. anyone breaking into our server gets nothing, even if they have full access to our site and can read everything in RAM; the only way they can win is modifying the .js file; they cannot even reverse engineer the user's password because the login to OneID itself from the browser Is via a signed. So none of the silly hashing the password and seeing if the password matches.
3. OneID can be totally down for weeks and it still works
4. Works on all devices
5. No download required
6. Only risk factor is username/PIN stored in so you may have to "logout" if using an insecure terminal
7. You grab your data when using a NEW machine (so OneID must be up for that to happen)
8. If download an app and use our hardware, you can get a lot more secure So even though I have a server involved, the huge win is that no unencrypted stuff is ever on the OneID server . . . it is all at the endpoints and passed directly to the amazon and ideally the login to OneID is all via public key encryption too.

When you login to OneID you cookie your browser with the decrypted keys you need and when you logout, those keys are gone. It should be noted that HTML5 local storage gives you 5 M of local storage per domain.

So when you login to OneID, you basically are storing your secure hash of your username/password into the browser cookie (or in the HTML 5 region). This is an AES key that is then used, on the fly, to decrypt any data stored in the HTML 5 region. OneID gives you the encryption, signature, and FSK you need; but just the signature key for your device (since each device has a different signature key), but it is actually better to generate the signature private key on the device and then ask oneID create a certificate of the signed Public key for that amount of time. So we'd store the private signature keys of each user on the device so they don't have to regen it each time. Then on login, you get a cert from OneID that the public signature key is valid until expiration date X.

The login key basically allows you to decrypt your FSK and PrEK and PrSK. Once you have that, you can easily access all your key value fields.

When you log out, we remove the login: < 256 bit hash of username/password>, which is an easy way to make all the data "unreadable". Also, we have a key giving the last time we checked the OneID server for updates and a key for the "overall version number" of the data. That key is updated whenever ANY field changes so if anything is updated, we can then ask for all fields with a higher version #. We check for updates once a day (or user can set this frequency).

In addition, there is a date code on the login and if we see that date has expired, we'll delete the key. This field is encrypted like any other key. This is another protection mechanism provided by embodiments of the present invention.

Each browser gets a DeviceID #(the same for all users on that device), and there is a unique private signature key for each OneID/DeviceID so that if there is a key compromise, you can find out which device is to blame.

If another user logs in, all your data is deleted. But if you logout, just your Login credentials (the 256 bit hash which is your AES key to all your data). That means in the normal case where you own the PC, that OneID can be totally unavailable and everything still works just fine since everyone has cached the .js page and all operations are local (it's just that the updates to the fields don't happen if anything has changed).

In the javascript code, the fields are decrypted only on demand when needed since an iPhone can be slow compared to a PC.

Security and Convenience

Embodiments of the present invention provide the following promise: Once you enter your credit card number into our system, we can't read it, you can't read, but anyone who is trustworthy that you want to give your card to can read it no problem.

The way that works is that when you log into OneID, only the first half of the hash is sent to OneID along with your username. That way, the service at no time has sufficient info to decrypt any fields, only you do because you have the complete hash which is then used to decrypt an AES key which is then used to decrypt all your other keys. The Fieldname/Value part is encrypted with those other keys so there is very little work on login . . . get the field/value data as is, and then use your username/password to decrypt the AES key which is used to decrypt your private keys.

In implementations, you are never given the FieldValue data itself for fields marked "secure." If it matches the value stored on OneID, you get to download all the fields EXCEPT for fields marked as "secure". Those stay on the server except for the fieldID and encrypted fieldname. So when amazon wants your credit card, you can easily generate a decryption key for them since it is derived from your symmetric key and the FieldID. So you send those decryption key(s) to amazon. Then either the service is told to deliver the encrypted fieldvalue to amazon, or amazon asks the repository for the field showing the signed ACL it just got from you where you said Amazon is allowed to retrieve my secure data fields X and Y. We know Amazon is trusted because 1) they paid a $1K registration fee and 2) people are notified when their info is released and if there are abuse complaints, we cancel the account and 3) the javascript code only releases to the site that hosted the javascript so an attacker posting a malicious website cannot fool the user since the attacker can't modify the javascript code downloaded from OneID. Due to the $1K charge, it is simply uneconomical for people to steal people's credit cards by creating a "bogus" ecommerce site that asks people to enter their credit cards since after a few complaints they are shut down and lose their $1K deposit. There are simply cheaper ways to get credit cards than this (and we also pre-qualify them before we give them a certificate that authorizes their OneID to be able to grab data from the repository, even after they have a signed ACL from the user).

If you want to convert a secure "write only" field into read/write, you simply request that and the field value is wiped out and you start from scratch so we keep our promise to you that the field is write only for you, i.e., unreadable for you or for us; never in plaintext at any time on either your site or ours. So an attacker breaking into your computer cannot get your credit card information. Nor can he do it by breaking into OneID. He'd have to break into both. That's really hard to do for more than a few accounts. So even in the worst case scenario, only a few credit cards are lost. A benefit is that you didn't need any special hardware on your system to accomplish this!

So an attacker who seizes your machine gets nothing of value, just the ability to give your secure info to trusted site who are told not to give anything sensitive back to you when you ask, e.g., only the last 4 digits of the credit card, for example. If they don't do that, we don't certify them and don't release data to them. Otherwise, an attacker could get control of your machine, do a transaction at a merchant that doesn't meet the certification requirement of not showing the data you gave them, and then the attacker can read your data. As long as we are diligent about certifying websites to accept secret data (that they can't reveal it to you and get rid of it after using it) your data is quite secure.

Using this method, for example, it's impossible for the website attack at Citigroup to have succeeded (where the attackers modified the URL to get different accounts) because the data simply isn't there for the attackers to swipe. So it's impossible to have had that error for merchants using oneid or the oneid site; such a mistake couldn't have been coded even if they tried.

It's often convenient to use an OTP password, e.g., some banks require an OTP for large transfers.

You can have multiple OTP generator apps. Each one gets its signature key endorsed with OTP enabled for that OneID so it can download a new set of random OTPs from the server. So once it authenticates, OneID knows to give it the stuff after it shows the certificate. Each OTP generator, if you have more than one, should have a different number of digits so there is no confusion and all digits are thus useful.

To enable/disable an OTP device, you use an administrative password. Otherwise an attacker might be able to keystroke log you when you log into a public terminal and may then be able to pose as you which could be problematic. Since enabling and disabling OTP is really rare, an attacker will really never see this. And it should be non phishable since you should only enter your admin password when YOU initiated the action.

So when you want to give someone you trust "what they want", you just give your OneID name and an OTP value. That authorizes them to get the info from our server. They then queue a request for you to give them the decode keys to the fields they need. The next time you log in, you're prompted for this and can give them access (since only you know how to generate the keys). So the OTP means you aren't annoyed by random info requests, but more importantly, it proves to the recipient you are who you claim to be, e.g., you are filling out a form, you can't just type in your OneID since anyone could do that and then the site would be trying to ask for the wrong person's info.

You can for example, check into a hotel with just your OneID and OTP (although it likely simpler to start OneID and tap your phone to the reader which, since it is a trusted site without any complaints (the site presents a recent certificate of its complaint rate signed by OneID before you release the info), will just give it the info it wants, and then show on your screen exactly what info was requested and sent to the reader.

OTP is also used for certain bank account transactions, e.g., when you try to wire >=$1000 somewhere that you haven't wired or paid to before.

Since people will mark their sensitive stuff as secure, there isn't a lot of value to an attacker to break into your account, but they will try anyway.

We distinguish between an old login and a new login. It is the new ones we want to limit. The old logins are those where the username+deviceID has been successfully used before to login. The new logins are when there is no record of this device ever having logged in for this user before.

In most cases, users are logged in and everything is peer to peer (e.g., logging into a website). So even if OneID goes dark, users can still log in to any OneID website for as long as their signature key is valid (and assuming they didn't log out or someone else didn't log in).

There are two ways to discourage attacks on new logins:

1. for IPs with large absolute number of failures, we simply use the mod of the hash value to return one of 1 million decoy accounts and then sites instantly know the account was "stolen" but pretend it is a regular user. That way, the spammer is just getting totally useless info that is completely bogus.

2. The other way is to force any new login to do some work, where work is factor a large prime that we create on the fly. The greater the absolute number of failures today from that IP, the harder the problem we give them. And they have to solve the problem before we prompt them for a username and password. So since they may be operating from a college campus and we don't want to upset any legit users, old logins happen immediately, and new logins can take as much as 60 seconds on a bad site (we tell the user what is going on and why the delay). Therefore an attacker gets less than a million attempts per day per machine. To crack the average password of 10 characters, will take a trillion years. So if an attacker has 1 billion machines full time, he can break one account every 1000 years.

Additional Security Features

1. The username/password is secure hashed and then half of the hash is used locally to decrypt the private keys downloaded from OneID, the other half is sent up to OneID to tell it to "log in" this DeviceID and enable it to do transactions (like releasing a credit card encrypted info to a website). That means if an attacker steals info on your computer, he cannot even reverse engineer a proper login. And he can't keystroke log you since you probably never log out. Since the credential is split in half, nobody has complete info except at the moment of login to OneID, which is a very rare event.

2. There is a sequence number associated with each OneID-DeviceID. Every time you login somewhere, the browser will update the sequence number. The website should pass that sequence number to OneID to track. Then if OneID gets a sequence number from the past, it will put the signing certificate associated with that device on a revocation list so no website will accept it. This is because we can't tell the legit one from the clone. The user will have to re-initialize the device from scratch (that's always allowed, no admin password is needed) and get a new device ID, and then log in to OneID to get the private keys. Thus, anyone who steals a copy of your files won't get very far without being detected and stopped.

3. If your device is lost or stolen, you can log into OneID and revoke the certificate of the device so it cannot be used anymore.

4. When you log into a computer at cafe or public terminal, you can specify how long you want the signature credential certificate to be valid for. And on logoff, your login hash is removed so nobody can decrypt your data.

5. When a site asks for information, e.g., to associate an existing account with your new OneID a site will want your email address, then the OneID javascript code will prompt you if it is OK to release that info. So you always control release of your credit card and other info. You can set a parameter to bypass this (you always answer yes if the OneID of the site doesn't have any complaints. OneID will still show you what is releasing even if you bypassed approval, e.g., using AJAX.

6. If you do stuff like change your shipping address or make a $ transfer to someone you haven't previously transferred money to, the website will normally ask you for a OTP to validate (it is up to the merchant).

7. When you log out, your username/password hash value is removed. This makes all the data useless to anyone.

Secure Hand Wave Authentication and Digital Signature

In the current state of the art, web logins are done typically done by typing a username and password. Purchases are done by selecting items, filling in shipping and payment information.

Embodiments of the present invention enable the authorization of secure operations with public key just by waving your hand. Unlike the current art, here (1) in one mode of the invention, the user action initiates a security sequence (such as logging into a website), it is not initiated by an application asking for a key and (2) this does real public key cryptography rather than a shared secret hash, e.g. responding to a challenge with a response generated by using a signing private key imbedded in the device, and (3). There is no OTP that is generated and typed into a form on the web page and (4) in the preferred mode, the authorization is done via a way that doesn't require contact and (5) in the preferred mode, the wave sensor is built into the keyboard, (6) the secret key used in the operation authorized by the user is the signature key whereas the encryption key, is typically stored in the PC on disk and generally unlocked with a PIN code (7) the signature is used to prove identity, rather than being an OTP which must be used with an existing user name and password (8) the oneid: button in the HTML calls the OneID plug-in which knows how to interact with the website to do (9) there is no physical contact needed to authorize an authentication. (10) it can authorize a set # of authentications/signatures or for a set time (e.g., for next 2 seconds allow any private key operation to happen (10) placing the device near the keyboard or beside the keyboard, rather than a USB slot, is a usability benefit (11) it can enable other operations on the smartchip that are enabled for a certain length of time, such as using the encryption private key that may be used multiple times (although in most cases the encryption private key will reside in the computer memory for convenience, it is certain possible in a high security scenario to only enable the encryption keys at the same time as the signature keys, but put more strict limits on use of the signature key (12) the wave is debounced such that the chip is enabled for 2 seconds at a minimum and can be extended basically for 2 seconds after the last motion is detected so there is a continuous single enable.

Here are some other ways this differs:

1. We are dealing with a smart card that can be removed. The smart card has no integrated button on it, but it is a standard smart card that has SPECIAL programming on it so that when it is placed in a SEPARATE reading device from the smart card which has a special communication channel such that an integrated keypad press (in this case the wave) can be distinguished by the card from commands being sent to the card from the USB port.

2. In the case of a smart chip integrated into the unit, the same thing applies: there is generally a different path from the embedded switch to the chip so the chip can distinguish where the switch came from. This special channel is currently known because it is how integrated PIN pads work. We are basically saying "get rid of the entire PIN pad" and instead replace it with a single PIN pad button and 1) the button can be a capacitive button or proximity or reflective light button or some other contactless button and 2) pressing the button will enable a single signature and 3) multiple button presses within a small amount of time, .e.g. < 1 second will be ignored and 4) if a crypto operation is not requested within 4 seconds of the most recent button press, the authorization goes away 5) if there are multiple button presses, e.g., 1 per second, it will NOT increase the queue of allowed signatures so you must consume a private key operation before a new one can be authorized, 6) if an crypto request comes in after a crypto request has been used up or times out, the requestor is notified of the 4 possible states: OK here's your answer, already used and you are within the time window, timed out and unused, timed out and already used so that the requestor can take appropriate action, e.g., notifying the user that an attacker has front run the requestor which should be cause for alarm.

The whole operation looks almost magical to an observer: navigate to a website, wave your hand, and you are logged it vs. navigate to a website, type in username, password, position mouse in the OTP field, press button on the key which then acts like a keyboard to fill in the number on the web form.

Embodiments of the present invention utilize one or more of the following overall concepts:

1. The main big idea of some embodiments is to tie a physical motion (a button press, touch sensor, motion sensor, proximity sensor, fingerprint reader, etc.) to enable a smart-chip to perform a single public key signature or authentication (or open a short time window to allow authentications to happen or allow a certain small number of authentications to happen for a limited amount of time). This is done in hardware and cannot be overridden in software, e.g., the wave applies power to a smartchip or smartcard reader which is programmed to only give one auth per wave. The advantage is that a remote attacker can thus never have an auth done because it requires a physical presence at the machine.

2. The second concept is to use a browser plug in (or built in) to tie the wave to make it also "press" screen buttons displayed in the web browser so you can perform an action that appears on screen (such as login, purchase, or donate) with just a wave. So a wave will power the device (which enables a single auth) and then press screen buttons which will then initiate a transaction sequence which requires an authentication as part of the sequence.

3. The third concept is that a wave (or a button press on a button on a website) initiates a public key mutual authentication process with a remote site which then sends a challenge to the local computer which optionally alerts the user (e.g., with a light that goes on) requires a physical action to complete the transaction.

4. Package as a USB device that plugs into the side of the keyboard (or a nearby USB port) so it can easily be "added to" an existing keyboard so people who want additional security can add it any time even if they didn't order it originally. This enables PC manufacturers to allow for the inclusion of a secure device at very low cost, without having to bundle it into every keyboard. In the future, it could be built into the keyboard, rather than an add-on device that plugs into the keyboard or USB port.

5. Making the USB keyboard add on a smart chip with a switch (button or proximity or touch). It can also be packaged to read NFC cards such as the SmartMX. Or it can be a combination of the two where there is an imbedded chip, but it will use the external chip if there is one to be read and let that take precedence. Or it could allow the software to select which one is to be used. [0282] 6. Pressing the button will apply power to the chip (or card) for the next 1 seconds (or some short amount of time) [0283] 7. Each time it is powered up, the chip will allow a single public key signature or authentication operation. The objective is that a single button press "authorizes" a single (or small number of) private key operation because that is what the program on the smart chip is programmed to do on a power up. [0284] 8. The signature that is allowed to be given is in response to an authentication or signature request from a remote website. [0285] 9. The signature that is given corresponds to the identity of the person sitting at the computer. So this is transmitting my identity to the remote website, e.g., "OneID #12312321", and not a specific username and password for the remote site [0286] 10. There is no queuing of requests for signature. After the chip is enabled, the chip will answer the first request it gets for a signature and deny any other requests. [0287] 11. The OneID software in the browser can be designed so that the user can determine what a button press means as far as the browser actions taken. For example, it could do nothing but power on the chip which means that the browser, which had been waiting for a signature (and telling the user to push the button or swipe his hand), to continue on with the transaction. Or the browser software could treat the button push as a command to press the currently displayed "oneID" button, and automatically confirm any other pop-ups that might happen in the browser or in the browser plug in or in the app. OneID is identity manager that will, when called, initiate a conversation with a remote website using the signature ability of the smart chip that was enabled by the button. This gives a very magical "one swipe" logs you in or purchases the item on the page (or the Oneid: button that is visible that invokes the app or plug-in). So the recognizing of the HTML coding pattern to determine which button to press on the browser is unique, as is calling a one id "app" which does a crypto transaction with an external website when activated by the button and/or signature by the private key in the smart chip. [0288] 12. There can be an optional light(s) on the device, e.g., card getting power, authentication/signature was just completed. This light can be driven by the software driver. This software drivers knows the state by virtue of talking to the smartcard, rather than having to interface to the switch itself. This simplifies the design. The switch powers the smart chip and the state of the smart chip (on vs. encrypting) can be used to tell the lights what to do. [0289] 13. With more expense, you can use a reader that can judge distance so a specific motion can activate the device. [0290] 14. For extra security and convenience, the above techniques can be combined with a Bluetooth or WiFi device such as a mobile phone or with an RFID card. The point would be to further identify the user to the chip in the keyboard doing the encrypting or the reading of a card placed in a reader that is powered by the hand wave. For Bluetooth, you can adjust the sensitivity of the reader on the PC so only Bluetooth devices nearby can be read (e.g., using a class 3 bluetooth reader instead of a class 2 reader or some devices allow you to adjust the sensitivity such as on the new Lenovo laptops). The software can look for the MAC address of the Bluetooth device associated with the account the person is logged in as. So the computer can just "ping" the Bluetooth device to establish that the correct person is really there before doing an authentication on the smart chip (i.e., the Bluetooth MAC address can be pinged, in addition to logging in as "Steve" with a PIN code). For more security, the software can use the authentication keys store on the phone, which will be available when the software on the phone is running and that app has been unlocked with a PIN code. Thus, the secret key in the keyboard isn't necessary for signature anymore, but the button is still needed so that an attacker can't request signatures from the mobile device and the secret key is then still needed since it proves the button was pressed. Another option is since communication with Bluetooth is secure and there are generally ways to look up things in the phone directory is to lookup "OneID" contact in the contact list and use the contents to determine how to log the person into the computer. So if the user hits a "Login with OneID" button at Amazon, if no user is logged into the oneid app, then the app should ask the Bluetooth phone for the OneID and PIN. This assumes the devices have been paired previously. [0291] 15. Reasons for allowing exactly one signature to be made when the button is pressed are 1) no more than one signature is generally needed on a transaction and 2) if you granted multiple signatures, an attacker can piggyback on your button press. [0292] 16. A reason for requiring a button press (or hand wave) is because a remote attacker cannot perform a physical action. Therefore, even the simplest action provides an incredible amount of security. The requirement is that the action must be tied hardware wise to enable a digital signature. [0293] 17. Waving your hand can either mean (user gets to choose), just do the auth that is prompted for in the OneID client, or "press the OneID button on the web page, click confirm for any OK/cancel confirmers" that pop-up in the client to confirm the operation, so that a simple handwave can complete a purchase. There is also the option about what to do if there are multiple oneid: style buttons on the web page: pick the first one on the page, pick the first one that is visible on the screen, pick the button that is denoted in the HTML (with a comment or tag) as the default button. [0294] 18. In another embodiment, the client can remember key words for your websites, so if you type in bank, then wave your hand, it will log into your bank (basically bank is tied to the URL for your bank and it then looks for the oneid:login?link on that page and executes it, confirms all the confirmers and logs you in). So the net effect is: "bank<wave hand>" and you are logged into wellsfargo.com [0295] 19. You could package this also as a keyfob like the RSA token generator. The keyfob would have a smartmx in it and when you pressed a button on the keyfob, it would use Bluetooth to do a single signature that is being requested, e.g., the keyfob would contact the PC, ask for what needs signing, sign it and send it back all via Bluetooth or NFC or UHF or Wifi or IR or some other local communication method. [0296] 20. For indicator lights, having a light go "on" (or flash) when a "wave" is needed and "off" when the wave is complete makes it easy to use in applications that might not be able to give a screen indication, e.g., you are in an email program and there is a "donate $10" button . . . if you hit it, the light should go on and then you wave your hand (or press the button) to perform the authentication and remove the light. Or you can do a task bar icon which lights up to tell you to wave and if you click on the icon, it will explain which authentication is being requested which is useful if the light just turns on and you had no clue how that happened. Also, the software is designed to keep the light on for at most N seconds (e.g., 20 seconds) and if you don't wave, the requested authentication is denied and it returns an "auth fail" to the application (e.g., the oneID plugin in the mail program or the OneID server on the desktop). So if you hit the "donate" button in your email, the light turns on (or flashes) for 20 seconds. If you wave your hand, the donation gets made. If you fail to wave, the donation doesn't complete and you owe nothing. You remain in the email application. [0297] 21. The wave doesn't have to work by applying power. It just has to ensure only one signature is granted per wave. It could also work like existing NFC readers with an integrated PIN pad which ensures that the PIN pad talks directly to the card and the card can absolutely know that the numbers came from the PIN pad and not from software emulation. [0298] 22. Another possible scenario is in a web browser location bar, you type enough characters to be unambiguous of a short alias for a website you want to go to and then an indicator will turn green signaling that you've typed enough and it is time for the handwave to be done to log you in, e.g., "ban" would be unambiguous match for "bank" and would go to www.wellsfargo.com, hit the OneID login?Button and log you in. [0299] 23. You could implement this by adding a capacitive sensor to a DT5000 USB drive from Kingston where the PIN stuff is entered via a secure channel. [0300] 24. Another way to do it without integrating the wave sensor with the smartcard is that the wave device is signed by OneID and the WaveDevice does a mutual auth with the smart card (which is looking for a wave device signed by OneID) and then the smart card can trust the input from the wave device when it tells it to enable an encryption, i.e., it says "a button was pushed on a secure keyboard." [0301] 25. Apple iPhones and iPads have proximity and/or light sensors so those could be used to enable a signature to be done on those devices. On the other hand, iDevices are reasonably secure so just pressing the Login With OneID should be sufficiently secure. [0302] 26. There is a clientless version of the OneID protocol. That protocol is very secure; only legit websites can get your data. The wave method described here is then an extra security mechanism since it prevents an attacker from logging in to any site using your credentials. So the private signature key would be stored in a smartcard (or equivalent) and enabled with the wave.

Perhaps the most interesting case is the use of WaveAuth on the local PC, but with the private keys in a cloud service. If waving my hand generated a signed statement from the WaveAuth device that I just waved (or tells OneID via a shared secret that is easier to implement than asymmetric crypto), this can be used to tell the OneID cloud service to allow a signing operation to take place. In this case, the PC code that handles the private keys could be hardened to make it "look" like a locked-down smartcard, i.e., put a guard at the door to the hardware.

Case I: Low Security, High Convenience

Keyboard has USB device that plugs into it containing a SmartMX chip and a touch sensor. Note: plugging into the keyboard is convenient only because it shortens the cable run. This can also be built into the keyboard.

You'd log into the OneID app in the web browser with your OneID and PIN. You'd set the timeout to forever so you'd always be remembered, but if in an insecure location, you can set the login to timeout after a certain period of time (requiring you to re-login), or after a certain period of inactivity. Set the wave action to press the OneID buttons and confirm all OneID "OK/Cancel" decisions as "OK." Then you just navigate to a website supporting OneID, wave your hand, and you're logged in. This worked because OneID app noticed the card got powered, so it started hitting the button on the browser, initiated contact with the remote website, and then requested an authentication from the SmartMX. The chip also required your OneID name and PIN to be sent to before it would give an authentication. It gives one authentication per power up. Another way is to mouse click the OneID buttons on the website yourself to login and then when you hit the "wave your hand to authenticate," you wave your hand.

Case II: Higher Security

For higher security, you'd pair your Bluetooth device with the OneID app so that the app knows your Bluetooth MAC address. Then you'd only ask the chip for an authentication if the correct device for the present login name is present. Bluetooth connection isn't needed. Just a ping can be done to the device, which saves power. That means once you log in, if you walk away from the terminal, someone using the terminal can't do an authentication because they won't have the Bluetooth device.

Case III: Even Higher Security

Since Bluetooth MAC address can be easily determined and easily forged, we can have the Bluetooth phone run an app (optionally PIN protected) that will do a PKI style authentication so we can guarantee it is the device associated with your account. You'd have the SmartMX in the keyboard communicate with the Bluetooth and the keyboard only issues a signature if the Bluetooth device can mutually authenticate with it that they both have a signed OneID certificate with your OneID so they both store secret keys associated with your OneID #, e.g., they present certificates to each other like "Alias Steve has permanent OneID #000002343200 and public key Abder234f associated with device "Steve PC keyboard"—signed by OneID". The OneID device stores your secret signing key and your PIN, both of which are never disclosed. If you need to change your PIN, you simply present a certificate signed by from another OneID device to change your PIN.

Case IV: Portability

For portability (e.g., going to a public terminal), you'd login to OneID with your username and password, and you'd use your RFID card so instead of a smart chip imbedded in the device, there is a smart card reader. Set your OneID SmartMX card in the reader. The OneID app will read your username from in. Type in your PIN code. Now you're logged in. In response to a OneID button on the screen, or a prompt from OneID asking you to wave, wave your hand over the reader to cause it to power up and provide the requesting website with a signature. When you leave, you take your card. Nobody can log in as you unless they have your card, and know your PIN. No online attacker can do anything since they can't press any buttons whether or not the card is there. This case is appropriate for the use of one reader since it handles all the cases, e.g., works at a hospital (where dozens of people might use a computer) as well as at your home. It also "feels" more secure without being inconvenient. And for home use, you simply leave the card in the reader and set the PIN to never time out. Thus, you have total convenience and security.

Embodiments of the present invention can be accomplished by means of a smart card reader (which reads a card capable of doing crypto and storing at least one private key which could be an NFC card or a contact card) with an integrated motion sensor designed to detect motion directly above the sensor such as an IR Reflective Sensor (e.g., Phidgets 1102) or a "bump sensor" (e.g., Phidgets 1103) such as those made by Phidget (1102—IR Reflective Sensor 5 mm) or touch sensor such as the Phidgets 1129. The iPhone has a proximity sensor and that technology could be used. This allows you to detect a hand wave.

It is not critical to this invention that the physical triggering be done with a hand wave. It could be done by pressing a button (such as a button on the keyboard) or by triggering a capacitive touch sensor, for example.

The smart card reader is able to talk to a smart card capable of doing public key cryptography. The hardware and software on the card combination is designed so that the signature private key stored in the smart card will only perform a single signature operation for each hand wave, and not more than 1 signature every N seconds where N is a small number like 1 or 2. This effectively "debounces" the wave. In some embodiments, the digital signature will only be performed if there is a request pending at the time of the hand wave. If there is more than one pending request, all requests can be denied and the user is notified of this. This helps inform the user that his computer might be compromised.

The restriction can be done in several ways with the preferred method being the terminal makes a secure connection to the smart card and identifies itself as the "terminal." If the external system is compromised and tries to do the same thing, the card rejects it because the hardware connection got there first. The ways to do this are well known since smart card readers with integrated PIN pads have been used previously. Encryption/decryption operations using a separate encryption private key housed on the card are typically always allowed. Ideally, the hand wave detection is also disclosed to the operating system which can act on it when it occurs, e.g., via the USB interface of the smart card reader.

In typical operation, a user browses to a page and selects a link or button that requires a locally generated digital signature (with includes authentication operation), e.g., a URI of the oneid:login?url=http://www.amazon.com/login which would call the OneID application to perform a mutually authenticated login. This request for a digital signature normally originates in a browser plug-in or external application that knows how to do cryptography, but it could also be a page request that requires client-side SSL authentication.

The browser plug in explains to the user why the signature request is being made and who is making it, e.g., a mutual authentication process or a purchase transaction and sends the request to the smart card reader. There is a button to cancel the request in the browser and instructions to confirm the request by activating the motion sensor on the reader.

When the request for signature arrives at the smart card reader, the smart card accepts the request but refuses to act upon it unless it receives a confirmation from the hardware in the reader (that cannot be changed by software on the computer) that such a authentication is allowed. When the user waves his hand over the sensor, this provides that authorization to perform a single signature. In some implementations, a smart card reader with a motion sensor can be used.

This enables the user to log in with just a wave of his hand. A major benefit of this approach is that an attacker who has control of the machine but not physically present has no known way to log in to any website. So an operation that appears to be insecure (the hand wave or finger swipe) is actually one of the most secure ways to log in to a computer.

As an extra safety and security measure in an embodiment, an indicator LED on the reader turns on when a wave is being requested for a digital signature or authentication and would do something and turns off when either the requested operation is completed or has been aborted (e.g., the user has canceled the request or it has timed out). This should match the indicator on the browser plug-in showing the same thing. So the light means "the computer is requesting a wave." Waving your hand will turn off the light and perform the digital approval indicated in the browser.

Other packaging options are possible, including, without limitation: [0318] 1. mouse with an approval button (which could be an existing mouse button) and embedded smart card chip [0319] 2. keyboard with a smart card reader or embedded smart card chip and a special key to approve or initiate a signature transaction, possibly with an imbedded light that blinks when an authorization occurs.

The key point is that the button press causes a power on of the smart chip containing a private key for a predetermined time (e.g., 2 seconds), which only does up to one authentication operation per power-on cycle.

Some embodiments of the present invention employ one or more of the following concepts: [0322] 1. The system uses full public key cryptography by arranging for a hyperlink or button selection in the browser to invoke a separate app that runs on the device itself (it can also be put in a plug in that is solely contained in the browser). Therefore, embodiments of the present invention will work on an iPhone, which doesn't allow browser plugins. When a user clicks a log in link or "order" link, it will switch to a different app on your iPhone in this example. The web page calls the crypto app by using a URL of the form oneid: (i.e., custom protocol) or via a custom file type (e.g., .oneid) [0323] 2. The crypto app, instead of running a fixed protocol connects to the URI provided in the incoming request, and then gets instructions starting from that point. [0324] 3. Embodiments are peer to peer between end points so there is no single point of failure. Exception handling can be done in the client and the client can tell you stuff about the website if a third party reputation service is available [0325] 4. each identifies to one another using a OneID [0326] 5. mutual authentication [0327] 6. the crypto app knows how interface to device to get authentication, for example, using a hand wave [0328] 7. no shared secret required, no preregistration. [0329] 8. net effect is user can click on a button and instantly log in; [0330] 9. user logs into app [0331] 10. user can drop smart and to get username; type in PIN [0332] 11. the processing can be quite modest, e.g., just mutual authentication using public key crypto. Because the session ID is passed into the client, and the session ID is used in the conversation on the secure channel between the client and the web service, the web service can then associate. [0333] 12. Not all embodiments require the installation of a client, but can use a similar process based on the same protocol, providing a compatible client-less interface to the overall system.

A OneID button that tries calling the OneID protocol can be used and if it fails, calls a jump page at oneid, which allows the user to login if he has an OTP to give us temporary authentication. So our site logs him in using that session ID that he passed to us and using the temporary credentials authorized by the OTP. So we still use OUR public key protocol, it's just that the login is done from our site using HIS session ID.

OTP, when enter it, you also enter how long you want it to be active on that machine for, e.g., forever, 1 hours, etc. So it is a separate box to select the length of time when you get the credential (which will be stored on the OneID helper service).

Embodiments of the present invention accomplish one or more of the following objectives [0337] 1. secure: mutual authentication and encryption [0338] 2. peer to peer trusted authentication w/o requiring third party [0339] 3. single sign on (you sign on to the OneID app or browser plug in to enable it and then from then on the app is used to authenticate you at websites until you "log out" of the app (or remove your authentication device such as cell phone or smart card) [0340] 4. various types of transactions including: login, transactions, information [0341] 5. works on iPhone or other devices for which a browser plug-in isn't allowed or doesn't do client side SSL authentication [0342] 6. while not required to conduct a transaction, if third party is available, can supply additional info to the user on trust of the site, get latest list of revoked certificates [0343] 7. only the endpoints see the decrypted info [0344] 8. flexible so not a fixed protocol so, for example, during login, if there is no account it can establish one and then log you in. So there are a set of requests that either side can initiate and the user can be involved and affect the control flow. [0345] 9. fast and easy to use, e.g., if user wants to confirm login each time he can, or just confirm the login to sites he's never been to before; user can set preferences in the app [0346] 10. totally peer to peer with no third party dependencies, including at start up. The OneID repository doesn't have to be up for the app to start. [0347] 11. flexible protocol allows for the server requesting things like requiring a secure authentication that proves a person was present to do the authentication. [0348] 12. can be used to log into applications as well, e.g., to log into dropbox on the iPhone, or to authenticate on the iPhone when it asks for you password [0349] 13. Allows for user to set options for when he wants to require a confirmation, e.g., only on login to a new site or to all sites, $ transactions >$xx, etc.

Embodiments of the present invention provide one or more of the following benefits:

1. if plugin is installed in browser, displays useful information [0352] 2. it does real public key crypto [0353] 3. it does mutual authentication [0354] 4. separates security so if authentication app is compromised, it cannot be used to do actions on behalf of the user (such as banking transactions); the auth app can only do authentication since it has no idea what the sessionID is [0355] 5. unlike conventional methods that rely on a trusted third party, some embodiments of the present invention are completely peer to peer between the browser and the web server and do not depend on a third party being present [0356] 6. can directly interface to a secure element (such as a TPM chip, cell phone with SmartMX, or SmartMX card) to do the authentication, encryption, and decryption [0357] 7. internal or external attacks at the OneID repository are irrelevant since it doesn't play a part in the transactions.

Some embodiments utilize one or more of the following concepts: [0359] 1. logging into the app rather than to each site using a web browser. So you only have to login once with your OneID alias login (e.g., Steve) and a PIN code or password [0360] 2. the login to the browser isn't a login that unlocks a bunch of user names and passwords, but instead provides access to at least one private public key that is used to authenticate (login) and sign (make purchases). [0361]3. the app is capable of having a conversation with the server, in which public key mutual authentication is done and the flexibility that the exceptions are handled. In the most general case, either side can initiate requests of the other [0362] 4. User can be prompted to make decision and confirm, e.g., do you really want to purchase this item? [0363] 5. User (usually) need to press a button or make a physical motion to unlock the private key used for authentication and signing so it is secure [0364] 6. In the conversation, the server can tell the app it wants a secure login and have the app check to make sure that the necessary hardware is installed. Alternatively, it could instruct the app that it wants to force the user to have to click OK to complete the authentication (rather than just rely on an "auto approve all confirmers setting or a hand wave operation or special button that might be programmed to push buttons automatically). There could be further instructions from the server to the browser like "close the session if the user has been inactive" or require the user to enter the user's PIN code (known to the app usually, but could also be the PIN code of the site) in order to increase the security of the login. Many things are possible with a structure where there is sequence of commands that is not predetermined. [0365] 7. All the remote sites say where to go after everything is finished rather than have it baked into the starting URL or some pre-defined configuration. [0366] 8. The button on the website that invokes all this can use filetype or protocol to cause the proper plug in to be invoked or app to be run (or transferred control to) [0367] 9. The button on the website can be kept quite simple. It's basically a "starting command" to the app, e.g., a URL means "lead this page" from the app. That page can then start the conversation with the app. [0368] 10. The app is smart because it knows how the language used to have a conversation (i.e., the requests allowed and how to respond to those requests like "sign this for me" or "prove who you are by answering this challenge") and to do things like actually talk to the hardware to get something signed by a private key (or how to get it out of the file and decode it for signing). It can also monitor the hardware for activity on a smart card (such as power up) and likely knows how send the smart card commands usually through the driver in the operating system. As a result, the app can do things that javascript on a web page is not capable of [0369] 11. The app is generally shared between applications on the desktop, so the browser plug-in isn't usually just a pure self-contained plug-in, but a "front end" to the app so it interfaces the browser with the app while at the same time providing a nice GUI inside the browser for the user to use. [0370] 12. Even if the user is only using desktop apps to do OneID functions, we may still use the browser to display the GUI to the user, or the app may have its own GUI (it will have its own GUI for the iPhone and iPad since no browser plugins are allowed) [0371] 13. Thus, this method provides public key secure operations even on an iPhone and iPad.

Embodiments of the present invention may work as follows: [0373] 1. App gets control when user hits the "login with OneID" button and passes in an initial command to execute which is typically a URL to call which typically will contain a unique authID; the authID is like the SessioniD, but typically has limited abilities and only the remote server knows the mapping from authID .diamond. sessionID, not the OneID app. It allows the server to connect the OneID session to the user session. [0374] 2. App opens a socket to the server calling the URL supplied initiates the oneid operation requested by the site (such as login). A login request will do mutual auth all within that same socket connection (it will not try to encrypt the authID to prove its identity since that is not sent over the same channel; it must do the entire mutual auth within one socket pair); displays progress info and reputation of the remote OneID to the user [0375] 3. App resolves any exceptions with the remote server and does any POST operations (like POSTing the Name: Address: Email: info if this was an info request over the secure channel that was set up with https; and using HTTP keep alive to do the back and forth) as per the request type we started with but what is said between the parties can be about anything, e.g., authentication only, doing a microtransaction, sending information, or signing something like "please bill $5 to my Visa card ending in 1001 and credit it to the vendor with OneID Amazon for purchase of book entitled 'Great Expectations.'" [0376] 4. When the remote server is ready to provide access (or has gotten the information securely), the webserver returns the URL for the OneID app to use to call the server, e.g., the welcome back page, typically with no arguments appended at all. This is because the remote server has all the info it needs before that URL is even called and associated it back the original SessionID. Safari loads that URL as it would normally. Therefore, your credit card info, etc. never even appears on any form . . . it is just sent under the covers magically to the site and associated with your session. [0377] 5. The remote site can communicate with OneID to do stuff during the conversation like tell OneID when the user was last logged in, etc. It normally ends the conversation by instructing OneID to "transfer control to Safari and tell it to load this URL". But it could just as well say "Pass control to dropbox:welcome," e.g., if the login request came from dropbox on the iPad. That way, there is a lot of flexibility in the interchange where both parties can ask the other party to do stuff, e.g., the remote website might even tell OneID to call a different program at the end. It's entirely up to the command set protocols we set up for a OneID conversation, rather than being a fixed, hardwired protocol that is exactly the same every time. Cookies can be set by either party, for example. [0378] 6. Reasons for not passing the browser's SessionID can include: 1) only the original requesting browser can make use of the capabilities that were added by this authentication, and 2) the OneID authentication app, because it only has the authID, cannot perform any operations other than authentication (e.g., it cannot examine your shopping cart since it doesn't know your SessionID, etc.). [0379] 7. This method doesn't strictly require use of a OneID repository at all. For example, if the site accepts a class 1 certificate signed by a trusted entity certifying the person's email address, which can be used as login credentials to a site.

All of the above can be used for offline use as well, e.g., reading QR a QR code initiated request to call OneID passing it a URL which can start a transaction sequence, e.g., requesting information from OneID to send registration information or buy a ticket to an event, or purchase an item or simply log into a website.

At the end of the conversation with the website (or other mobile app) referenced in the QR code, instead of OneID terminating by telling the mobile browser to load a specific web page, the remote website may simply request that OneID display a "thank you for your purchase" message on the screen and end right there.

The protocol between the OneID app and the server could very well have a request from the webserver to ask the user for information that the user has previously entered into OneID as to which credit card to use or which address to ship the item to, or a donation amount to fill out. This enables static QR codes, for example, to complete relatively complex transactions without requiring the user to type anything but to select from information pre-registered in the OneID app.

In addition, the protocol can allow for the remote website to request that the user authorize a charge on his credit card. The OneID app would prompt the user to confirm this, typically in a more noticeable way since money is being spent (possibly requiring a pin code to be typed), and then when the user hits OK, the signed request for payment is sent to the remote website which can then present it to the credit card company for payment.

The protocol can be used distributing trialware software or other digital content (music, video, soft books) and knowing who is purchasing/accessing it by asking for their authenticated email address before completing the transaction.

The protocol for purchasing normally asks the user (if the $ amount is high enough) to confirm the transaction. This decision should then be communicated to the remote website, which will then tell the OneID application which page to load in each instance and those pages can be selected based on the specific type of failure that the server is experiencing. This allows for a much richer user experience than the current state of the art where a hyperlink to complete a transaction typically will pre-specify a success link and a failure link.

In general, the purchasing protocol triggers a user confirmation of a purchase with optional selection of items, some of which are pre-stored in the identity and some of which are supplied in the conversation or in the initial link. For example, the user might be prompted to confirm the transaction is OK while also selecting the shipping address (home or work), which credit card to use (e.g., work or home VISA), and well as which color and/or size to choose. All of these options (with the confirmation) can be displayed To the user in the OneID application and then communicated by the OneID application to the website before returning control to the place the remote server requests.

The same method can be used for regular logins. For example, today password managers on the iPhone exist as a separate application that you go to first, which then calls the website page to login. With the methods provided by embodiments of the present invention, assuming the site allows it in the negotiated protocols, a OneID type of application could log in using existing stored username/password credentials for that site, rather than public key authentication. A site could allow both styles of login via the exact same hyperlink so a user could log into the site using whatever methods were available to him. [0389] 1. To ease transition, if the mutual auth fails because it doesn't have the association to your account yet because this is the first time logging into that site with OneID, it can then have the OneID app prompt you for your username/password or ask if you want to create a new account. Either way, from then on, it is the last time you'll ever need that since the site can use your OneID for authentication going forward since you proved you hold that OneID and proved you have rights to that account. [0390] 2. the OneID app does whatever it is told by the remote site and rarely "takes control." Generally the remote site drives, but either side can issue commands to the other, just like a normal conversation. The site can demand a secure authentication, e.g., a secure chip that when asked to sign a value with certain attributes that indicate the authenticator should only sign if someone can prove he is physically present.

In addition, the protocol can allow for the remote website to request that the user authorize a charge on his credit card. The OneID app would prompt the user to confirm this, typically in a more noticeable way since money is being spent (possibly requiring a pin code to be typed), and then when the user hits OK, the signed request for payment is sent to the remote website which can then present it to the credit card company for payment.

Embodiments of the present invention provide a method for distributing software or other digital content (music, video, soft books) and knowing who is purchasing/accessing it by asking for their authenticated email address before completing the transaction.

The protocol for purchasing normally asks the user (if the $ amount is high enough) to confirm the transaction. This decision should then be communicated to the remote website who will then tell the OneID application which page to load in each instance and those pages can be selected based on the specific type of failure that the server is experiencing. This allows for a much richer user experience than the current state of the art where a hyperlink to complete a transaction typically will pre-specify a success link and a failure link.

The protocol for purchasing normally asks the user (if the $ amount is high enough) to confirm the transaction. This decision should then be communicated to the remote website who will then tell the OneID application which page to load in each instance and those pages can be selected based on the specific type of failure that the server is experiencing. This allows for a much richer user experience than the current state of the art where a hyperlink to complete a transaction typically will pre-specify a success link and a failure link.

In general, the purchasing protocol triggers a user confirmation of a purchase with optional selection of items, some of which are pre-stored in the identity and some of which are supplied by the remote website. The system can use existing stored username/password credentials for that site, rather than public key authentication. A site could allow both styles of login via the exact same hyperlink so a user could log into the site using whatever methods were available to him. [0396] 1. So a site which supports mutual auth will do that. but if the mutual auth fails because it doesn't have the association to your account yet because this is the first time logging in, it can then have the OneID app prompt you for your username/password. From then on, it is the last time you'll ever need that since the site can use your OneID for authentication going forward since you proved you hold that OneID and proved you have rights to that account.

The following examples demonstrate benefits available using the OneID system:

| Activity | OneID System |
| --- | --- |
| Log into website | Enter one PIN at the beginning of the day (or whenever there are long stretches with no keyboard activity). Log in to any OneID-enabled web site with a wave of your hand. Impervious to attacks since there are no passwords to steal. An attacker can steal your PIN, but the PIN only works on your registered machines and only if you wave your hand. The OneID repository can go completely offline and you'll still be able to log in everywhere. |
| Forgot username and/or password | You create your account with your OneID and you log in with your credentials. Wave your hand. |
| Fill out an on-line form | We use standardized field names so all the fields fill in correctly all the time (unlike RoboForm). |
| Fill out an off-line form | Either tap your OneID to the reader or tell the person (or write on your form) your OneID name, e.g., "Steve." When the form is processed, you'll get a request sent to your phone asking if it OK to release the information requested (and to request any information not already in your profile). Click on the OK button. Or if the company normally has gotten those fields from people without problems, you can tell OneID to release those fields automatically. You can also require a special "release code" to be presented by the requestor which you generate in the OTP generator in your OneID app (the secret symmetric keys to your info are all encrypted in the repository using the recipient's public key). Or you can pre-approve info release to the OneID of the vendor. Only verified OneIDs (who pay for service) can even ask for your information, not random OneIDs. If you want to send your info to a friend, just type their OneID (since they cannot request it from you since they don't have the paid, bonded stature of a hotel, ecommerce site, etc.). |
| Check into hotel | Tap your OneID at the front desk, enter your PIN code, and see your room number on the display. Go straight to your room. Tapping your OneID card also unlocks the door; no PIN code required this time since you did it when you entered. An attacker cannot replay your card number and PIN code because the card has no number to replay. Your registration info was all filled out when you tapped the card at the registration desk and authorized the information release by typing your PIN code, indicating you trusted the reader to read your card. Your card also verified the credentials of the reader and that the reader was authorized by the hotel to read your card and it wasn't a dummy reader put in by an attacker. |
| Buy something on-line | Wave your hand to confirm the purchase and release all required information to the website. No typing required. |
| Buy a ticket to an event | Wave your hand to confirm the purchase and release all required information to the website. No typing required. |
| Vote in an election | Registering to vote can be done online. Each election, you get a signature private key which has been transparently deposited into your OneID repository so you had to do nothing. That key expires after the polls close. Fill out your ballot on-line. Click done. The vote application will ask your local OneID device for the proper signature key to use; this is transparent to you. So you do nothing but wave your hand to sign it with the proper key. |
| Lost your wallet | Use any OneID device to show your OneID devices. Hit cancel device. Your lost OneID card is now useless. Your identity is still the same everywhere. It was only the card that was compromised. And that lost card couldn't have been used since they didn't know the PIN. The card has a counter: 3 invalid PIN attempts erase the card. |

-continued

| Activity | OneID System |
|---|---|
| Change your address | Update your address in your OneID record. When anyone tries to access it that you've previously approved, they'll get the latest data. |
| Change your bank | Let your new bank know the friendly names you use to refer to your credit cards (e.g., "Visa card"). The new bank will update your registration at VISA. You never had your card number on any device anyway...you just store the names of your credit cards on your device so there were no changes needed. |
| Purchase a news article on the Internet | Click on the article. Wave your hand. When you agree to pay, you can put a time limit on the authorization to bill your card |
| Recurring payments | All your recurring authorizations are stored in the repository. When the credit card company processes a recurring authorization, they will check with your repository as to whether the authorization is still valid. If it isn't there anymore, the authorization is not honored. The biller can automatically ask you to approve a new authorization. If you decline and they keep bothering you, you can blacklist the merchant.<br>You can also simply revoke the signature by putting the promise to pay on a signed document revocation list.<br>Since all recurring payments have an expiration date, the revocation list doesn't grow without bound. |
| Airport security and/or cop pulls you over | Tap your OneID card with picture on the NFC reader in his cell phone. The card will have a state government signature on your Name, Address, Phone, and Picture. The agent can also view your picture stored on the card since it is signed by the government. There is no risk of forgery. One less card to carry. |
| Identity verification when you call the bank to ask a question about your account. | Give the banker a One Time Password generated from your OneID device (e.g., mobile phone app or browser app). This proves it is you. |
| Airport check-in | Tap your OneID card. The airline can find your frequent flyer number from your unique OneID number. |
| Sign up for loyalty program | Scan the QR code on the signup sign using any QR code reader application. Hit OK on your phone to join.<br>OR<br>Tap your phone to the NFC reader. Click OK. |
| Business bank log in | Enter your OneID PIN into the OneID browser plug-in and wave your hand, providing two factor security. |
| Ride the subway or train | Provide a common interface to a cash wallet that all subway systems can use (we sign their public keys for their machines so they can add and remove cash) so that money put on the card can be redeemed anywhere as OneID cash. So you can deposit funds in the Washington Metro, and take a ride on the BART. Each transaction made goes to OneID which settles everyone up on a predetermined schedule (e.g., each month). |
| Buy a sandwich at a merchant | Tap your OneID card or cell phone. The system can automatically figure out the best way to pay and credit your loyalty program. It will even offer to sign you up for the loyalty program if you aren't a member. The merchant won't have a PCI compliance problem because you aren't going to tell anyone your card number. Neither your OneID card nor you know your card number; it's never sent, not even in encrypted form! If the merchant doesn't have an NFC reader installed, you can still pay with OneID. Just use any QR code reader and read the QR code on the register you are at (or the hand held terminal they bring to your table or the QR code printed on your bill). You'll see the bill appear on your cell phone. You can add a tip if you want. Click OK. You paid and got your loyalty points. And an electronic receipt is stored in your phone. The register will also know you paid. Works with legacy POS terminals with no hardware changes required. |
| Your secret key becomes known to an attacker | Revocation is pushed within seconds automatically and your client generates a new key pair and it is signed by OneID all in response to a single user action. |
| OneID's secret key used for signing becomes known | We can detect a OneID private signing key compromise as soon as it happens and automatically revoke our key and generate a new one. This is because everyone is using our API and libraries. No fraudulent transactions will happen because we always double check the public key with the repository as a second safety measure. Thus, any attack to discover our public key is worthless. This means the physical security needed to protect our private key is greatly reduced. |
| Product warranty registration card | Scan QR code on the card with iPhone. Tap OK. You're registered. Since the manufacturer has your OneID UniqueID #, and that number never changes, the manufacturer can contact you at any time in the future to notify you of a product recall. You can block their OneID messages if you want easily by removing their OneID from your access list in the repository |
| Find out who has access to your information | You can list out all the OneID's who can access your data, look at when they most recently accessed your data and how many times. You can also block them by deleting their access rights. They cannot object. |
| Purchase music | Digital proof of ownership for all your music can be stored in your OneID |
| Purchase software | Digital proof of ownership for all your software can be stored in your OneID. The licenses move with you, rather than being attached to a machine. So if you get a new PC, there is no issue as long as your OneID is the "owner" of that machine. This dramatically simplifies software licensing. So a software license is simply a digital signature that you own the software signed by the manufacturer's OneID. |
| Check on a website's credibility | Comments and statistics can be associated with the OneID of a website so you can see when the OneID was created, how many purchases have been done, whether the OneID has be "verified for authenticity", etc. You can also see comments by other OneIDs about this site. |
| Fill out a form with your child's information such as insurance forms or entering their information on a website (e.g., airplane reservation) | Fill in their OneID.<br>Your child can authorize you to "sign" on their behalf. The signature will point out the OneID of the owner, the signer, and proof of the signature authority.<br>So you can attach the approval of their information release to your account so you'll be able to approve for them (in addition to them approving themselves if they are old enough). |
| Company holding your stock certificate is trying to locate you<br>You want to surf the web anonymously | If you had registered your OneID, they can always find you if you choose to let them. Erase your cookies. If you need to log in somewhere, have your OneID app create a self-signed anonymous identity signed anonymously right in the app. It never gets registered as an official OneID or signed by |

-continued

| Activity | OneID System |
|---|---|
| | OneID. OneID knows nothing about it which is critical to preserving your anonymity. You can switch to it at any time. You can also transfer it to your other OneID devices through the repository. This creates an anonymous identity that only you know that is consistent but cannot be traced back to you. |
| You are a small vendor and you send an invoice via email | Explain to your customers a new easy way to pay. Send them a hyperlink that looks like: oneid:pay?to=JoesPlumbing&arnt =50.00USD They click on it, approve the payment, select the funding source (bank ACH, PayPal, credit card or pre-paid cash), click Pay. |
| You are a charity or politician seeking donations | For on-line requests, you just wave your hand to make the donation or click a button then wave your hand). For paper solicitations, just create a simple QR code on your page. When read by any iPhone reader app, it will call OneID which will prompt the user for the amount he wishes to donate. Your site can specify suggested amounts. For email, just include a "donate with OneID" button and the same thing Occurs. Also, OneID can set up a website to make the creation of this easy for the charity. Just go to our site, hit the login with OneID link, fill in the description of your charity/campaign and the suggested donation amounts, and you're done! We'll set up the required interaction with the OneID desktop client. No changes are required to your website and no programming is required. Just include the static QR code on your letter or the link we give you for on-line use. |
| You just got a new iPad | Run the OneID app to generate a new key pair. All you do is enter your OneID, e.g., "Steve" and name your new device, e.g., "Steve's iPad2" and your 4 digit PIN. Then hit the button to request authentication from one of your other devices. This request will be active for 1 hour or until it is used. The PIN code cuts down spam authentication requests. You then go to your other device and approve the request. It uses the OneID repository to do the peer to peer communication. When you see the request pop up from Steve's iPad, you just hit "Approve" which causes the old OneID device to tell OneID to sign the new signing public key of the new device. And it also sends, via the repository, the symmetric encryption keys for the field data in the repository encrypted with the new device's public key. The new device then generates and signs its own encryption key pair. If you choose, you can also "self-sign" if you left a self-signing authorization in the repository (which generally is entered with a small "use count" so it can only be used a few times. Enter the password to unencrypt this authorization and you can self authorize your device. |
| Web site has a button to post to your facebook account | website uses a single oneid:postToSocialNetwork?text=.... style of link. OneID will then prompt you telling what is going to be posted, and YOU get to choose to which network(s) (default ones are checked). So you are in control every time, not the remote website. Nothing gets posted without your express request. The site likes this too: one interface to all social networks. Spam is eliminated where bogus applications post on your wall without your consent. |
| Logging in from a public terminal | Use your OneID card in a OneID certified card reader. Login with your OneID name and PIN. When you are done, take your card. Simple and secure. You can also treat it like a new device. So you'd basically try to login in, it would say "You need to authorize from another OneID device you own (like your cell phone)." You can also use the OTP method, generating an OTP using the app on your phone. If you treat as a new device, you can limit the time period of validity to just the amount of time you are using it. You can also limit the use of your temporary credentials that you generate very narrowly to a specific website. You can even limit the dollar amount that can be transacted by this temporary signature. By contrast, with an RSA token, not only is it inconvenient, but it gives an attacker a limited time-window to use your credentials anywhere in the world, thousands of times. |
| You aren't sure if your computer is controlled by an attacker | Websites that ask for your signature, also notify oneID that you logged in. So even if your machine is compromised, you can check the logs on another device where you can trust it and see where you've "been." Wave your hand to re-login. |
| Constantly being logged out of a site because of a timeout | The reason you are auto logged out is to prevent attackers from using your session key so we don't eliminate that. |
| Voting your stock shares (proxyvote) | You agree to vote via email. When you get the email, you simply wave your hand to vote with the directors. |
| One time passwords | Our One Time Passwords are amazingly flexible. You can generate an OTP on any of your OneID devices and use them (along with your OneID) for a variety of operations. You can specify, for example: Length Type: computer generated (numeric, alpha, or base-64) or user specified (you can type in the one you want!) Allow N Uses (so not really a "one time" password" if this is >1); Transaction must be less than $X Do a regular Authentication Force a Person Present Authentication (PPA) endorsement of the authentication (i.e., this is a significant transaction like a money transfer or change of notification options and can only be generated by a human) Information permission: can specify which fields or categories are allowed or give access to all categories, e.g., health, contact info (name, address & email), financial info (credit cards) Absolute Expiration date/time so the OTP has to be used within a time window. This is a strict requirement. It is not an OR to the other clauses. Relative expiration time so it can expire 5 minutes after first use The specific OneID of the receiver (so the information is encrypted with ma symmetric key that is encrypted with the receiver's OneID public key so only they can read the info and make use of the info so even if the OTP is used by an attacker it is useless. If this is not specified, the first person to make use of it wins, e.g., you are saving time typing in the OneID of the receiver since you know nobody is going to overhear you give the number. |

| Activity | OneID System |
|---|---|
| | But if you fill out a form, the OneID of the receiver is great because it means that the OTP is useless to someone who sees you fill out the form.<br>Can be used only for the OneIDs of the first N OneIDs to cash in the OTP<br>For public terminals, you'd generate an OTP with all rights to everything, but a limited time window. Or if you are just doing one site, you'd just give it power to auth to just one site. |
| Pay at Peet's for coffee | Tap OneID card and enter PIN. This is much safer than a ATM card because the card cannot be cloned like an ATM card. So someone cannot lift your identity; they must steal your card and know your PIN.<br>Tap OneID phone with NFC (no PIN needed since you unlocked the phone's app). Bring up OneID, optionally enter $ limit, click pay button, and a QR code appears. Have your QR code scanned. This generates a statement "pay to bearer up to $20 out of my cash account. This is serial # 12 of my payments to prevent replay. Signed, OneID Steve."<br>The merchant takes that, adds in the amount, and presents to OneID for payment OK (that you have the money). Your OneID account will show your new cash balance. An advantage is that you don't need your wallet, it is super fast to pay, you have transaction history on the phone so no paper receipts, you didn't have to carry an extra smart card, and it is extremely secure.<br>Loyalty credit (or joining loyalty program) can be done in the same transaction.<br>Integration point would be the POS vendor which reads the QR code (or equivalent info if NFC chip or SmartMX card) and performs the requested action, e.g., charging the credit card, cash account, (or passing the charge card number out to the payment processor) and passing the OneID number to the loyalty program provider so the user can get credit as if he swiped a loyalty card and a credit or prepaid card. |
| View an encrypted document | People can give you symmetric decryption keys that are sent to you encrypted with your public encryption keys. Those are matched to a document (so you can think of a document getting a unique docID too that it could randomly generate). So the app you are using could lookup that unique DocID in your repository and thus decode it. So it's a convenient way to people to pass secrets to you instead of, because in the new way, it is all done for you under the covers. The app just lets you enter which OneIDs to give the secrets to and the rest is all done like magic with no user involvement assuming the app is OneID enabled. The owner of the document has the decryption keys he generated under his account so he can revoke access to anyone at any time. |
| Required to type an OTP to access certain applications | Wave your hand which is the most secure (or hit the Login with OneID button). |
| Avoiding a captcha | If you have logged into a site with a premium OneID the site can let you avoid the captcha for several reasons:<br>(1)Premium OneIDs are relatively hard to get (require paypal payment, unique SMS, address matches credit card) 2) we track abuse complaints on your OneID, 3) we limit the number of times you can post per day and skip the captcha, 4) if people complain about you, we lower your "free of captcha" count per day and you'll be required to pay money and 5) the site should remove your earlier posts |
| Sign on to wifi Network | Login with you OneID automatically (upon a new Internet connection, it can use a pre-defined way to log you in...then you just confirm the charge plan you want in the popup dialog). |

The following table illustrates how various OneID-specific operations can be performed.

| Activity | OneID Operation |
|---|---|
| Spam elimination | You'd sign your emails with your OneID. You can then look up the reputation for that OneID in the repository. Bad reputation or unverified account or no bond posted ==> filter the existing way. Verified identity and known reputation and no spam complaints and bond posted and money paid to open the account and the account is >1 month old, put the email into the inbox. This is compatible with existing standards. The email filter makes one call to OneID to get the reputation. |
| Interaction with other companies<br>I am filling out a plane reservation or health with kids | Your OneID alias can be resolved by any authorized provider to find the repository for your OneID.<br>Each OneID can add the OneID of others to be signature proxies for the OneID (and have all the field decryption keys).<br>That means you can just list their OneIDs on the form, and all the approval requests will come to your account and you can release the information on their behalf The transaction record shows that you made the release (and from which device and when) and on whose behalf<br>If the form wants to know who your wife and children all, those OneIDs can be stored in your record so you need not type them in. However, if you are traveling with 2 of your 3 children, you can specify which children. |

-continued

| Activity | OneID Operation |
| --- | --- |
| | For online forms, the site can verify you own the OneID and you have power to release the info for your children. That's done by interacting with the client. For offline forms, the system can generate an OTP (which can only be redeemed by the OneID of the site you are giving it to if you are worried in an embodiment). |
| Delegation and hierarchy | With OneID I can delegate. For example, I can digitally sign a statement that I give rights to view my health care information to Aetna but only for getting information from BlueCross before July 1, 2011. My kids can give me signing authority on their behalf so I can act as them in limited or full scope. They can revoke that at any time. I can set things up to create a OneID relationship structure of my wife and kids, so if I form ask for info about my spouse and kids, it is all there, along with signed permission from them to access their health records for the purposes of disclosing information. Information disclosure means they leave me the symmetric keys to their fields in the repository, but of course, those keys are only decodable by me. |
| I want to get a OneID | The OneID site will list who provides OneID names, clients, and repositories. |
| You want to change your OneID from "Steve" to "spamguy" | No problem if the name is available. When a website records your OneID in their database, they are always using your UID, not your alias. Change your name as often as you like. If a site wants to show your OneID alias on a webpage, they should use your UID to look it up, and not use the name you supplied when you registered. |
| You want to sign into a website you've never been to before | You just hit the Login with OneID button even if you've never been to the site before. When you set up your OneID account, you'll be asked to provide all your email addresses (which we'll verify), and give us a list of preferred usernames, and screen names. When we auto generate accounts for you, because we interface to legacy systems that don't know about identity, we'll try first finding your account with your email address and if that fails, we'll prompt you to see if you want to create a new account there. This all works because the OneID protocol is extremely flexible allowing for this type of exception handling, and more, to be done in the OneID client. |
| Switch OneID providers | Open the client. Select Switch Provider. Pick the new provider from the list. Click done. |
| The smartCard reader is busted on your computer so you can't login anywhere | You can generate a new signing keypair right on your computer. Give it a limited time window, e.g., 4 days till you get your smart card reader repaired or replaced. Authenticate it like the iPad example using another device (like your phone), or the special password. |
| You lost your OneID card | 3 invalid PIN attempts will wipe the card and you'll need to give the PIN code before you can use it for anything. You can also revoke its public key by reporting it stolen. If you later find your card, you'll have to create a new signing key for it since the revoke list is not revocable. But doing that is a simple operation which the software will do for you automatically when you try to use the key. |
| Register a new OneID device | Install the software and give the device a name. Log in with your OneID and PIN. Click "Request approval." Go to any existing OneID device tied to your account and click "Approve." An attacker cannot generate the same request and flood you with requests to authenticate because he doesn't know your PIN (and wouldn't be approved anyway) and each OneID has a limit to the number of registrations they can make per week |

-continued

| Activity | OneID Operation |
|---|---|
| | (and because it is relatively hard to get >1 OneID per person).<br>Each device has its own private key pair (one for signing, one<br>for encryption). The signing secret key is generated on each<br>OneID device and stays in the device (so you know which<br>device signed things in case of a compromise). Only the<br>owner can generate authentications from the device.<br>Signing key never leaves the device or are backed up. If lost,<br>they are regenerated and then authenticated against your<br>OneID, all with the push of one button.<br>Encryption private keys are sent using the pubic signature key<br>of the receiver. This is the only time signature keys are used<br>for encryption. |
| Off-line form fill out: Proving you own this OneID when filling out a form, i.e., how does the form provider know you are using YOUR OneID and didn't supply someone else's? | Normally, the person asking you to fill out the form is verified<br>bonded and trusted by OneID. So they'll request your<br>information, and if your clients allow it, they can<br>automatically release your field decryption keys to them so<br>they can then request info from the repository. Otherwise,<br>you approve the request (either by trusting them to take the<br>fields they want or specifically limiting the fields they have<br>access to) and it will notify them that they can get the data.<br>In the OneID app, fill in the OneID of the organization giving<br>you the form to authorize them to view your information.<br>This creates a signed access control list for that OneID to<br>access your info and contains the decryption key that can only<br>be read by them for the fields you specify.<br>Another approach is to use the OneID app to generate a one-<br>time-password that you write in on the form that they will use<br>to access your data.<br>Generally, the repository entry is left with the keys for all<br>your fields. When the site makes the field request, the<br>decryption codes for the fields they didn't want are then<br>deleted from the repository. You are then sent a notification<br>of the fields they were given access to. If they abuse their<br>trust with you and access more fields than they told you they<br>would then you can make a complaint against their OneID.<br>When you generated the OTP (which can only be used by<br>them) or granted them access, you'll normally be able to see<br>the number of OneID complaints against them in the last 30<br>days, so you can decide if they are trustworthy. You can also<br>select field by field what they have access to if you are<br>concerned. It uses the same method to leave the symmetric<br>decode keys for each field for them to retrieve and decode<br>using their private key. |
| Sharing the encryption private key | Signature keys are never shared or disclosed; they stay within<br>the device. The encryption keys must be synced on different<br>devices so that if someone sends us stuff (e.g., in the<br>repository), any OneID device needs to be able to decipher it.<br>Therefore, on device initialization, a signature key pair is<br>generated, the device is then authenticated by another device,<br>and then the private key for encryption is left for the new<br>device in the repository by encrypting it with the signature<br>public key of the new device. This is the only time the<br>signature public key is used for encryption. The reason this is<br>not simply done peer to peer is because both devices can be<br>behind firewalls. Therefore, the key transfer done via the<br>repository, is done by encrypting using the public key of the<br>recipient. |
| Why you can publish your OneID username and PIN in the | If an attacker keylogs your username and PIN, he can't use it<br>because his device is not authorized so he doesn't have any of |

-continued

| Activity | OneID Operation |
|---|---|
| newspaper and not have to worry about it | your secrets. Every OneID device, when authorized, gets the secrets needed to decrypt all the fields stored in the repository, many of which are cached on the card. It is virtually impossible to do a phishing attack to get your PIN since it is entered in the browser and not a web page. Even if you had the PIN, an attacker could only use from a previously authorized device and even then he will find that it doesn't work when he uses it because he can't do the wave since he's not physically present on the machine that has a reader with a SmartMX containing your credentials |
| QR code scan for a purchase | Scanning a QR code containing a OneID: then calls the OneID app and it negotiates with the remote website and can ask things to complete transaction like how many, what color, where do you want it shipped, how fast do you want it, and how do you want to pay for it (visa, paypal, etc.), all in the OneID app so a purchase can be completed effortlessly without typing. |
| Shopping cart/cross-site checkout | The advantage of a OneID shopping cart is you can put stuff from all over the web into your OneID shopping cart, and then check out. Both "add this item to OneID cart" and "checkout" could be OneID buttons. |
| Signing up for a Twitter account | The information supplied in your OneID for your username preferences could result in a name conflict on Twitter. To allow for cases such as those, the protocol allows the remote site to ask questions and get answers, all within the context of a mutually authenticated, secure channel. Another option is to do the exception handling after control is returned to the site and leave any user interaction requests to those items that come up after OneID app is entered and before a signature is requested from the chip. |
| How can you do a purchase with just one signature? | There are two cases: (1) already logged in and (2) not logged in. If you are already logged into a website, the remote site shouldn't ask you to authenticate. Therefore you can just sign the purchase. If you are not logged in already, you can simply sign the purchase with your OneID. So you'll remain not logged in (so you can't see your account, get personalized recommendations, etc.). Therefore, a single hand wave is all that is required regardless of whether you are logged in or not. |
| Merging your contact lists, e.g., on your Phone, can you merge your facebook friends into the phone app | You use OneIDs on your contact cards, you can determine which cards to merge and which to not merge. |
| Change your roles at any time | Sometimes you want to be your personal self. Other times you want to be your Propel self, or Abaca self. This can often be different from website to website, and can change even on the same website (e.g., personal flight on United vs. Business flight). Therefore, as you navigate to different domains, the status bar will show which "role" you are in on the current site. The browser has Logged in as: Steve Profile: Home where profile says which set of info to use. So if you have a field like Personal.Phone, if you are in Home mode, it makes it look like you have a field Phone. So sites can request either Home.Phone, Work.Phone, or Phone. If they request the Phone field, the Profile name is tacked on to the field name requested and that field is retrieved if it exists. Otherwise, it will request the exact field name you specified. That way, you can easily change your contexts. |
| OneID login if he doesn't have a client installed | You can't know whether they have OneID installed on an iPhone since browser doesn't tell you. So a OneID button can be used that tries calling the OneID protocol and if it fails, calls a jump page at OneID which allows the user to login if he has an OTP to give us temporary authentication. So our site logs him in using that session ID that he passed to us and |

| Activity | OneID Operation |
|---|---|
| | using the temporary credentials authorized by the OTP. So we still use OUR public key protocol, it's just that the login is done from our site using HIS session ID. Also, on the logon page, you get to select which "profile "to use (home, workl, work2, etc.) for this site, how long the session should last (i.e. how long you are logged into the browser for, and you have a choice of entering a OTP or a permanent password, the latter being more risky. Can also have the OneID button and a "trouble logging in?" link |

Some embodiments of the present invention can utilize a keyboard reader with an imbedded NXP chip. The system can keep the programming on the imbedded SmartMX chip extremely simple, for example, allow it to generate new private keys, and then ask it to encrypt and decrypt, supplying the OneID shortname and PIN each time. It should be able to maintain a list of at least 20 private keys (since 10 people might log into that computer). It can hold the symmetric decryption keys for each field in the repository as well as a local cache for the most common fields (including picture) so most things can be done peer-to-peer. The NFC reader can include a touch pad that powers on the reader and can have different cord options.

According to an embodiment of the present invention, a smart card reader includes a motion sensor in which activating the motion sensor will cause the hardware in the smart card reader to allow a single pending authentication or digital signature operation to be completed by the smart card. The smart card reader can also include an indicator light that turns on when a digital signature or authentication is actively pending. Additionally, a browser plug-in can show the users details of why a signature is being requested and by whom and request the user to complete the transaction by activating the motion sensor in the attached smart card reader.

In other embodiments, a smart card chip integrated into the unit can be used instead of a smart card reader. Alternatively, the smart card reader could be integrated into a mouse, a keyboard, or the like. One of ordinary skill in the art would recognize many variations, modifications, and alternatives.

According to another embodiment of the present invention, a method for interfacing a website or desktop or enterprise application with a secure identity management application on a personal computer or mobile device (including iPhone) is provided. The method includes performing secure authentication including the requestor calling an identity manager with an initial instruction, the identity manager executing the instruction, which leads to a conversation, which includes authentication of at least one party to the other, and one of the parties determining on what the identity manager should do to terminate the session.

In an embodiment, the identity manager is a web browser plug-in that is capable public key authentication. The ID manager can prompt for confirm/deny and the ID manager can prompt the user to fill in missing information. Additionally, the requestor can be an app on the iphone and the identity manager app can perform public key authentication of the caller. In a particular embodiment, a known set of requests from each site can be made rather than a static protocol.

According to a specific embodiment of the present invention, a peer to peer login method is provided where the side conversation the parties determine us the final URL at the end (it could be a URL or URI or anything else). Embodiments include a method for secure transmission of information between a requestor and a message for secure micropayments, a message for auth, a message sending information, a signed request for a credit card company to make a transfer of funds to a merchant, a QR code scan initiated request to call OneID passing it a URL which can start a transaction sequence, or the like. The transaction sequence can be initiated from a QR code reader which reads the QR code, deciphers a oneid: protocol request, and calls oneid: in order to process the transaction. The QR code being scanned causes it to log in to the website in the QR code, but with the credentials in the OneID app. The QR code being scanned causes it to do a transaction on the website in the QR code, but with the credentials in the OneID app. The OneID app can be asked by the remote website to query the user as to which credit card to use. The OneID app can be asked by the remote website to query the user as to which address to ship the item to. The OneID app can be asked by the remote website to query the user as to how much to donate. The OneID app can be asked by the remote website to choose from information that has previously been supplied to and stored in the OneID application such as shipping address or credit card number. The OneID app can be asked by the remote website to sign an authorization which attests to the user agreeing to charge a credit card owned by the user. A private key can be stored in a secure location and the requestor can verify the authentication. In an embodiment, a physical action (e.g., a button press) is required to get a certain type of authentication. The authentication can include client authentication.

The user can be notified on certain activities based on the user's preset notification preferences. These preferences can include logging into a new website. The preferences can define the $ value of a transaction exceeding a preset number. The user can establish certain apps that require him to type in a pin code, e.g., find my iphone. In some implementations, there is a timeout after which the user has to type a PIN code. Additionally, certain transactions can require a button press to confirm and certain transactions can require a PIN code to confirm Each user may have a unique identification number (UID) that need not change over time. The UID may also have an alias associated with it, e.g. a first name, such as "Steve." Each user device assigned to a UID may have an ECC public-key signature pair. This may be stored on a certificate with the UID signed by the identity repository or any authorized certificate authority. The UID may also have a common public encryption key shared by all devices owned by the user. Any site that recognizes the alias should resolve the alias to the UID and remember that as well.

Each device has a unique name, e.g., "Steve's iPhone" that may be familiar to the user. Each device also has a unique-to-the device public/private key pair. The identity repository key pair can be received from a peer, and also in the event of a key compromise, the new key pair can be sent securely. Each device has the current OneID key pair. There are a wide range of fully compatible device options, including the following without limitation: a magnetic stripe, QR code, bar code card (usually coupled with an iPhone app to enable/disable the card, and the key pair is done via a proxy application not hosted by US), server software only (Facebook® login), client software only (allows Facebook style peer-to-peer), RFID sticker for cell phone, (including RFID reader, driver, and client software), a TPM chip in a laptop, an iPhone running OneID software using Bluetooth, a $2.00 NXP SmartMX card with $10 NFC reader (optional integrated PIN pad), and/or an iPhone5 with NXP SmartMX embedded in phone.

Regarding the OneID secure repository, customer information can be 100% secure from disclosure, even if attacker knows all the algorithms, all of the private keys, and has root access to all of the servers. The user can pick their repository vendor. Large companies may decide to be repository vendors. Each OneID signature key pair is generated on the user's machine, consistent with the overall design philosophy. The user's encryption key can be shared; and can be initially transmitted using the public signature key of the new device. The Identity Repository is used for both synchronous and async communication between OneID devices.

Regarding the OneID secure repository, there can be two requirements. First, the owner should be able to find out what field names are present. Second, the owner should be able to quickly retrieve a field by name and decrypt it. Only one number is chosen at random. The others are derived. A random symmetric key (#1) may be chosen and used to encode all the field names. That random symmetric key is encrypted using the public encryption key of the OneID owner.

Additionally, each field name and value can be encrypted using a second symmetric key (#2) which is derived from encrypting the fieldname with the owner's public encryption key. Therefore, the database can have 4 fields: OneID UID, the encrypted (#1) field name, the encrypted (#2) field name, the encrypted (#2) field value, using the respective encryption keys. In order to retrieve something from the repository, two things can be required. First, an access control list (ACL) signed by the owner should be presented to the repository to tell the repository which fields to return and what rights a user has on each field (read, write). Second, the symmetric keys should be communicated securely to authorized endpoints using the public encryption key of that endpoint.

Any approved repository should be able to route a request. Given a OneID shortname or UID, any repository can look up the correct repository currently servicing it from any OneID supplier. OneID requests are normally sent to the server that created the UID (encoded in the UID top digits). If the UID isn't located there anymore, that server could return to any repository to which the UID moved, and the client should remember that repository for future requests.

For example, if "Nancy" wants to give her information to "Greg", all she needs to do is authorize "Greg" to have read access to her Name and Phone for 3 months (or until she changes her mind). Because the ACL and decryption keys are in the database, they can be removed at any time by the owner. The owner can see the entire list of people who have access and what their access privileges are. If the owner's private encryption key changes, the information for all readers can be re-generated by the repository.

The design philosophy of the system includes an architecture for ideal security that also allows users to choose to trade security for convenience on any device and at any time. The repository will support any desired user configuration, no matter where a user wants to be on the trust spectrum. To illustrate, Facebook is convenient, but it isn't secure and there is no user option to make it secure. Facebook knows all your information. In contrast, OneID does not, cannot, and never will know a user's personal information. This represents a significant upgrade over existing solutions.

The OneID system is designed to manage a user's identity in a way that is secure, easy to use, incorporates on-line and off-line availability, presents a unified interface (i.e., only one place required to change information), allows for granular permissions (per field, r/w, time), has revocable access, allows the user to change their private key at any time, and notifies users when their identity is compromised. The system is also reliable, in the sense that the repository is distributed, and users have direct access to login (i.e., no repository need be involved if a client is installed). The OneID system is also designed to manage a user's information securely and conveniently. New information needs to only be entered once, and standardize field names are used so that consumers of information have a consistent way of referencing information. Additionally, the OneID system is designed to secure a user's rights. This may extend to music, purchase receipts, and software license keys, and/or the like.

New features of the OneID include a secure repository, with an ACL and a decode list stored either in the repository or stored externally. OneID transactions may be carried out on an iPhone in a peer-to-peer fashion. The OneID system, or "ecosystem", can include a keyboard key/wave authentication scheme. Also presented is a new method for doing credit card transactions using flexible one-time password (OTP) options and multiple OTPs. When registering a new device, the new device asks old devices for approval. Critical changes to a user's security configuration may result in a delayed approval for verification purposes. When logging into new sites, the system may require login confirmation and a showing of a reputation comprised of a creation date, a number of logins, positive and negative comments from other users, etc. OneID enables micro-payment methods.

Hotel, rent-a-car, and airline check-in procedures may be simplified using the OneID system to select allowable information and restricting a check-in reader to showing that it is a OneID vendor-trusted reader, or to allow the user to supply his/her OneID and an OTP. Different public keys may be used for each device, but each device may be authenticated with the same UID. The OneID may be used as a universal loyalty card, where if the UID does not match the reward program's registered number, the reward program can contact OneID for a translation. OneID may be used as a QR code scanner fill-in form information. OneID may be used to login to websites using the OneID and an OTP in the website's existing form fields. For example, the website may attempt a lookup as a standard user, and if this fails the website may try a OneID lookup. Because logins will be easy and secure, and form filling will be simplified, e-commerce may become more accessible to some users. In addition to micro-payments, credit card transactions may be replaced with a digitally signed authorization to, for example, "bill my VISA Card." Also, over-the-phone and in-person transactions may be authenticated using the OneID system.

The OneID system may be gradually implemented throughout the financial economy. Implementation may begin with "Secure and Simple Single Sign On" that is peer-to-peer with no third party dependencies in a way that works on iPhones, iPads, and other mobile computing devices. Next, login and information transfer (possibly including OTPs) can allow existing Username/Password boxes to be used without a client installed. This may also include push notifications to clients so that the OneID system can see what sites a user was logged into and from what location (translating IP addresses to locations for the user). Next, major credit cards, such as VISA, MasterCard and/or Amex, could accept OneID signed transactions sent via a new direct OneID payment gateway. Next, PC manufacturers could be interested in implementing the "OneID approve" button on their keyboard. Royalty free licenses maybe granted to entice manufacturers so that others will follow. OneID may include a reference design to be licensed to manufacturers to make limitation easy. The APIs will be simple and easy to use, which leads to cheap developer training and support, large code bases of example code, etc. because adoption is easy, and does not require hardware or software purchases, major websites could support the login and form filling services provided by the OneID system. Additionally, the system may support smart cards, NFC, and PDA hardware.

Although the basic service may be free of charge, upgraded service (for example, $10 per year) may allow a user to reserve any free alias, engage in micro transactions, pay with a digitally signed credit card, and other advanced services. Additionally, account creation may be limited by requiring CAPTCHA and/or SMS authentication to prevent spammers from creating accounts. The client can also send OneID the MAC address of the machine so that OneID can limit signups from each machine. For IPs with an abnormally high number of signups per week compared with their moving average trend, a payment of $1 may be required per account. Alternatively, these could require a credit card and/or address and check that it matches the user's IP address. Users may need to decrypt encrypted data with a weak public key that will take a day of compute time, and that should be completed within a set period of time, such as one day, or the process could start over from scratch. Also, accounts could only be created for people in good standing at the website, e.g., people who have ordered something at Amazon.

Other applications may include ACH transfers, using a secure authorization, and partnering with clearXchange. Additional applications may include: secure approval of over the phone authentications, auto fill and submission of four entity registration cards, voter registration and voting, ticket purchases for movies and events, instant enrollment into loyalty card programs, moves and changes of address or contact information, a QR code reader for bills, donation requests, and event registration sent via US mail or for ordering products seen in a magazine, alternate logins (using OneID and OTPs), and credit card tokenization. OneID may also be used to authenticate healthcare transactions by providing a healthcare provider with OneID and a PIN code. Alternatively, iris or vein patterns could be stored in association with the OneID and read by the healthcare provider. The OneID alias is essentially for parties to uniquely verify that you are who you say you are instead of saying your name and birth date which can be overheard easily compromised.

While there are hundreds of use cases for the OneID system, implementing each of them may not be feasible. Instead the system can be designed to create an ecosystem (like the Apple iPhone) where lots of parties can contribute and make money. For example, core applications and protocols may be created that are easy to implement, and provide simple documentation, example code, and application notes. The installed base of OneID identities and sites and services may be leveraged by new customers. Furthermore, a OneID vendor directory listing third-party OneID apps, along with compatible hardware and consultants may be provided. Student groups may also be funded, along with entrepreneurs and venture capitalists to fund development of dedicated OneID applications.

To generate revenue, a yearly fee may be charged for a OneID identity that is relatively small in the beginning, but increases over time to match the value delivered. Websites may also be charged to use the directory provided by OneID, and sensitive data requests may cost an additional fee. Royalties may also be collected on certified devices, such as readers, smart cards, she files, NFC devices, and/or the like.

There is a demonstrated long felt need in this area without a solution. For example, Charley Kline stated that "there is not one really good SSO identity system, tied in with a micro payment system, etc." Similarly, Jean Schmitt, Managing Partner at Sofinnova Partners, stated that "software is desperately needed in the identity/security space. Inside Secure nor NXP for that matter are going to really make it unless someone from the software side solves to problem of 'usability with security.' I see many security companies, but usability is an afterthought. And I don't have to say, 'usability but no security.' Software is the missing ingredient, my company is going public, but it will not be big until someone gets the software right"—Jean Schmitt, Managing Partner at Sofinnova Partners.

Mobile payment systems are a disaster waiting to happen. Computerworld, Jun. 1, 2011 pointed out that Google wallet is insecure. Intuit's QuickBooks Payroll suffers outages and user data losses. Intuit's QuickBooks Payroll service was also hit with an outage that has prevented small businesses from paying workers via direct deposit.

Additional products and services that may be offered by the OneID system may include the equivalent of a German ID card for the rest of the world. Websites may use the "Sign in with OneID" button, or a similar "Fill this form with: OneID" button. OneID may be compatible with smart cards, key fobs, and RFID readers, and may be used in stores. Vendors that now use barcodes two swipe to join reward programs may switch to OneID. Additionally, personal information such as address, email, credit card may be changed using a central repository.

Because the OneID repository can be encrypted all the time, personal data should not be found unencrypted at any time on any machine. The only data remaining unencrypted can be specifically requested to be so by the user. Unencrypted permissions may be revoked at any time.

Additional products and services can be offered in conjunction with the virtual identity using OneID. For example, free moves can be offered for changes, or when the user enters a OneID in a form. Warranty registration can be completed with OneID app to protect against identity theft. Credit card information may be transmitted securely for websites that do not want to remember credit cards, along with e-commerce sites seeking to make transactions easier for users. Generally, OneID benefits merchants, consumers, and others involved with transactions. Also, the system is scalable and capable of servicing millions of customers.

In one embodiment, the system may offer transparent mapping to an existing card. For example, when a point-of-sale device recognizes a OneID card, the system can resolve the transaction by mapping this to an existing card accepted by the vendor. This makes adoption of the OneID system transparent to vendors.

One key feature of several embodiments is that usernames and passwords may no longer be necessary. By sliding a OneID card into a reader, there is a one-time pin code required if the user has never used that were before to protect against a lost or stolen card being used without authorization. Similarly, with websites, clicking on the OneID-enabled input will automatically log the user onto that site. In some cases, there may never be a need to log in to the OneID system. This eliminates the threat of keystroke loggers, and would require that the card be physically stolen. This technology is ideal for public terminals.

Pressing a button on the website will request credentials. The client asks user to confirm release and whether to remember the authorization or not. After the initial login, user logins can happen automatically without requiring additional inputs. If given permission, the website can access to credit card information and personal information. A profile of trusted sites can be stored in the repository so it works from every machine. Unlike with the Facebook login, the OneID repository can be off-line, and this process still works even with sites the user has never been to before.

The OneID system may be used as a sign-up mechanism for a loyalty program. In one embodiment, the user may scan a QR code on the "sign up" graphic with the OneID app. The user may then confirm the release of the info to complete the process. Because the OneID card is linked to a user's account, it may be used and displaying vendor. If a user forgets the OneID card, the user may simply tell the cashier the alias of the user's OneID ("Steve"), thus it is not necessary to remember numbers. For even faster signup, the user may swipe (or tap) the OneID card. This will enroll the user and give the user purchase credit at the same time. If a user doesn't have a OneID card already, the user may pick one up at the counter and swipe it with the current transaction and register it on their phone or at a later time. Merchants may benefit because they don't have to pay for the card and they know a lot of people won't put their card in their wallet due to space issues.

For example, the user may pick up a OneID card from a store display, swipe it, and register the card at home. For the next store, the user may swipe the card and confirm that information may be released on any OneID device (e.g., via a pop-up on the mobile OneID app, or when the user gets home on their computer). If the user forgets the car, the user may simply tell the cashier the OneID alias. Rewards may be restricted based on authentication.

The OneID system may also be used to check-in to various services. A user may swipe their OneID secure card or tell the agent their OneID alias. The user may then go into the OneID app on their phone (requiring a PIN if so configured by the owner) and tap their phone to confirm the request for information.

The OneID system may also be used for web-based micro-payments. In one embodiment, the seller asks the buyer for a signed money transfer. The buyer then signs the money transfer for the item and indicates which "bank" to ask for the money. The seller presents the "bank" with a signed money transfer that was directly signed by the buyer's OneID device. If the buyer's bank OKs the transfer, then the merchant ships product. In another embodiment, a hyperlink wants to charge the user a fee. The user's OneID browser plugin client prompts the user to confirm the request (the URL switches to a separate app if using an iPhone).the user clicks OK in the client, and the client sends the site a signed money voucher with the OneID, the amount, the payee's OneID, and a sequence number to prevent replay attacks or detect unauthorized clones. The Site cashes in the money and, if it succeeds, gives access to the content.

In another embodiment, web-based micro-payments may be done via pre-pay, e.g., $100 at a time using ACH to keep costs low for the consumer. A merchant may wait for the transaction to clear and confirm with user in several different ways that he/she won't do a chargeback. The transaction may be treated like a pure cash transaction, so buyer may have to ask seller for a refund. The system might only allow very trusted sellers to take a buyer's money so the merchant's risk is that the buyer's machine is attacked. This feature may be coupled with other benefits for both parties. Consumers may pay a reload fee depending on a reload source (and amount of reload), thus the service is free to merchant and very cheap to consumers. Also, OneID can be a gateway to other payment mechanisms, so if a site implements these methods, they can cover numerous different micro-pay schemes. A merchant pays a fee to apply to be approved for micropayments, and their revenue may be placed into an escrow by OneID.

Micro-payments may also be accomplished using installed client. The user may click on link on website which, if user agent supports OneID is, [0436] OneID: pay?to=amazon&amt=5.23USD&for=book&tid= 23423272&rd=http://-xxx.com/micropurchase The "tid" can guarantee that no double billing takes place. After clicking, a browser client pops up a window so that the user can confirm the payment. The signed payment is sent to the site appended to the "rd=URL". It includes the name of the OneID compatible and authorized cash vendor to ask for the funds. A unique expiration date/time on the payment can guarantee uniqueness (a cash vendor then only has to remember unique time codes for very short time window). The site verifies it can cash in the payment and then releases content or gives an error page ("money failed" or "looks like you hit cancel"). Payment is then credited to the account associated with the OneID of the seller. If user agent doesn't have a OneID client installed, the link presented to the user for micropayments should resemble Facebook's protocol so that the user gets a window to confirm the request and complete the transaction.

Some embodiments may require prerequisites for web-based micro-payments. First, there could be a compelling reason for a merchant to implement this system, so OneID is designed to make it easy for sites to implement and merchants are not charged a fee. Merchants may be qualified to ensure that there is no unauthorized charging taking place that would anger customers. Funds could be cleared before they're allowed to be spent. Also, chargebacks may be limited to the merchant.

In order to mitigate fraud in micro-payments, the buyer can register a dispute w/funding source (ACH or CC) and can ask the merchant for a refund, but it could be treated like a cash transaction. The buyer can require cell phone notification on every micro-transaction if he wants or if exceeds a dollar limit per day. The OneIDs that are payment enabled should be "hard to get" so the user's data can't be verified to match their credit card and the money can be withdrawn from their bank account when their IP address matches the address on their credit card. Also, shipments of hard goods should go to a user's registered address.

In one embodiment, credit card numbers could only be linked to a single OneID account if the user wants OneID to sign that the user owns it. That way, no one can ever "steal" someone else's credit card if they've already registered it.

The OneID system may be used in additional applications. For example, a user may change their address, phone, email, or credit card, by updating only one set of information. Identities may be easily verified. For instance, the user may prove to a bank that they are who they say they are by telling them their OneID alias and confirming on their phone or PC. Websites may be logged into using a smartcard. An SSO may be used for all websites, even those that have not been visited before by simply clicking to agree to give the website the required information. Sensitive personal information could be stored in a secure repository which only authorized people could access pieces of. Authorization can be revoked at any time. Users could tap their OneID card on a reader to transmit their personal information instead of filling out a long form. Security breaches like SONY could be prevented from happening again, and users would not have to worry about their bank account or PayPal account being cleaned out. Micropayments could be made from a user's pre-paid accounts. Finally, users no longer have to give out personal information to an untrusted stranger to authenticate their identity.

When filling web forms, the following example may be illustrative. United Airlines asks for a user for their name, address, etc. The user clicks the "fill in with OneID" button in their browser. If any info isn't in the OneID repository, user is prompted to enter it so it can be used in the future (is only entered once). The information requested is then transmitted to United Airlines. Alternatively, the OneID could be fielding using the alias, and the request could be confirmed using smart phone or other similar device.

To register warrantees, a user may use the OneID app on their phone to scan a QR code on the registration form. This may offer the advantages of larger distribution, less competition, and may offer large benefits to the user and manufacturer.

Similarly, credit cards may be eliminated. The user may select on their phone what they want their OneID card (or phone) to "be" right now. It could be one or more things. To log of all registered websites, the user may remove their OneID smart card from the reader and the client will remove the session cookies.

If someone attempts to steal a OneID identity, the user can be notified when their OneID is used from a new computer, used on a new vendor, or used to withdraw a large amount of money. The user can then confirm, deny, or "disable that device." Users can instantly add new notification devices, but to remove any notification device may require a PIN and a 48 hours lag so a thief cannot remove the user's OneID device from the notification list without detection. For large transactions, users can require approval of one of their OneID devices and require an approval time window. Any denial within that time window can trump any approval, so a thief cannot approve large transactions without detection.

In another embodiment, a OneID identity may be used to access physical locations, such as a building. The building security system may request the OneID, and a user may respond with a OneID or an alias. At this point, access can be granted without requiring a badge swipe. Enrollment can be done at this time or the phone. If a user's OneID is lost, it can be managed through the OneID system.

In another embodiment, the OneID may be used to acquire a boarding pass for a flight. The user may touch their OneID card to the NFC reader for access. This assumes that the user supplied their OneID when they made their reservation.

In another embodiment, services such as BOKU that allow users to buy online with their mobile phone number may also use the OneID system. In other words, BOKU/OneID lets users buy online and in the real world with their ID, e.g., the OneID alias.

In another embodiment, the OneID may be used to access corporate networks. A user may place a OneID registered phone near a NFC reader on their PC and type a PIN code into a web browser plug-in. This allows an SSL client side authorization to use the authentication in the phone. A change in corporate applications may require SSL client side auth. In an alternate embodiment, the OneID Bluetooth authenticator on the phone may be used to interface to and existing Bluetooth reader on the PC.

In another embodiment, the OneID may be used to update a user's personal information when changes occur. If the user changes their work address, primary email, cell phone, etc. it is usually a painful process to update all the people in a user's contact list. Using OneID, users can track their changes in mailing address, email, etc. as long as they allow it and can see who has permissions, and revoke those at any time because the ACLs are all stored on the OneID server. Magazines may track users; however, most others aren't equipped for this type of operation.

It should be noted that governments are already using universal ID systems, e.g., the German ID card. Additionally, private retailers are also using payment cards. For example, the Starbucks card is used by more than 50% of people with cell phones. Nectar has proved that merchants will get on board a common standard if it is easy to use and offers advantages.

Although some people are focusing on mobile payments; nobody is focusing on unified identity and authentication. Entrust focuses on identity-based security, but it isn't consumer focused and it needs to be designed for each type of market.

This area represents a long felt need in the industry. Technology and standards are now ready and affordable: A $2.00 SmartMX recently emerged (supporting public key). RFID standards and cheap RFID readers are prevalent. Client-side SSL may be clunky, but cheap RFID readers and cards that do public key encryption are now available and make it easy to carry an identity around with it first, and are much more secure. Readers have integrated PIN pads. Additionally, consumers are ready: to eliminate passwords and multiple cards in exchange for a highly secure and convenient system. Costs are also low. There are gains to be made on the manufacturing volumes created by the German government for reading their ID cards and the variety of readers that have been perpetuated.

In some embodiments, the aliases may be sold like domain names Annual fees may be charged to renew a private key. Repository storage fees from consumers and licensees may be required. Merchants may be charged a fee per card use or per time period. Personalized RFID cards may be sold with pictures, designs, and/or the like. These may be charged when banks sell identity authenticated OneID cards. Fees may be charged for RFID cards. These may also be charged for OneID enabled RFID readers and software. These may be charged to loyalty programs each time a new user is added via a OneID authentication or operation; however, this fee may be waived if the OneID card was purchased in the merchant's store. Fees can be charged for filling out credit card information. Yearly maintenance fees may be charged for popular aliases, such as "Steve". Fees may be charged for each four NT or loyalty registration using the OneID mobile app.

Many other fee charging arrangements may also be made beyond this listing. For example, websites may be charged a flat fee to use a OneID login. Merchants may give customers a discount if OneID is used to make a purchase. Merchants may be paid for each OneID sign up, and debited the same amount for each OneID consumed a guarantee that they will break even. OneID cards may be provided in lieu of store credit cards.

Additional advantages offered by the OneID system may include a secure distributed repository with field based ACL, thereby providing 100% visibility on who can access information, and the ability to instantly revoke access rights for anyone at any time. Decoy records may be used at the repository. An out-of-band pre-approval process may be required in high-value transactions with a response interval. Authentication of off-line transactions using a card or alias may be confirmed using a mobile device. A smart QR code reader app using stored standardized fields may be used to read data.

The repository can be secure all of the time. Because the data is encrypted, it could be published without danger. Additionally, the endpoints could be more secure than they are now. If a thief were to break into a merchant system, all they would find is a list of OneID UIDs. All private keys can be encrypted. If a thief were to break into the OneID repository, all they would find is encrypted data and no private keys.

A PIN code may be required to supply an extra security layer. If a card is lost or stolen, a PIN can prevent the new "owner" from assuming the true owner's identity. Because private secrets are locked in a TPM module, the PIN unlocks the secret so it can be used for a limited time period. The PIN may also be used for maintenance tasks, such as deactivating a card, revoking and/or changing the secret key, authorizing new devices, or changing notification options.

Any registered OneID devices with a screen can authorize another OneID device for a user. Since peer to peer connections between OneID devices are hard, the system may use the device's public key pair to transfer credentials. To authorize a new iPhone device, a user may start the OneID app and deposit a request on the OneID server. Any of the other OneID devices can retrieve the request and grant the approval.

In one embodiment, the repository can track statistics between buyer and sellers. For buyers, they could get the number of times they were trusted by a particular seller, or the number of times they were rejected by a particular seller (e.g., bad credit card, credit card declined, etc.). For sellers, they could track the number of successful transactions, or the number of refund requests.

In a secure form-filling application, the customer may go to a website of an organization, including but not limited to, charities, e-commerce sites, political donations, etc. Using OneID, the sites can avoid problems associated with storing customer data (like the SONY problem) while at the same time making it easy for user to make donations or purchases. The site might not already have a customer's stored credit card information, so the user may click on the OneID fill-in button on the browser for local fill-in of information. This minimizes work the site has to do, and doesn't compromise security much (since if the PC isn't secure, a spammer can just load his site and extract all info). In response, the browser bar asks (1) whether to automatically fill in this info on this domain in the future, and (2) whether to also submit it for the current transaction. For example, a user can go to their bank URL and be automatically logged in.

From a technical perspective, the login button on seller's website is a simple hyperlink to a page within their own site that requires SSL client-side authentication, such as https://www.seller.com/login. Using the OneID client in the browser, it can do an SSL client side auth using a public key set based on who the user is currently logged in as. The status bar can show the user who they are logged into the browser as. The login requires a user's OneID and password. The webserver passes on the info in the certificate, which contains the OneID UID of the user and his current email addresses. These are matched to user records to find the user's account so he can be "cookied" for subsequent requests. If no account is found, the user can be directed to an account creation page to fill out which he can do with OneID. That account creation page also has a box for the user's OneID UID so that the user can authenticate unambiguously in the future even if his email address has changed.

In an alternate embodiment, the login button on seller's website is a simple hyperlink which has a challenge unique to the website (which the seller can change as often as they like or just leave static), such as http://www.sellercom/login?challenge=234232. If the OneID client is installed in the browser, it can request that URL from the server, and append the answer to the challenge based on who the user is currently logged in as. The client also appends the signed OneID certificate of the user who is logged in. All of this data may be represented by one long string which is passed, along with the challenge, to the OneID API to authenticate for the user.

The status bar on the browser can show the user who he/she is currently logged into the browser as. Logging into the browser might require your OneID and/or password OR PIN and/or NFC phone or OneID smartcard. These options can be configured by the user. The seller can use the OneID API to authenticate that the challenge is correct and that the credentials are correctly signed, then uses the OneID UID of the user and his current email addresses in the certificate. These can be matched to user records to find the user's account (by trying the UID first). If everything is verifying to be correct, the user can be logged in.

In an embodiment for logging in to a hardware device, such as a PC, a user can use a PIN code to authorize a PC to read the OneID device (i.e., a smartcard, NFC phone, or Bluetooth app). The PIN length may be chosen by the user. The OneID client can be installed in the user's browser, and may only be required to be installed a single time. When a user uses their computer, they can put their phone or wallet near the NFC reader. For Bluetooth devices, 30 ft. may be considered "near". The user can click the login button on any participating website, and they are instantly logged in. The user can also choose to optionally auto login in whenever visiting the site in the future. The browser status bar might show the current login state. To instantly log off all websites, the user may simply leave, taking their cell phone with them. The user might be able to set a desired delay period for the time-out, or auto log-off Instead of logging into each site, a user will log into the browser to activate his identity. The browser login can authenticate the identity of the user with the remote site. Once, logged in to a browser, the user can use the one-click form filling feature, use micro-payments done with digitally signed cash, and change the user's information all in one place. Off-line authentication will use the alias ("Steve") and a smart phone app to confirm. A wide range of plug-compatible secure "devices" (NFC phone, smartcard, Bluetooth phone app, etc.) can be selected by the user to hold their private key. The user can change various options and devices to fit each situation. Additionally, information can be released granularly, where a user is in control of releasing every field. Critical transactions can require approval without dissent by the user within a time window specified by the user. All transactions (authenticate, micro purchases, information releases) can take place between endpoints without any central dependency/bottleneck as is done in other solutions, such as Facebook, Minno, etc. Info that is released can be cached in the endpoints, and updates can be pushed to the endpoints from the repository.

Because using forms by sending the encrypted fields requested could be considered overkill, there may not need to be "super security" on the PC. However, if a spammer has a user's PC, he can send the user's information anywhere unless the user has required a PIN code for every new destination, even though this could be easily keyboard logged. Also, the massive programming changes on a site would be prohibitive.

Like PayPal, if a user knows someone's OneID, they can send them money. Similarly, users can pay bills if the biller lists a OneID alias on the bill. In one embodiment, the user can simply enter his/her OneID and the amount to pay the bill. Content providers may also benefit from certain features of the OneID system. For example, the system may make it easy for anyone to charge for their content by showing teaser text and a OneID micropay URL to get to the rest of the article. Content providers could also require a OneID to purchase shareware software, or may charge per minute access rates. Content may include online articles in online newspapers, blogs, etc., videos, music, charity or political donations, club event signup, and a payment mechanism for ActBlue, Evite, etc.

To deal with field name conflicts in a form-filling embodiment, there are a set of standardized OneID field names to minimize the amount of work a user must do to fill out a form. If a site uses a non-standard name, that name can be stored both globally and relative to the site. On lookup of a field, the system can look for a match starting from site specific names, ranging to the most general names.

In one embodiment, the OneID UID is an 8 byte word. The first 2 bytes represent the creator of the UID. The remaining 6 bytes are randomly chosen and checked to determine whether they are already in use. Therefore, each creator has their own name space.

If offline authorization generates too many invalid pending authentication and/or information release requests for a particular user, the user can optionally fill in a OTA field next to the OneID field. This situation may arise due to attacker executing a dictionary attack. The OTA is generated from the OneID mobile app, and the user can specify the TTL on each OTA. Then, the user can tell OneID to prioritize the numerous authorized requests.

Regarding warranty registration, a user may scan a card with the OneID app to read a QR code with a product name and serial number. The user may then fill in their OneID alias and mail it in. The user may also fill in their OneID alias, along with a two week OTA code and mail it to register.

Once a user gives a site their information, the site can, at any time, simply ask the OneID repository for all the keys or key. Values may be limited to those that the site is entitled to get, or the site may simply ask for certain standard fields, e.g., a ZIP code.

Because thousands of sites have implemented Facebook login, the OneID system in one embodiment may duplicate this, so if there is no client installed, it will use the method used by Facebook logins. The Facebook technique works from an Apple iPhone.

One problem solved by the form filling embodiments is that websites will use the same name and expect different values. For example on a login, some forms want a username, while others want an email. If the OneID system is not corrected by the site, it may use the official field values as defined. If the system is corrected, is may instead use those values on that domain.

Using OneID, sellers get a permanent connection to user's new email address, etc. if they change it. Sellers can have access to user's credit card info (if they allow it) so that their records stay up to date. Most sellers may compete with Facebook and other login services, and don't want to help promote them. Sellers may be granted access to trusted information about the users (e.g., how many "bad" things have been reported for the user by other sites). Multiple OneIDs can be hard to get, so if they use it to log in they likely aren't a spammer. OneID authenticates the user so they are less likely to be a spammer and more likely to be a legitimate user. If the user has the client installed and has a smart card or NFC phone, the user can be immune to keystroke logging, which is key for bank logins. Email and other information needed by seller can be matched, and multiple emails can be verified using a user's OneID. The interface is similar to Facebook's, and both API and end user experience are therefore easy to implement. Standardized field names may facilitate a larger number of fields, so the seller can learn more about the users. Users get to decide what they'll give to the seller, so the seller can ask for a lot of demographics. OneID supports micropayments on a seller's site if they logged in with a OneID. If a user has the One ID client, they can login even if OneID is down. All stored information can be very granular, so a seller can ask for exactly what they want to access. OneID provides everything sellers need to link to existing account or create a new one, including preferred screen name preferences. Unlike Facebook, there is no single point of failure. For example, the Facebook login is insecure, and is vulnerable to keystroke logging, phishing, bad actors at Facebook, attacker attackers who break into Facebook, and guessed Facebook passwords.

The software for OneID may be given to major banks to market. Therefore, banks will be enabled to promote OneID instead of competing with it. A common fee structure may be established so that merchants can accept OneID-authorized cash. For example, four fees may be used, including buy in, cash out, seller, buyer fees. Sellers typically won't care about who they are getting the cash from if the fee to the seller (and cash out) is a fixed percentage.

In one embodiment, the invoice may comprise the following URL: "OneID:pay?to=Amazon&amt=5.24USD&desc="USB 3.0 500 GB hard drive"&order#=23432423&jump=http://sfslkklfsklfaksflskdkfs". If an attempt to make the purchase fails, the browser can stay on the same page. If the attempt is successful, the browser can call that URL with signed copy of the invoice (without a jump). Then, the website verifies, tells the payment vendor to make the cash transfer, and delivers the content ordered.

In determining which micropayments should require a PIN, the card might only authenticate for the bearer if the bearer types in the PIN code either in the phone app or the integrated keypad on the reader, or in the browser. In some cases, that PIN is sent to the SmartMX. This is a two-factor authentication. One exception might be to authorize micro purchases (like a parking meter or a subway) so long as these charges are under some maximum threshold set by the owner between PIN authorizations. For example, the smart card will do up to 20 monetary transactions for up to collectively $50 without having to be PIN authorized again. Users might even allow the system to do some limited number of authorizations without a PIN. In one embodiment, entering a single bad PIN could cause the card to stop doing all authentications until the correct PIN is entered. Entering five consecutive bad PIN codes could erase the private key on the user's device. For smartphone, a PIN requirement could also be time based, such that the PIN-less authorization is disabled after 12 hours.

There are at least four options for the login process. (1) A smartcard on reader with a PIN pad, (2) Smartcard on reader without PIN pad where the PIN is typed in a browser; (3) if the user's phone's NFC has been set by the OneID app (which requires a PIN), just setting the phone near the reader is sufficient; and (4) A user may type a username and PIN in the browser plug-in—the username identifies the OneID key pair to use, and the PIN decodes the private key so it can be used. After using one of these four options, the user may then hit the login with OneID button, and the browser will instantly log the user in.

OneID is uniquely positioned to succeed with micropayments because websites are more sophisticated, consumers are buying content, and content providers e.g., NY Times, Washington Post, Wired, etc. are charging for content that was previously free. If a user loses their card and someone finds it, they may not be able to use it without a PIN. In one embodiment, five consecutive PIN errors will erase the private key on the card/device; however, the user can restore it from the client if it was saved with the user's private key in the repository (in encrypted form).

Smart cards can be used offline, and can be set using the client so it will only do a limited number of authentications and a limited dollar amount of transactions with a max dollar limit if a PIN is not present. This way, a user can use it on the subway, or to authenticate himself/herself at a hotel securely. If stolen, the use counters can quickly disable the card from authenticating. The private key can be recovered and restored from the repository if the user opted to save this with OneID. The user can be prompted with a prompt of their choice to recall their password. The answer can be the decryption of the private key. If answer is wrong, an attacker will be unable to decrypt the user's data. Generally, passwords should be strong. This way, if a user loses their private key because they didn't back it up, they can still access all of their data.

In one example, a user visits a doctor's office. The doctor asks if he can see the user's insurance card. The user can reply by saying "I trust you. I can give you access to all my data for 10 minutes. My OneID is Steve and I've granted 'DoctorMarcusWelby' universal access to my data for 10 minutes." In other situations, the user could restrict the doctor to just items with a "medical" tag. Alternatively, the user could have touched a phone to the doctor's NFC pad, and then hit "approve" on the OneID app to transfer the doctor the information requested. A QR code also be scanned, and then the user could hit "approve" to release the info requested by the URL.

Advantages to the OneID system include the fact that all operations can be peer-to-peer, so they are faster than other alternatives. There is no single point of failure. Login credentials cannot be guessed. The system could be immune to phishing because there is no username/password. The system could also be immune to keystroke logging because there are no keystrokes. The system could also be also immune to break-ins and rogue employees because the repository contents are encrypted and the keys are unknown to the OneID repository. If a smart card or NFC phone is used, the system is even more secure than an RSA key fob and more convenient since no typing needed.

Attacks may be detected. A SmartCard/NFC chip can be programmed with a one way counter that increments each time an authentication is done. Counters can be specific to a type of authentication, e.g., OneID web login, OneID purchase authorization, etc. By monitoring these counts, users and the system have clear visibility into whether a PC or mobile phone is compromised by an attacker on the PC/phone calling the authorization device.

In one embodiment, the OneID system may be used to register and vote in elections. A user may register their OneID with the registrar. The user may then go to the state website and click "login with OneID" and vote. Alternatively, a user may go to any other PC (you own or someone else's) and login with OneID to vote. After voting, the user may select to "lock" the vote, so that it can be permanently locked in and nobody can change it.

For making micropayments, a user does not need to be logged into the site to make a purchase. For example, an article has price and a buy button, e.g., 10 cents and a button that says "Buy with OneID." The user may click on the buy link and send to OneID a sellerOneID, a price, a description, a unique itemID, and a callbackURL. The buyer's client checks the purchase notification authorizations for the seller's claimed OneID. If the user confirms the purchase, then the buyer's OneID agent calls the callback URL and authenticates that the callback URL can authenticate the seller's OneID. After doing that, it either appends the buyer's signature of the money request, or includes it in the headers. The buyer also appends the OneID device name that made the request, and the purchase sequence number for that device. These are part of the signature, and they prevent replay attacks.

Next, the seller redeems the money transfer (after the OneID is authenticated on the transfer with OneID, and the signed money transfer is passed), and if the buyer has the required funds, the buyer's signature is good, and the seller can authenticate with the cash server, the transaction will be approved. The seller then delivers a signed receipt for the item number back to the buyer along with a URL for where to present the receipt to obtain the content or goods. The receipt also has an expiration date for the purchase, if desired. The OneID repository makes sure the public keys haven't been invalidated in granting the money transfer. Also, the buyer is pushed (or can pull) a receipt of the purchases from all devices associated with his OneID.

For micropayments, the OneID paylink is simply a URI of the form "OneID: to=GreatPics&amt=5.00USD&desc="Rome picture"&itemID=23423423&itemURL="http:// . . . " Using a unique item ID prevents double purchases. The client can do a mutual authentication, and if it is OK, it will generate a signed payment that either includes that as an argument or in the request header when it calls the item URL. The Site will try to cash in the signed payment, and if it is successful, the Site will deliver the goods and send receipt to the buyer. If not, the Site returns an error page. Since the client (iPhone app or browser plug-in) is linked to OneID, the client's cash balance and transaction log will update to reflect the new transaction. The Site can't use the browser's request to see if OneID is installed, since might be on a smart phone. This is why a separate "Buy With OneID link" is used.

A micropay proxy may be used so that anyone can be able sell content without having to modify their webserver. A proxy can handle most of the heavy lifting on behalf of the customer so that the system works as normal, but the URLs provided are at the proxy, rather than at the seller. The final content is on the site, but in a secret location, such as search results of a news archive, or large images corresponding to thumbnails on an adult website. In one embodiment, each web page is encrypted using a symmetric key.

In one particular micropayment example, a user can buy an article on the NY Times, and they should be able to come back to the article repeatedly and not have to pay. The big question traditionally has been, "who remembers the purchase?" This has traditionally been the site because there was no mechanism for the buyer to do this. OneID keeps this convention because the purchase that is made can be complicated, (buying three articles or one hour of access). The site needs to remember each buyer's purchases. Since the buyer can be identified by their OneID, this is quite easy. Attempting to purchase an item that the OneID system already has access to is also easily detected. The seller simply never cashes the cash requested if the buyer has already purchased the item. In addition, all the receipts are stored in the repository and pushed to all clients. If a client tries to buy an item for which he has an unexpired receipt, it is treated as already purchased so that there is no user confirmation required. The buyer simply presents his signed, unexpired receipt for that item to the seller. To buy hourly access to all content, the transaction may give the content the same item number and issue a receipt for that item that expires, for example, in one hour.

To make micro-payments, a user may set confirmation preferences on purchase links on a per OneID seller basis. This will silently auto confirm purchases if they are below the user's thresholds. The user can change the defaults at any time. For example, the user may set preferences to require confirmation for purchase amount over a threshold dollar amount, cumulative purchases for a day, or week, over a threshold dollar amount, or a total number of purchases over a threshold number.

When setting purchase limits, the user can see everything about the seller's OneID that he has authorized for public viewing. This may include the date the seller joined, how many times the user has logged into the site before with an alert for zero, the name, address, phone, etc. of the seller and whether OneID has validated the seller's identity (e.g., is this the real Amazon, or another site with a similarly spelled URL?), the seller's domain name and whether the domain name is validated by OneID, the number of transactions made, the number of refund requests, the buyer rating of the seller, the buyer's comments with the buyer's OneID (good and bad listings like ratings), and the number of OneID identity-validated accounts who recommend the seller.

For pornography sites, the limits may be high to make browsing convenient. Such sites can then make all thumbnails free and conveniently charge on a per image basis for content. Sites can also charge for an hour of access or for 10 days of access or "buy 100 images for only $1". Those deals are managed by the provider; the client just filters the payment request notification threshold that require manual confirm. Buyer doesn't have to worry ever again about unauthorized charges on his credit card from companies like CCbill.

In the micro-payment context, the system may provide for "no questions asked" instant refunds. The system can terminate the charging privileges of any vendors with a high rate of refund requests. If a user uses a refund request, either in volume or amount, the system can limit or terminate the user's privileges. This feature may work best with soft goods due to the refund policy.

The OneID will work on a platform; however some platforms may require a login for use. A logging operation may begin with the user clicking the "Login With OneID" button to access oneid:login?http//site.com/oneid_log-in.htm. The OneID client then does a 4-way mutual auth with the server (using SSL client auth) and gets back a URL with an OTP to call to login. The OneID client then passes that URL back to the web server, which makes the request and is given back a session login cookie along with the just like is done now with a standard login. Just like micropayments, if OneID is up (which is usually the case) the person can see the validity of the site he is logging into before he hits the login button. This eliminates phishing attacks. The user can say "trust this site in the future and log in without prompting when I hit the "login with OneID" button on the site. Statistics for the site include how many times the user has logged into site before. This feature prevents phishing from "look-alike sites." Site statistics also are available for this device, and globally for all other user's devices (via the counter in the repository). An alert can be triggered if the OTT has already been used.

The OneID system provides authentication, and the random challenge-response should be part of the same connection, or all the authentication should fail. Because some smart phones don't do SSL with client auth, the OneID protocol has to deal with that case. A lot of sites that a user may log into do not use SSL for performance reasons, e.g., Facebook, LinkedIn, Yahoo mail, etc. Therefore, the smart phone app/browser plug-in could do the authentication handshake within a single TCP/IP socket in order to get the authentication token from the site using OneID credentials, e.g., SSL client-server auth or equivalent ("keep alive" http would work).

One key feature is that a user cannot simply buy stuff, give refunds, and then change their identity to repeat the process over and over again. If a user enables charge privileges, the system makes sure that the user is a real unique person that the system has never seen before. For example, the system could determine whether a credit card address matches an address on file, whether the DOB matches birth records. The system could also send mail to a user's physical address, require a credit card, bank account, corporate email account at a trusted domain, send an SMS verification to a unique SMS number; use Facebook and/or LinkedIn verification, or use some other type of verification by people who can vouch for the user.

In the context of a loyalty charge card, a user may swipe the OneID universal mag stripe/barcode/QR code loyalty card to get loyalty credit, and charge a purchase at the same time. In some transactions, no PIN or signature would be required. Swiping the OneID card will automatically join the loyalty program if the user wasn't already a member. This feature can be disabled, requiring a phone transaction, or something similar to join the program. Merchants who agree to support the OneID card also agree to distribute it. Credit cards are stored in order of preference. The store chooses the first one on the list they accept, so a user can put their credit cards in their preferred order. There is a special provision for HSA cards.

Using the OneID card as a loyalty card offers benefits to the buyer. Buyers authorize each new store location once. Someone who finds a user's phone does not know which stores have been authorized, and thus does not know where to use it. Any swipe requiring a confirmation done without a confirmation will disable the card from use anywhere until the card is re-confirmed. Therefore, it will be instantly disabled on first abuse. Additionally, a POS system should display a picture of the authorized card holder when card is swiped. Purchases are faster and easier because they require only one card to swipe and no signature or PIN number if it is used a preauthorized location. A single card works for RFID, mag stripe, QR code, and barcode readers. Furthermore, reward points can be managed from a single app, and a user is not required to fill out a form to join a loyalty program.

Using the OneID card as a loyalty card also offers benefits to the seller. Higher signup rates to loyalty program may result because users are not required to fill out forms. Customers can be tracked even if they move. Card printing expenses are eliminated. Customers are happier because only one card is required for multiple loyalty programs (the seller does not have to convince a user to carry yet another card). Because multiple loyalty programs can be tracked with a single card, sellers may cross promote to users.

The OneID system allows users to specify an alias for their UID. For example, an alias may be "Steve", "SteveKirsch", "StevenTKirsch", "StevenTKirsch", "stkirsch", or "spamguy", "Kirsch@propelhockfield@mit". In one embodiment, an alias does not include spaces, and case does not matter. Popular aliases, including common names, may cost users more money. An alias may be changed at any time, and the old alias may be auctioned to the highest bidder, eliminating poaching incentives that plague trademarks. Generally, only one alias is allowed per OneID, which gives more people a chance to use their preferred alias. As a default, free accounts will use the user's primary e-mail address as the alias. For paid accounts, a user may choose a second alias, such as their twitter name. Also, paid accounts may be allowed to use shorter numeric aliases such as "123", making it easier to enter an alias on a phone.

Using current solutions, banks and financial institutions require multiple passwords for authentication. For example, the Silicon Valley Bank requires three different passwords using three different methods. It is secure against keystroke logging and screen captures, but takes more than 60 seconds to complete the login process. This is prohibitive to most customers.

In order to use a OneID card when the system is off-line, certain information may need to be stored on the card. Any remaining information can be stored in encrypted form in the identity repository. Information that may be stored on the card can include a cash balance, a list of unsynched off-line deductions and reversals, the OneID alias, the OneID UID, the name, addresses, phones, emails, pictures of the user, a list of the user's top three preferred credit cards, and an ECC key pair. Other information may be stored on the OneID card that is not listed here.

In order to keep data available within the repository, data may be distributed. For example, the system could spread data over 10 machines in 10 different data centers, with each item replicated 3 times. Non-sensitive data may be stored on partner servers. Sensitive data is kept in the OneID repository. Although the fieldname is obscured, a byte determines 8 properties of the data, e.g., that it is "sensitive". If the system detects that a large amount of sensitive data is being accessed at a time when it shouldn't be (e.g., at the billing time for that customer), access is cut off so security breaches are eliminated.

To implement the OneID smartcard, BasicCard is a very cheap option, with a small amount of RAM and built-in ECC. This is sufficient to store "basic info" on the card. It is also a cheap development system and based on SmartMX. NXP SmartMX is an industry compatible path and is programmed in Java, and thus very compatible. To facilitate payments, ClearXchange may be used. This is like PayPal, but run by the banks themselves without fees. Therefore, money may be sent person to person using their email address or cell phone as a OneID proxy. OneID adds value by authenticating the sender. One advantage is that even if the user's computer is hacked, and the attacker knows all the user's passwords, OneID will deny the attacker access to make a transfer. OneID requires a PPA for any clearXchange transfer that goes to a person that the user hasn't already sent money to before. The PPA is required if the user sets up their account to enable this and, and consequently it cannot be easily reset. The money transfer can be sent via the web, or it can be done with a phone call, giving the person an OTP which has a PPA endorsement.

In yet another embodiment, authorization by personal presence is added. Authentication includes verification that the person requesting the transfer is really the person, even if the persons computer has been hacked and is controlled by an attacker, including watching a PC screenshot, and keyboard logging every username and password of the user. The OneID guarantees that the transaction was initiated by the person, and not by the hacker even with complete control of the PC. Personal presence authorization may use an NFC reader with a OneID button or a cell phone without the button.

One thing an attacker can never do is physically move something. Personal presence authorization (PPA) is an authentication request that only gets processed if the user hits a button on the reader. Once a party asks for a PPA, no more cryptographic authorization occurs until the button is pressed; all subsequent transactions are blocked.

A PIN may be used on a computer to verify that the computer can read the OneID card. The computer can store the PIN away. Therefore, in a browser plug-in, a user could enter their OneID and PIN to "log in" to the browser. A user can put their smart card or cell phone near the reader (or it has a TPM chip). For any significant transaction, the button may be required to be pressed before the transaction happens. The button is directly connected to the reader and is sent to the smart chip on the phone or card in such a way that software on the PC can never send that. Therefore, a single button on the reader provides a large amount of security since an attacker can never physically press it.

In embodiments where hardware NFC readers are used, the NFC reader can be integrated into the keyboard to save cost and save a device. The NFC reader could have a button or a capacitive sensor for PPA authentication. For example, the Reiner reader could be used: a user slides their card. Other less expensive NFC readers also exist, such as the ACR 122. In one embodiment, an NFC reader is used with an integrated single key for PPA where the button sends it to the chip in a way that is different than by software.

Cases exist where a requester might ask for a PPA. For example, a user may log into a new site they have never been to before, transfer money to someone they have never transferred money to before, change (add or remove) a notification or approval device, create a new device, change the type of transactions that require a PPA (a user may tell OneID to require a PPA for all micropayment signatures), change PPA parameter, like timeout (within reasonable limits, e.g., 2 seconds to 60 seconds) or whether to shut down until the button is pressed. and/or log into a sensitive site like a bank.

Secure approvals may also be used. If the user does something sensitive like make a large money transfer to someone they have never sent money to before, their financial institution should require "secure approval." This means that the system may push notify all notification devices and wait at least N hours for a denial, or until at least M notification devices have approved. This means even if an attacker logged into the user's bank and tried to wire funds, the attacker would fail. Alternatively, a user can allow it to be approved by any single device other than the one initiating the change. Thus, to approve a new device, the user may need two existing devices to approve it, or just use one to approve it and wait the preset interval.

Several cases exist where a secure approval may be required. For example, the user may change (add or remove) a notification or approval device, create a new device, change time limits for waiting for authorization, change the minimum number of devices required to approve a "secure approval," and/or change the number of devices that can concur to short circuit the wait time.

A PPA request is a standard authentication request, but the challenge sent can start with "PPA", which is a signal to the authenticator to require personal presence before authenticating this transaction. Personal presence means the button could be pressed after the request is received and within a certain time limit that is configurable. The user can also configure whether all subsequent transactions after a PPA that times out should be denied until the button is pressed. The time limit and subsequent request handling is all stored in the smart chip and can only be changed on a request that is confirmed with a button press within 10 seconds after the change request is made. The reason for the authentication request is shown in the client, .e.g., new website, bank website, money transfer, micropayment, info transfer, and/or the like.

The OneID system may operate using a protocol. In many cases, there is a OneID app running in the phone or on the PC. In one embodiment, the browser plug-in for Firefox, etc. links to the application. This way, the plug-in can show the user exactly what authorizations are happening and show the user if a PPA is being requested by any application on the user's PC (rather than just for web applications). Therefore, it looks like there is a lot going on in the plug-in, but it's really just a GUI front-end to the underlying app on the PC, which can be called by anyone (e.g., programs). For smart phones it is similar. The OneID app is a separate app and any app on the iPhone can use it since it calls the protocol and the callback is a URI.

In our system, OTP are more than just passwords. They can be configured any way the user wants. A OneID with a OTP is very powerful. For example, it can be used to log the user on, or only used to give information to a specific person. User options for generating an OTP may include (most of these are used simultaneously): length, type (computer generated (numeric, alpha, or base-64) or user specified), maximum of N allowed uses (this is not really a "one time" password" if this is greater than one), limitations that the transaction could be less than a dollar amount, whether a regular authentication is used, whether a PPA endorsement of the authentication is used (i.e., is this a significant transaction like a money transfer or change of notification options and can only be generated by a human?), information permissions that can specify which fields or categories are allowed or give access to all categories, e.g., health, contact info (name, address, and email), financial info (credit cards), absolute expiration date/time so the OTP has to be used within a time window (this is a strict requirement; it is not an "OR" to the other clauses), relative expiration time (so it can expire 5 minutes after first use), the specific OneID of the receiver (so the information is encrypted with a symmetric key that is encrypted with the receiver's OneID public key so only they can read the info and make use of the info so even if the OTP is used by an attacker it is useless; if this is not specified, the first person to make use of it wins, e.g., you are saving time typing in the OneID of the receiver since you know nobody is going to overhear you give the number; however, if the user fills out a form, the OneID of the receiver is great because it means that the OTP is useless to someone who sees the user fill out the form), whether it can be used only for the OneIDs of the first N OneIDs to cash in the OTP, for public terminals, whether a user device should generate an OTP with all rights to everything, but a limited time window, or if the user is just visiting one site, they would just give it power to authorize just one site.

A user can have as many OTPs outstanding as they want. This means that they can carry a permanent full rights password for use on machines they trust, and a one-time use expiring password on machine that they do not trust. A user can combine restrictions; for example, an OTP can expire within 24 hours, or within 5 minutes of first use, whichever one comes first. The OTP generated is just a key in a hash table (the key is the OneID OTP). The ACL and signed permissions are stored in the OneID repository, and then after it has been accessed, the key is erased. OTPs are rare and are usually user-generated, so requiring a PPA endorsement before it is used by a receiver is generally desirable. OTPs generated using a confirm key on the NFC reader can be tagged with the PPA endorsement. OTP passwords can be configured to be just a static password of the user's choosing by making all rights infinite, and by specifying that the user wants to set the OTP string. Therefore, the user is in total control of the security vs. convenience tradeoff In one embodiment, a user should only store their private key in specialized hardware such as a TPM or NXP SmartMX. With OneID, if a user has authorized multiple devices, each with their own public key set, there is no need to keep a copy of their private key. A user should have a PIN associated with that device to convince it to do authorizations for the user, so if a user loses their card, someone can't pose as the user. It's best if the PIN pad only shows the PIN to the secure device and nothing else, e.g., integrated into the reader. The card should erase its private key after a few invalid PIN attempts to prevent anyone posing as the user. An NFC reader should have at least one button that the smart chip can read. This proves a person is there so a user can do PPA, which prevents an attacker from using the secure authentication device to perform actions. A PPA may be required for any sensitive transactions, such as adding or removing a device, adding removing notification device, or wiring money to untrusted locations. The system can generates the key pair on the user's machine, and if the user wants to bank one of the encryption key pairs, the system may symmetrically encrypt the pair before sending it to another party with the answer to a challenge. A device can use two keys: one for signing, the other for authentication. If a user does not do any of these, the damage is still mitigated due to the delayed approval process for significant transactions. If a user believes their account has been compromised, e.g., an OTP has failed; the user may take steps to invalidate the keys that have been compromised.

The user will be referred to this checklist in the client app. There are various traps, like transaction sequence numbers for each encryption and authentication, and each device gets a transaction history it can check for duplicate sequence numbers or sequence numbers that are far in the future or in the past. These should be flagged to the user for a "one-time" acknowledgment.

Sensitive transactions like bank transfers of money out of your account can be delayed. These transactions may be posted to a user's OneID, and pushed to all of the user's notification devices. Any single device can cancel the transaction. There is a wait period to allow the cancellation to happen. The wait period is user settable and can be changed at any time (as long as the user waits for the current wait period).

If a user keeps a backup encryption key pair copy in the repository, a long password should be used with a time lock it, e.g., 5 minutes past the hour. The time lock should be a time that only the user would know and will not forget. The repository will notify all the user's devices of all attempts to get the backup key. Each attempt costs $1 and should be paid from a PayPal account that hasn't been used more than once for this purpose. This keeps the attackers from spending all day trying to knock on this door. Interestingly, the repository never knows if the user got the right answer. Only when the user uses the key to decrypt your data will the user know. The repository just decrypts the keys using the answer provided by the user. For the user's security, the repository purposely doesn't know if the answers are correct or not. A user is not allowed to back up their authentication key pair (there is no need, and it's a security risk). But the user can provide multiple security questions and answers. The user only needs to backup one of their encryption key pairs. That is sufficient to recover all your information. Then, by proving that the user can respond to the authentication challenges they set up for their account (e.g., verify at least three of SMS, email addresses, phone numbers, answers to security question(s)), OneID will sign the signature key pair that the user just generated for their OneID. Adding or changing a question is a secure operation and requires PPA and a secure authentication method. If the user cannot authenticate, he/she will need to create a new OneID UID. If the old one is not paid for, it will be removed (which is undesirable for you since it will look like a new person to all web sites, banks, etc.).

In one scenario, an attacker takes over a user's computer, and lurks until the user is going to do something requiring an PPA. The attacker then uses the button push to log into the user's bank and wire all of their money to an associate. The attacker hopes that the user thinks it is a bug and the just PPA failed. The attacker hopes the user retries their transaction before the bank logs him/her out. Then, the user uses the second PPA to authenticate the bank transaction. At this point, the attacker takes over the browser client so it displays the user's transactions and not the attacker's transactions. To defend against this attack, the user may set notification preferences for wires to people they have never wired money to before to: (1) require confirmation on two different devices; (2) notify all devices, and/or (3) wait a time period, such as eight hours (or until three devices have approved the transaction).

In another example, a company such as Apple asks the user to enter their AppleID and password. However, the user is confused about their iTunes ID vs. their AppleID. Unfortunately, Apple didn't give you an option to log in with your OneID. The user may just enter their OneID and use their phone or computer to generate an OTP created for authentication. Then, the user may enter those in the username and password fields.

In another example, Apple will first try to look up the login as an Apple account. If there is no match it will look up the login using OneID. If it finds it there, it will find the account associated with the OneID and log the user in. Note that there could be a name conflict, and that this still works, since it is only required that the username/password combination be unique. For example, Steve/23432 might log you into SteveK, whereas the Apple user Steve/Jobs will log into account Steve. OneID will notify the user of the login in case someone tried to steal their account. Usually this is just in a transaction log the user can review unless they chose to be notified, e.g., "notify me whenever someone logs into Wells-FargoBank."

To address the problem of spam, OneID accounts cost, for example, $10/yr., and every attempt is made to limit accounts to one per person. Each OneID has a spam complaint counter associated with it. If a user wants to zero their spam counter, it costs, for example, $10. Since everyone has a OneID, it becomes reasonable to require that every incoming email be digitally signed by a certificate issued by OneID using existing S/Mime methods. Requiring use of the OneID signature is critical because unlike a normal digital certificate, OneIDs are (1) relatively hard to get and (2) the system is able to track the spam reports against that One ID. The email client has a plug-in that displays a spam button and can report the spam complaint against that OneID sender back to the OneID authority that issued the OneID to that user to increment his spam count. Abusive reporters are ignored which prevents blackmail attacks on legitimate senders. Legitimate bulk senders pay a fee and receive a perfect reputation so long as the complaint levels are within normal limits. The receiver sets a threshold for what sender reputations are able to get into his inbox. The reputation evaluation is done when the user accesses his mail so that the user gets the benefit of prior reports. If everyone uses this technique, and everyone reports spam, and everyone has a spam threshold of 10 complaints, then a spammer has to pay around $1 per message to get his message out, making it completely economically infeasible to send any more spam. Since the spammer doesn't know which receivers are filtering email by signature, the spammer has to sign all his messages to be safe. Therefore, the mail server can look up the reputation of the sender and filter out unwanted messages before even reaching the client.

Another way to solve the spam problem even more simply is to charge a fee for every relationship certification issued by OneID between a sender and receiver. Each proven new person (registered at a bank or notary) gets a finite but large set of, for example 500, free relationships. After that, relationships cost a fixed fee per recipient, or each receiver sets the fee for a relationship. Notaries or banks may be used to validate the OneID is associated with a real person who has proven their identity and not already in the system.

In yet another embodiment, the best solution is to establish a fixed fee for each one-way relationship established. For example, if Steve wants to email Bob, Steve should purchase (for a small fixed fee, e.g. 10 cents) a OneID mail certificate, signed by OneID that never expires this becomes a zero sum game where the proceeds of the certificate that are credited to the receiver won't work because spammers will sign up for all sorts of Amazon, etc. mass mailings and drain the money out of legitimate retailers to pay for sending spam. Therefore, if a user clicks "spam," OneID can collect the fee, split it with an ISP partner, and revoke the certificate.

The recipient can specify a permanent revocation of the certificate so that he can never be bothered by that mailer again, or simply choose, for that sender's OneID only, to specify a higher than normal fee to get a new certificate, or require that a one-time use certificate be purchased for each mail sent at a certain price. The sender can then decide whether to pay the new one-time or per use fee that the user demands, stop mailing the user, or simply mail the user less often. Since OneIDs are hard for people and companies to get, a company can't simply just use a different OneID to bother the same user for the default price. This provides a huge amount of spam control for a user, and legitimate users actually make a profit. However, all the "credits" are kept inside the system, so spammers can't cash out (which reduces the incentive for gaming). In order to bootstrap adoption, the system can specify that mail without a signature is handled the current error prone way. Email with a signature is handled the new way. Therefore, for best delivery, users should attempt to purchase a certificate for everyone on their list, and OneID will only charge the user for people who have opted in. This way, everyone at Yahoo, for example, can be opted into the system since there is no downside. Companies like Yahoo like being on the leading edge. The SMIME can be stripped before delivery and replace by a notation that Yahoo checked the security.

In yet another embodiment for combating spam, because the relationships are purchased from OneID to OneID, a user will never want to switch their OneID since they will lose their investment. OneIDs are relatively hard to get; users should prove that they are a unique person. A spammer cannot sign up millions of people a day like he can now. The system can just add the OneID-OneID certification to the existing certification that the user is now using when they send mail out. Therefore, a user only has to hash the content once. If someone cancels a certification, and a user mails them again, the cost for that certification goes up by a factor of two. So, it gets exponentially more expensive for someone who a user doesn't like to keep mailing the user, which gives the sender a huge economic incentive to take the user off their lists. The certifications expire in a year, which also means they won't keep mailing people who never respond.

Unfortunately, a lot of senders will gladly pay $0.10 to reach a user just once, since that is less than the cost of a postage stamp. This was the problem with Goodmail. To avoid this, the higher your complaint rate, the system can (1) cancel all of a user's certificates (2) make new certificates twice as expensive to buy, and/or (3) limit the rate at which a user can buy certificates. Mailing rights are only sold to companies that are not "fly by night", i.e., just created. The system can also "test mail" a random selection of the recipients to see if they approve of the relationship before the certifications are issued. Therefore, a user pays a fee up front for the system to validate their list based on the size of the list. If the complaint rate of the random sample is high, the user loses their entire investment. Otherwise, the system can turn them all in to certificates for the user. This avoids any complaints from users, even the first time. Companies like Yahoo will love this, since it should reduce spam, yet allow legitimate senders to have an incentive to clean up their mailing lists. Sender likes this because their email can be marked a legitimate rather than as potential spam.

The OneID solution for spam includes a bonded sender, an acquired by return path (that basically says that the system should let through anything from these IPs), and Attention Bond Mechanism protocol such that recipients can claim the bond (which means spammers can set up accounts and get money that way), and/or recipients sending back a challenge.

Major transaction types include a login/authenticate transaction. This may include an input (OneID of site, SessionID, Callback URL) and an output (call callback URL with user signed {SessionID, userOneID}tacked on at end of the URL). Also included are information transfers. These may include inputs (SessionID, OneID of site, Info Requested, Callback URL) and outputs (call callback URL with user signed {SessionID, userOneID} and information so that the site can associate the account with the OneID). Also included are money transfers. These may include inputs (SessionID, OneID of site, Invoice (part #, desc, amt-currency, billerOneID), Callback URL) and outputs (call callback URL with user signed {SessionID, Invoice, PayerOneID}, which once received, Site signs it, uses https to OneID with the { } and both signatures). If money is in the person's account, the receipt is stored in the repository and pushed to OneID clients of the buyer so the buyer can see how much he has left in his account and where all the money went. Each of these transaction types can be accomplished using smartphone or web browser. Login/authenticate never relies on access to repository, but if there is network access, the repository can tell someone the reputation of that OneID after authenticating that the remote OneID is authenticated. Mutual authentication of OneIDs protects both parties. Authentication of the user is done with the signature of the input, so the plug-in/app just authenticates the remote site. Generally, https://callback URLs are preferred for security reasons.

Form special fast cash transactions, such as parking meters, subways, vending machines, etc., no Internet connection is required. Only OneID devices which are permanently secure (such as non-reprogrammable SmartMX) are eligible for this type of transaction. OneID loads cash, and there is a protocol for anyone who is approved by OneID for withdrawals. This can extract funds as well as post reversals (up to the amount they withdrew). The card keeps a list of transactions. An LRU cache of transactions are on the card, along with current balance. Payment is only made if the biller cashes in his signed IOUs. Companies with high complaint rates are terminated from the system, e.g., who extract more than they should. Cards are reloaded when connected to the Internet, but can auto reload themselves a certain number of times depending credit risk of the person.

Regarding the OneID reputation system, "OneID verified" means that a user really is "Bill Gates" or "Amazon". Otherwise, the system rates OneIDs on trust with, for example, a 5 star rating system. A user gets more stars if they have been around for a long time with lots of positive feedback and very little negative feedback (like eBay). A ratio is not used because ratios can be gamed with lots of phony accounts.

In order to prevent phishing attacks, a login and password are not used. Attackers can still phish for a credit card, but there are three protections in OneID. First, credit cards are marked as sensitive. Sensitive data is only transferred to people who OneID trusts (with a signed trust level in their certification). Second, users can see the trust level of the seller before he releases the information. Third, the release of trusted data can require a PPA by default (but the user can override this if he/she has approval by more than one device). This will likely reduce the chance of something bad happening by at least two orders of magnitude.

If a user private key is compromised or lost, each of the users OneID devices has its own unique friendly name, and its own unique public key pair, because some of the user's devices may be insecure (e.g., your PC has a private key encrypted with a PIN). The private key is written once and destroyed. It can never be read. A user can just create a new device, then use one of their existing devices to confirm that the new device is theirs using a secure confirmation method. The entry will be replaced for the friendly name with the new public key. Therefore, if an attacker succeeds in making his key the official one, the user will know immediately since their key will stop working. Since the user will have older OneID devices than the attacker, the system can tell who is the real owner and who is the attacker.

In one embodiment, a user can set the same PIN code on all of their devices, or a different PIN code on every device. This configuration is their choice. In order to change a PIN, the user needs to enter their old PIN. After a certain number of failed attempts, for example five, the private key is erased. In addition, each OneID device has an administrator PIN used to change the user's administrative options (like PPA approval, or number of invalid PIN requests before a card is wiped). This should be different than the main PIN. If the user forgets the administrative PIN, the user can restart the device from scratch.

If a user loses all of their devices, the user's data in the repository is replicated four times in four different geographies. The user may just enter their OneID and answer their security question. In one embodiment, the system may charge $1 per guess sent via PayPal. This keeps the spammers from spending their time on the OneID site. Also, the price keeps going up by $1 each time a wrong guess is attempted within the same day. A user can have multiple security questions for $1 per attempt. The system will also not tell the user if the attempt is wrong. If it's wrong, the system will give the user a private key to unlock decoy data.

If a user forgets their OneID alias, the user may send the system an e-mail from any of their email accounts, and the system can email the user back the answer. The user can also send the system a text message from their cell phone number on file with the system, and the system will send this user their OneID. Generally, a user can't call in since the caller ID can be forged.

The following can be characteristics of data in the repository. Since each of the user's devices has a separate key, the repository stores the key for the master symmetric key in the database encrypted with the user's key. The repository will decrypt and send information to the user so that only the user can read it. This works using exactly the same way as giving information to a third party works. The repository may also have permissions that are bitmapped (read, write). Only owners can give out ACLs. For Read operations, the requestor can read the value; for write operations, the requestor can write the value. These are orthogonal, so a user can allow someone to write a value, but not read it. The ACL is signed with the private key of anyone who OneID has certified owns this UID.

The repository uses a key, value layout. There is one data file for each OneID UID. The file format is [key:value] pairs of [FieldID:Value]. The FieldID is the field name of this field encrypted with a symmetric key specific to this field that was randomly chosen when the field was created. Field names are used with dots to do a hierarchy, for example, Home.Phone: 5551212. Values are comprised of the value of the field encrypted with the same symmetric key.

Any transaction for accessing a user named Joe's data within the repository, for example, the UID of Joe could be comprised of: {access rights, (fieldID, encrypt(field decode symmetric key, Mypublic key), (fieldID.sub.2, decoderKey), . . . }. There is no need to keep signatures, since OneID wouldn't put them in the database if they weren't signed by a key associated with the UID. This data never goes outside the database. The ACL can be supplied with the request or be waiting in the database.

For data at the repository, it would be ideal to keep the ACLs off the main server and distribute that responsibility to the client. The issue is if a user re-keys the data due to a compromise, the repository would need to generate new access keys for everyone. Without the ACLs available, the repository does not know which keys it has to generate and for whom.

In an example, a data pair owned by OneID UID 1234 may be used. The first name of the user could be "Steve." The person who first creates the field picks a random symmetric key (e.g., "456") and encrypts both the field name and the field value with that symmetric key. Therefore, the data in the repository will be stored in a file (or database record) named "1234" with a value of 234df: 23423maskf223. Then, a client who knows how to decode the data (because he created it) will take {234df,456} and encrypt that with the public key of the specific OneID device that the user wants to give the data to. The user also creates an ACL listing all the field names {234df, 2ojdf, . . . }, read/write/share, and signs that entire ACL listing with 1234's iPhone private key. Then, the user passes the ACL to the repository. The repository verifies access rights and gives us the values of those fields. Ideally, each of the owner's devices to have separate unique key pairs, but the public key and his OneID UID are signed by OneID, so that each device authenticates as the OneID UID even though they use different public key pairs. This provides the system with a lot of flexibility. A user can lose a device, and the repository never has to send a new device that user's secret key. If the user's secret key is compromised on one device, the user can look-up the public key of the compromised device and put that public key on a stop list. Every user should periodically tail rsync the latest stop list.

In a worst-case scenario, a user loses all of their devices. The user can answer a security question for a dollar cost per attempt. If the user gets any of their questions correct, the answer is used to decrypt a symmetric key that was left for the user (each answer generates the same symmetric key). This symmetric key is then used to decrypt a table of FieldID: (symmetric key, access rights) for that field that was left for the user by the owner.

For form filling applications, such as political and/or charitable donations, organizations may want to make it as easy as possible for existing customers to donate but don't want to store credit cards. They may want to make process painless for new users, while making it secure. A OneID solution includes adding a "Secure Fill-in with OneID" button. Also, the system may allow a user to enter his OneID and an OTP in lieu of filling out the form (boxes could be shown for that). Form-filling candidates may include e-commerce sites, political sites, charitable sites, event registration, EventBrite, and/or Evite.

When using OneID on a public computer, the OneID buttons are really JavaScript in the page which will, if the client has the plugin installed (or it is a phone), do the OneID method, or else it will redirect to the OneID proxy service that executes the transaction in HTML as the client does (kind of like Facebook connect). If there is a browser client installed and NFC reader, the user can login with their OneID and PIN and use the credentials of the phone or card. Alternatively, if there is a browser client installed but no NFC reader, the user can login with their OneID. They may select the option to provision a new device. On their OneID phone app, they can approve the new device, but with a time limit. It will self-destruct at both client and server after that time limit, but only one self-destruct is sufficient. This guarantees security. Finally, if there is no browser client, the site will redirect to a helper site (like the Facebook login). Therefore, the user can enter their OneID and a time limited OTP with full rights. The site mimics the browser plug-in. The OTP can be a password that the user has previously set up.

Generally, a user cannot guarantee both availability and correctness simultaneously. For example, financial fields (such as cash balance) are done for correctness, so at least three of the four servers should be up to update financial information. The requests are temp-failed until that is true. Almost everything else is done for availability. Data is written to at least one place, and if other sites are down, the update request is queued. An old date code cannot override a newer date code. In that case, the source updates from the oldest date code.

In one embodiment, a mobile app or browser plug-in can use the OneID method. The app gets control when user hits the "login with OneID" button and passes in URL to call, which typically will contain a unique authID. The authID is like the SessionID, but it has limited abilities and only the remote server knows the mapping from authID.fwdarw.sessionID, not the OneID app. It allows the server to connect the OneID session to the user session. Next, the app opens a socket to the server calling the URL supplied, and initiates the OneID operation requested by the site (such as login). A login request will do mutual authentication all within that same socket connection (it will not try to encrypt the authID to prove its identity since that is not sent over the same channel; it should do the entire mutual auth within one socket pair). The device can display progress information and reputation of the remote OneID to the user. The app resolves any exceptions with the remote server and does any fancy "Post" operations (like posting the name, address, and e-mail, if this was an information request over the secure channel that was set up with https, and/or using HTTP keep alive to do the back and forth) as per the request type the transaction started with.

When everything is complete, and the remote server is ready to provide access (or has gotten the information securely), the webserver returns the URL for the OneID app to use to call the server (the welcome back page) typically with no arguments appended at all. This is because the remote server has all the info it needs before that URL is even called, and already associated it back the original SessionID. Safari loads that URL as it would normally. Therefore, the user's credit card info, etc. never even appears on any form. Instead, it is just sent in the background to the site and associated with the session. The remote site can communicate with OneID to do things during the conversation, like tell OneID when the user was last logged in, etc. It normally ends the conversation by instructing OneID to "transfer control to Safari and tells it to load this URL". That way, there is a lot of flexibility in the interchange where both parties can ask the other party to do things, e.g., the remote website might even tell OneID to call a different program at the end. It is entirely up to the command set protocols that are set up for a OneID conversation. Rather than being a fixed, hardwired protocol that is exactly the same every time, cookies can be set by either party, for example. Reasons for not passing the browser's SessionID are (1) only the original requesting browser can make use of the capabilities that were added by this authentication, and (2) the OneID authentication app, because it only has the authID, cannot perform any operations other than authentication (e.g. it cannot examine your shopping cart since it doesn't know the SessionID.

OneID includes verified identities. The system issues OneIDs to licensed notaries and signs that they are validated. (In other words, OneID is a notary.) Any validated notary can then legally verify an identity and attest that the information provided in a OneID is true, i.e., a user signs their name, sex, DOB, and birthplace. Alternatively, the system could set up OneID iris AOptix authentication stations in major airports. Users insert their OneID cards into the machine and enroll themselves. This proves they are a unique human being in a way that is not forgeable, but unless there is also a human there, it doesn't prove an identity.

To defend against OneID's private keys being exposed, servers should, when it is important, check with OneID to verify that the certificate being used is authentic and not generated by an attacker who obtained OneID's private key. Doing this on each transaction is expensive and adds latency. Instead, the preferred method is that OneID can distribute a list of OneID numbers and a hash of their public signature key using "rsync" which in general will download just the new keys, so it is very efficient. In the event of a private key compromise, the clients are notified on check-in to OneID. They can provide their old public key, and the system can give them a new certificate. The system also lets everyone know OneID's new signature public key. On a first login of the OneID on a site, the site can cookie the user with a secret password (or vice versa) that the OneID will encrypt and remember is required for future logins. Either technique provides complete protection in the event that OneID's signature private key is compromised. We can encourage the use of both methods. This reduces the value of an attack on OneID's private key. This way, the system can easily handle what would otherwise be a catastrophic failure.

Exposure of the OneID private key can happen via a software attack or a physical attack. The system gives merchants a list of revoked public keys and a hash table so they can look them up. The file can be added to, so the merchant can just rsync the file at the end, which is very efficient. In the event of our private key being compromised, we simply put our public key on the revocation list and issue a new cert signed by RSA or another trusted root for our new public key. Then, whenever a user's certification is used and rejected, the system can give them for free, a new certification signed with the new key because the system kept a backup of every public key it has already certified. Therefore, a user's key pair is the same, the system just re-signed it with the new public key. This problem is a much easier one because the system can specify the rules of engagement/ecosystem/protocols/standards when someone uses a OneID certification (how you automatically get a new signature). This is not possible in the free-for-all type of system we have now. Therefore, the system requires some rules, and in exchange the system gets virtual immunity from a private key exposure, which in most cases would be a disaster requiring lots of manual effort to fix.

When the user's signature key is compromised, the user should contact OneID so that the key can be removed from the list. The system can then generate a new one. Either one of the user's other devices can vouch for the user, and the system will sign it. Otherwise, the system has to start from scratch and verify the information that is on file.

The OneID repository is replicated in four places and all four places have local off-site backup. In the event of a data center outage, the other places operate independently. There is a single grand master which only the OneID servers can contact. It just has the "version number" of the latest data for each One ID and which servers have it. All read requests make sure they have the latest data. If they don't, they ask one of the servers that does. If those servers are all down, they give the outdated information and flag to the user that the information might be outdated due to a system failure.

The repository is nearly immune to attack because it is hard to attack without the repository noticing. The worst attack would be to corrupt the list of revoked keys and revoke every key. Alternatively, an attack could sign certificates the repository shouldn't sign. However, these are easily detectable by constant outside monitoring pretending the repository is a customer.

In one embodiment, the OneID system architecture may include a user who communicates with the OneID service through either a browser or an app on the user's computer or smart phone. In turn, the OneID service may communicate with a website and the OneID repository. The OneID repository may also communicate with the website.

In one embodiment, the OneID transaction flow may be comprised of a request sent to the Amazon homepage. The Amazon homepage a return a page with a OneID button. The user may then click on the login button (which is an initial command to OneID). The system will then securing mutual authorization, and tell the user to call this URI. The URI will load, and called the URI (which is usually an Amazon URI).

The OneID system could replace PCI compliance with a new method for credit card transactions. A transaction is where the cardholder digitally signs the purchase transaction. Then, the merchant just has a list of signed invoices reading, for example "bill my VISA credit card $5.00 and send it to Amazon please—yours truly Joe Cardholder." Therefore, there are no credit cards to hold on to. The merchant sends an authorization request to VISA to get paid instead of sending a credit card number.

In one example, instead of selecting Visa and entering your card number, etc., a user could log into VISA and enter their OneID in order to tie their OneID to their existing card(s). During a transaction, the user could select using OneID. The OneID browser client shows the amount, a transactionID, description, and the payee. The user can change the default credit card. The user will only see credit card types that are accepted to the merchant, and click "OK." The transaction is signed with the buyer's OneID and sent to the merchant who sends to VISA. VISA processes it and sends it to OneID if it was approved. OneID pushes the transaction to all devices. Therefore, there is no more PCI compliance needed, and no more credit card numbers to store. VISA could give a preferred rate on this type of transaction, and a lower rate for the merchant if the consumer uses a OneID smartcard with a reader with a person present button. Therefore, using this will save the merchant money and provide ease of use for consumers.

Keyboards may be equipped with a OneID key. A light on the OneID keyboard key turns on when a secure operation is requested. Normal signatures do not turn on the light. Press the OneID key once to enable the TPM chip in the keyboard to securely sign ONE thing on the user's behalf and turn off the light. One press is one secure signature. The browser client will tell the repository what was just signed. Secure signature requests are rejected by the TPM chip if not approved within 60 seconds. Certain web sites will require a "secure authentication" to login (like your bank or an ecommerce site). Most web sites will require a "secure authentication" to charge a credit card. A user can tell if someone has control of their PC and is front-running their transaction if they press the button and the secure operation expected to happen does not succeed. The user can then go to a OneID client on another (non-infected) computer and view the transaction log to see what transpired and have the attacker expunged from the machine. Alternatively, keyboard manufacturers could include an NFC reader sot where a user could put their smart card in the reader. The card could be left there, the numeric keys on the keyboard could serve as the PIN, and the "one button confirm" key on the keypad keys could do double duty (going to the system and directly to the smart card).

The button on a wireless NFC reader can power to the reader, and transmit an authorization wirelessly whenever the button is pressed. A user can do a wired version too, but this is low power drain, like a wireless keyboard. The simplest secure hardware solution may include a NFC reader with one button, or a SmartMX card. When a user logs into a site, instead of clicking the mouse on the "confirm" button, the user can simply hit the button on the NFC reader. This button is read by the software to enable one authentication to happen.

Using the OneID secure reader, a secure login or payment may be approved with a wave of a user's hand. The user simply waves their hand over the reader to do the authorization. The user is then transferred to a web page, and there is just a single OneID button exposed. The client will show what happens if the user waves their hand based on what function the button calls for (e.g., login, buy, etc.). Waving a hand will press that button and enable exactly one authentication (with a maximum of one authorization every 2 seconds). Therefore, a user does not even have to click a button. A user should set a PIN timeout for safety if their workplace isn't secure, or if they don't take their card or phone will them when they leave. The following are authentication device preferences: a simple smart-card reader like cyberJack, a smart-card reader with 'pay now' button, a secure element in phone with PIN entry through phone GUI, a smart-card reader with full PIN pad, a smart-card reader with little display and 'pay now' button, Mobile users are a great initial target because password managers do not work on smart phones very conveniently at all. Typing a credit card number into a phone is very painful. There is an easy way to distribute an app and get paid. Generally, sites realize how hard it is to use the site from a mobile device, and the smart ones are usually looking for ways to make the user experience better. It's easy for a site to add a second way to log in. The OneID app will allow the site to create the user if he doesn't already have an account, leading to more business.

In one example, a user with an iPad may have hundreds of apps, with each requiring a username and password. Additionally, software may prompt users to accept certain agreements. Users should have the choice in the security versus convenience trade-off, not the software maker. After entering usernames and passwords, some users may discover that they are receiving solicitations from other sources, suggesting that their information was shared without their permission.

If a signature gets stolen, OneID will tell you which signature got compromised and when it happened. With OneID software only and no TPM, an attacker could compromise a user's security somewhat, but he'll be stopped at the unique secure approval process. But, if the user spends $10 to get a special OneID smart card reader with the OneID button, they are virtually guaranteed to completely safe. They can even leave the card in the reader if their home/ work is secure. OneID may even have an insurance policy to compensate users for any loss up to $100,000 if it was due to a fault with the OneID software. In contrast, if the attackers break into a Yahoo account, there is no way to know that the breach occurred, or protect the account.

The sooner users sign up, the greater the name availability is. Users cannot transfer their alias to someone else. If they give it up, it goes back into the available pool. This prevents name squatters from registering millions of names and then trying to soak people to reclaim their name.

In one embodiment, the system may charge one dollar for an app, and $2 for an in-app purchase to register their signing public key for that device in the repository to keep spammers out. In other words, if a user has N devices, it will cost $(2N+1). All keys last 1 year, and are set up to renew and annually to charge a funding source that the user sets up in the app. Therefore, the system can ask for funding information at that time. If a user don't renew their key, the system can remove their data, but, keep their OneID on file and available for them to reclaim for 12 months before it expires.

According to the OneID legacy protocol, the OneID app does whatever it is told by the remote site, and rarely "takes control." Generally the remote site drives, but either side can issue commands to the other, just like a normal conversation. To ease transition, if the mutual authentication fails because it doesn't have the association to the user's account yet (because this is the first time logging into that site with OneID), it can then have the OneID app prompt for a username/password, or ask if the user wants to create a new account. Either way, from then on, it is the last time they will ever need to do this, because the site can use the OneID for authentication going forward. The user has already proved that the user holds that OneID and proved that they have rights to that account.

The one ID app can generate two key pairs, and have the public signing key signed by OneID and registered. OneID certifies that the person has the unique, randomly chosen OneID 8 byte number it assigned. Mutual authentication and logging is possible. Additionally, legacy login association is also provided, which prompts for username/password for first time if there is no OneID association found. A name, shipping address, and credit card information may be provided to the remote site. Also provided are any other fields the site asks for, by prompting and remembering it. If there is already a field with the same name, the system will show the user how it is going to fill it out so that the user can correct if needed. In the future, the system will use the site specific field name if it exists, e.g., site.fieldname, or else use the generic name. There will be a set of standardize field names that sites should try to use whenever possible to eliminate the amount of duplicate information that could be entered. The system will also auto-complete typing from any previously typed in values, so if one site uses "email" and another uses "e-mail", it will be easy to fill in. The system will change the value of the generic name to the most recently used value of that field, e.g. If a user types stk@x.com for his email, and that doesn't match the email we have stored, we'll change our generic value and the site specific value. Info stored on one device is synced to the others. The system will show basic information about the site a user is visiting, e.g., date OneID created, positive and negative comments, and overall rating.

Certain sign-up restrictions may apply. A user could also supply their name, home address, primary email address, secondary email address, phone number, and SMS number to identify themselves. Emails cannot be reused on more than one OneID. A funding source (PayPal account or credit card) cannot be used more than five times ever. An IP could match the user's claimed address. If an IP has lots of stolen credit cards and chargebacks, the system can disable that IP for new account registration and suggest that they use a different location. iPhone data (as shown in "Ad hoc") can only generate a few IDs. A user can pick whatever case-insensitive alias they want as a shorthand to refer to their OneID UID. Early registrants get the first pick.

The system can keep a copy of the public signature keys that were issued in case they need to be re-issued in case of a compromise. If a user loses their signature key on a device, the user could either (1) use one of their devices to approve a new public signature key (and wait for the required time period for objections if you have more than one device), or (2) pay $10 and prove to the system that the user is who they say they are by proving that they control at least N the resources the system has on file for the user, such as their email addresses, phone number, SMS, physical address, answers to security questions, etc.

In the best possible scenario for an attacker, the attacker controls the screen and makes everything looks "normal" to the user. He uses the user authorizations to log into their bank and withdraw funds while they are thinking they have just logged into Facebook. This is virtually the only scenario that will work, and it is practically speaking impossible to pull off without detection. It will also not escape the post-transaction approval notifications even if the attacker was successful. There is no way to avoid that. In contrast, the most practical attack involves an attacker waiting for the user to log into their bank or PayPal account. When they are login, the attacker opens up a window hidden to the user, leveraging the session cookie. The attacker anticipates when the user is about to do a transaction requiring digital approval.

In yet another embodiment, the system may be used to buy a raffle ticket and register it, by just the user's card.

Only signed approved readers can read a user's card. Users will receive a post mortem of what they read because the smart card will remember it in an LRU list which gets uploaded to the repository. If we get a lot of complaints, the system will revoke their card read certificate or charge them a big penalty to keep their certificate. Since the system is careful about who can read a card, user information should be safe. The system can even push the hash codes of the most egregious offenders into the card if needed. People with read permission get to read a card like it is a business card. Others, such as car rental companies, get to read your driver's license. So the read permission bitmap varies depending on what information the reader typically requires from the user. The bitmap has a bit corresponding to each field of standard information. Most people have the bit for reading "business card" style information. Tapping at a hotel will typically give out both, but users can control whether they want the card to give that out, or whether they want to have the hotel ask the repository for the information, in which case, they will be prompted on the phone to encode the symmetric keys for those fields using the OneID of the hotel so they can pass the information requested to the hotel via the repository. The standard information that users give out normally is on the card and given out peer-to-peer with just a touch. This way, users can blacklist specific companies if they feel abused. For other fields, these are typically only possible to give out with a cell phone or a computer where the fields are prompted for and given out. Those devices have more memory to store the symmetric keys for each field. Fields are typically given out (and encrypted) in groups, e.g., personal business card, business card, medical, emergency.

A "tap" can be used. The cell phone tap is easy since everything is approved on screen. With the smart card, it isn't so obvious what a "tap" means, but probably it means different things to different readers, e.g., hotel vs. parking meter. Standard sections would make things much more manageable. So, the repository has a list of OneIDs who have access, and their access bitmap to 64 sections of the data. The readers keep the symmetric keys required for each section. Users can change their symmetric key on any section at any time. Any change of a key or content will update the revision number of that data so a vendor can do an "if-changed-since-rev-X" request. If someone wants to email a user, they request the user's email address from the repository and decode it with the section key.

To get access to the data, the vendor presents his signed access rights for each section, sends the data, and decodes it using the decode keys remembered for each section. There is a version number change when the symmetric key changes, so in that case the vendor has to queue a request for the user to drop the vendor a copy of the new keys so that vendor can read the newer version of the data. The browser client checks these regularly and the user can set the client to auto approve these, or simply approve them all in batches, e.g., once a week it can review the list of update requests. Most people will auto approve them, so the client encrypts the symmetric key for each of the requestors, drops them at the repository, and then the next time the vendor requests that data, he'll get it (and it can be removed from the repository). The repository can keep a record for the user of the last N OneIDs accessing a user's data. Users should be able to buy a raffle ticket by touching their OneID card.

The hand-wave authorization can be coupled with a ComputerProx TF2000 ultrasonic presence sensor for additional physical presence requirement if needed. Also, Key Source International has SonarLocID which may also be compatible. They have an RFID reader and a proximity sensor.

OneID offers a paradigm shift by reducing many logins to a single log in, many cards to a single card, many sessions of entering data into a single data entry section, and a single virtual identity. Instead of using card identities in transactions, transactions use a single virtual identity. Users can select between low convenience and high security and manage this trade-off. The OneID identity is the same on all of the user's devices. OneID also includes hardware products, such as a SmartMX card, a NFC reader with a touch button, and products that enable "hand wave authentication" which is a convenient way to have extremely high security that is fun for a user. Eventually, major PC makers and Logitech will develop keyboards with SmartMX and a OneID button that is built in.

OneID also solves the "two quarantine" problem. If a user has to e-mail accounts and two quarantine accounts, the user's browser is constantly logged into the wrong quarantines, which can be very frustrating. Using OneID, the user is authenticated when the browser tries to access any of the accounts. Because it is the same person associated with every account, the browser authenticates an identity, not an account.

A user's reputation, or trust rating, should be reliable. Legitimate people won't want to change their OneID. Therefore, he reputation can be attached to it. If a user knows a person's OneID, the user will be able to check the reputation. A OneID verified identity will guarantee this is the person, and that he can't get a new number for life, i.e., an eBay identity that users can't escape from. Users can make their information private; however, anyone doing business with a user with private information should be wary. This is like eBay seller reputation, but attached to a person's real identity. Therefore, craigslist transactions and eBay transactions can be safer because people will know who they are dealing with.

With Google Wallet, users select, then tap. That's great for transactions; however, OneID does things the other way. Users tap to get the starting URL. Then, the system has a discussion with that URL, including prompting the user for options, acceptable credit cards, showing discounts, etc. This is via a PKI authenticated channel. We can terminate at any time, or let the remote end tell us where to go.

Various hardware options include, but are not limited to: a USB NFC card reader with wave sensor (this is an easy addition to add a button, which applies power to the reader for 2 seconds), a USB integrated smartMX with wave sensor, a wireless version of above options (users may have to have a button), and/or keyboards with integrated smartMX and wave sensor (or a OneID OK button).

FIG. 1 is a simplified block diagram illustrating a transaction according to an embodiment. According to this embodiment, an identity repository 102 is implemented using the OneID repository. The identity repository 102 sends a user's encrypted credit card data to a merchant 104. The merchant can be an online realtor, such as Amazon.com. A user module 106 operating on a user device sends decryption keys for the encrypted credit card data. The encryption keys are encrypted with a public key of the merchant 104. The user module 106 can comprise code running within a web browser. In this case, the user's browser has access to secret symmetric keys that are used to determine the symmetric encryption key for each field.

Figure 2:
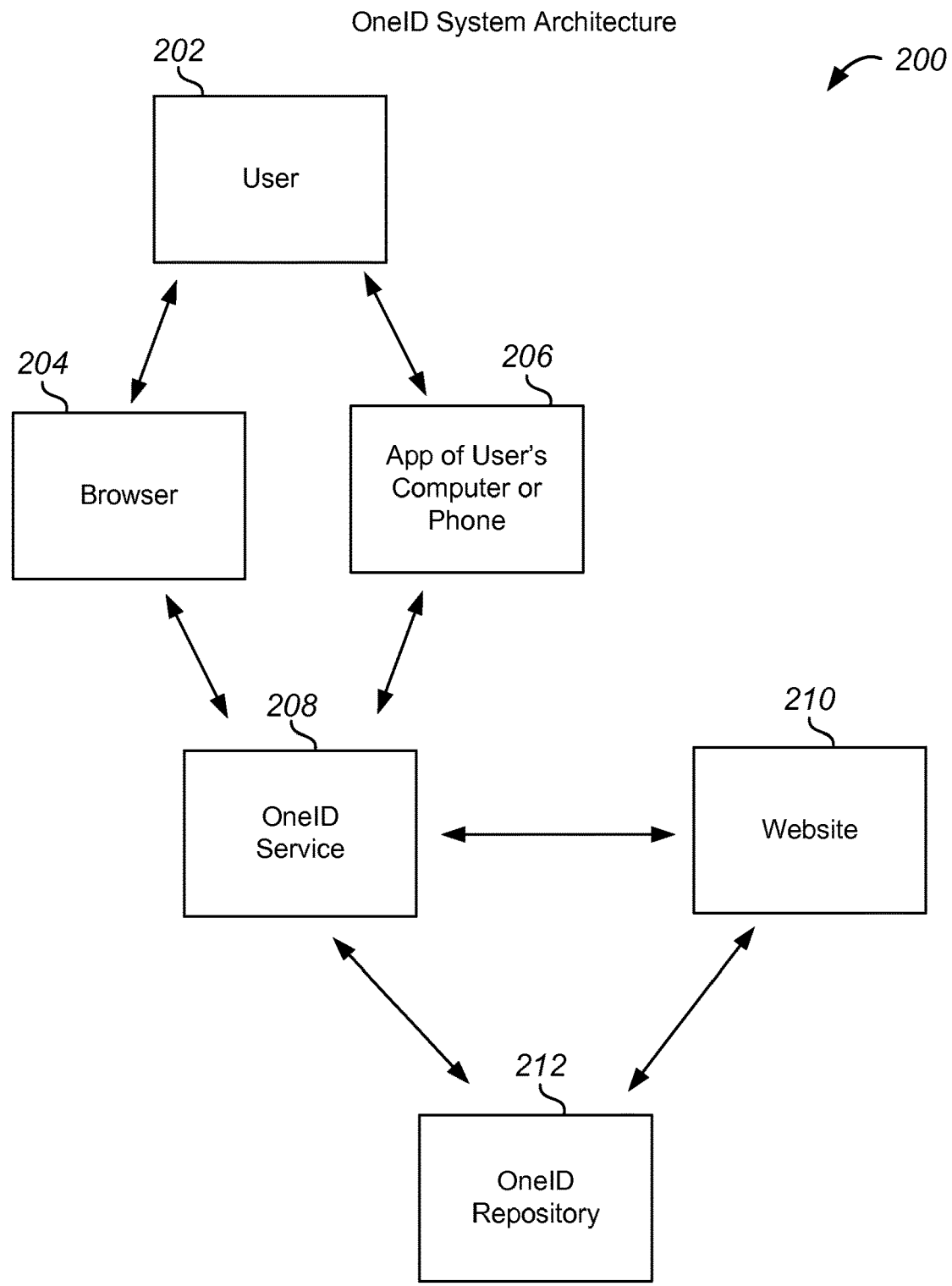
FIG. 2 is a simplified block diagram illustrating a system architecture according to an embodiment of the present invention.

FIG. 2 is a simplified block diagram illustrating a system architecture according to an embodiment. The system architecture 200 includes a browser 204 and/or an app 206 operating on a mobile device of the user. A user 202 communicates with, or provides inputs to, the browser 204 and/or the app 206. In turn, the browser 204 and/or the app 206 communicates with a web service 208. In this embodiment, the web service 208 comprises the OneID service. The web service 208 communicates with a website 210 and an associated identity repository 212. In this embodiment, the identity repository 212 may be implemented using the OneID repository. The website 210 may also communicate directly with the identity repository 212.

Figure 3:
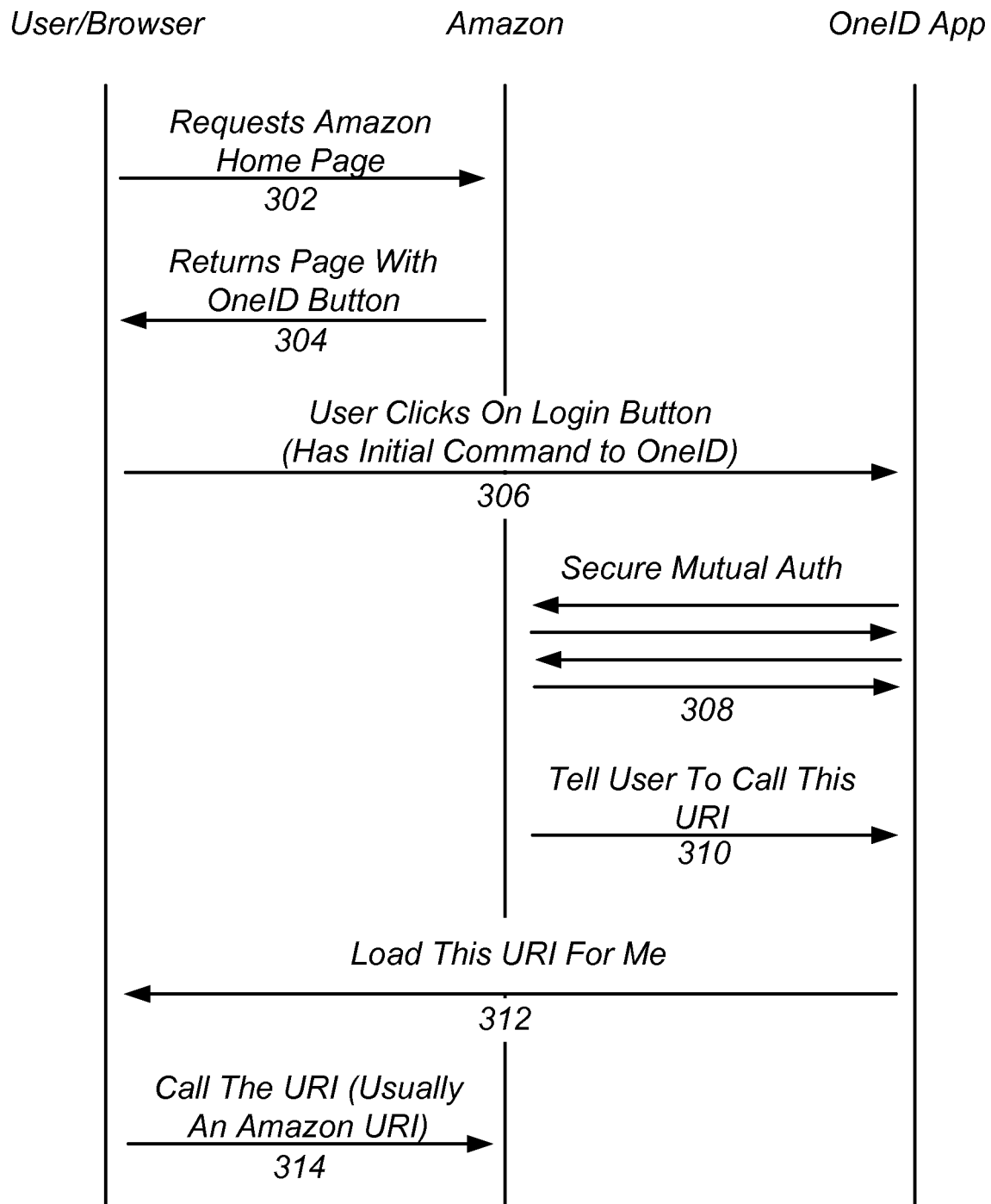
FIG. 3 is a simplified sequence diagram illustrating an online transaction according to an embodiment of the present invention.

FIG. 3 is a simplified sequence diagram illustrating an online transaction according to an embodiment. In this embodiment, a user operating a web browser requests a homepage, such as the Amazon homepage (302). The Amazon Web server returns a webpage displaying an input field for an identity service/repository (304). Here, the identity service/repository may be operated by OneID. The input field may comprise a OneID button. The user then clicks on the OneID button which sends an initial command to a OneID app (306). The OneID app engages in a series of transactions with the webpage to secure a mutual authorization (308). After securing a mutual authorization, the webpage sends a message to the OneID app to tell the user to call a URI that is returned (310). The OneID app sends a message to the user's browser indicating that the browser should load the included URI (312). The user's browser then calls the URI, which in this case may comprise an Amazon URI (314). As used herein, the term "app" may refer to an application operating on a mobile computing device, such as an app from Apple's App Store operating on an iPhone.

Determining Authentication Levels

Embodiments of the present invention relate to technologies to facilitate determining an authentication level for a transaction. Technologies related to embodiments of the present invention provide a method and system for determining a most secure authentication level required by a user, and for determining a most secure authentication level required by a relying party, from a plurality of possible authentication levels. Also provided are methods and systems for selecting between at least two authentication levels, one of which is determined according to user preferences and the transaction, the other of which is determined according to preferences of a relying party and the transaction.

Most online transactions involve establishing the identities of the parties involved. Often, one party is required to prove their identity to the other party before a transaction can be carried out or completed. For example, when logging on a bank's website, a customer is often required to provide a username and password to prove to the bank that the customer is the true owner of the account being accessed. Unless the customer's identity can be proved, the bank will not allow information associated with the account to be exchanged. In another example, a purchaser in an online retail transaction may be required to access stored payment information maintained by a seller. Unless the purchaser's identity can be proved, a seller may refuse to complete the transaction or transfer ownership of the purchased product to the buyer. In examples such as these, proving to one party the identity of the other party is referred to as authentication.

Authenticating a party's identity may take various forms. In the example above, a username and password were provided by the party seeking to prove their identity. Other examples include providing a token or one-time-password. Generally, one party in the transaction is relying on the authentication process to prove the identity of the other party in the transaction. As used herein, the "relying party" refers to the party in a transaction that is relying on the authentication process to prove the identity of the other party. For example, the relying party can include a bank or a seller that is relying on the authentication process to prove the identity of the account holder or purchaser.

Traditionally, the relying party performs the authentication and determines the requirements of the authentication process. In other words, the party in a transaction seeking to prove their identity to the relying party does not set the terms of the authentication process. Instead, the relying party in the authentication process sets the terms of the authentication process. For example, when logging on to an online bank account, the bank determines what credentials an account holder must provide in order to authenticate their identity. When logging into a private network, such as a VPN, the operator of the private network determines the process for authenticating a user. Therefore, the party opposite of the relying party in a transaction is not given any input for determining the authentication process, but is instead at the whim of the relying party's process.

Embodiments of the present invention implement an improved mechanism for allowing both parties in a transaction to influence the authentication process. Accordingly, multiple authentication levels are made available for different types of transactions. As used herein, an "authentication level" can include requirements for authenticating a party's identity in a transaction. These requirements can include providing a password, providing a PIN number, performing a physical gesture with a user device, or approving the transaction on a second user device (such as a smart phone or tablet computer), or the like. Additional types of authentication levels are discussed in more detail below.

In one embodiment, an architecture is set up to receive or access preferences of the relying party, along with preferences of the opposite party, or "user". The relying party preferences and the user preferences can include conditions for the transaction, such as a dollar amount, along with a reference to an authorization level that should be used when those conditions are met. For example, a user preference might include a condition that a single purchase costs over $100, with a reference to an authorization level requiring a password to be entered.

According to various embodiments, a relying party authentication level may be determined using the relying party preferences and information associated with the transaction itself. Similarly, a user authentication level may be determined using the user preferences and the information associated with the transaction. A final authentication level to be used in the transaction (a "transaction authentication level") may then be determined. The transaction authentication level can involve a third party (referred to as an "identity repository"), additional user devices, and/or various passwords and PIN numbers.

Figure 4:
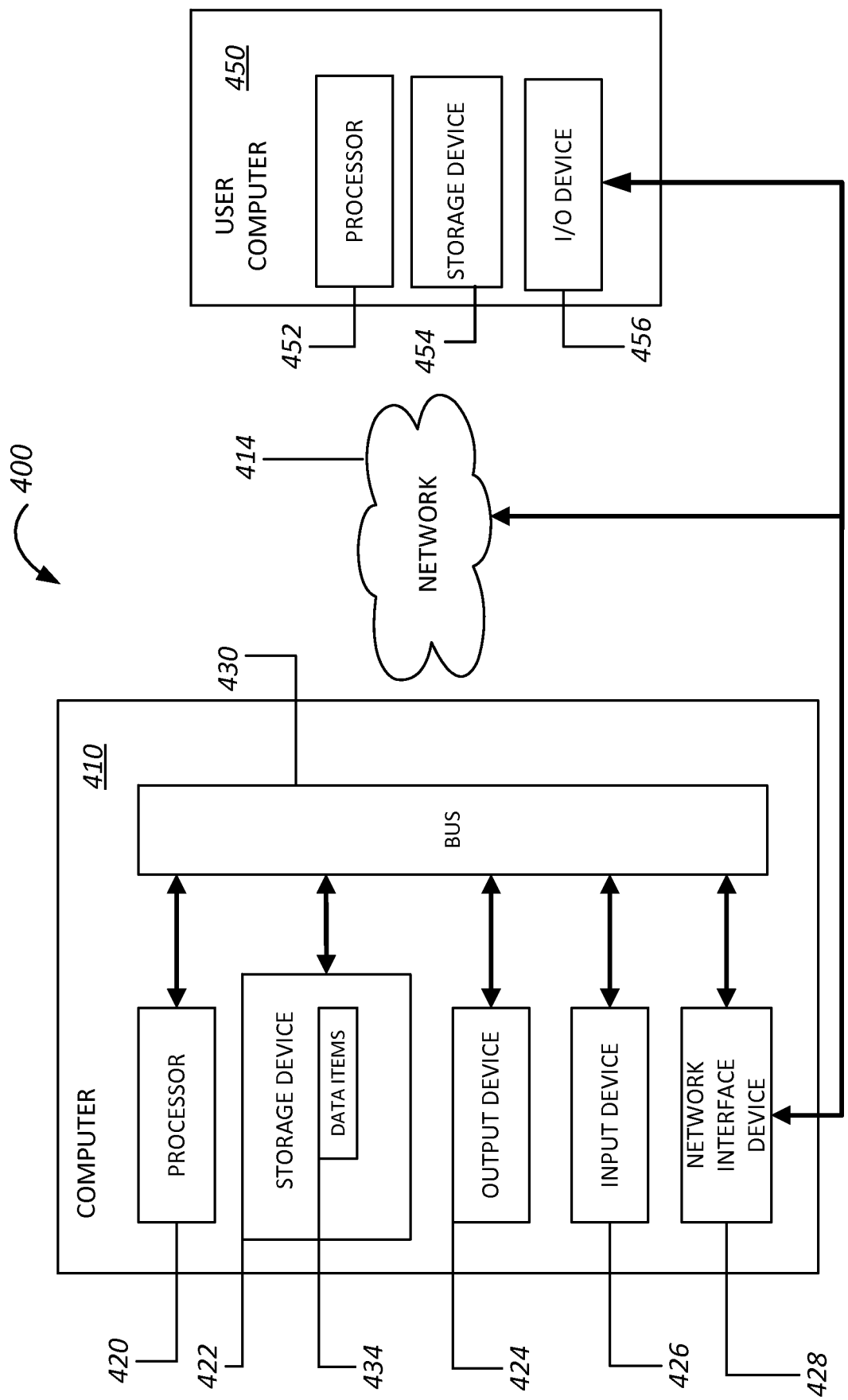
FIG. 4 is high level schematic diagram illustrating a computer system including instructions to perform any one or more of the methodologies described herein.

The embodiments described herein include methods and systems that can be implemented using a computer system. FIG. 4 is high level schematic diagram illustrating a computer system including instructions to perform any one or more of the methodologies described herein. A system 400 includes a computer 410 connected to a network 414. The computer 410 includes a processor 420 (also referred to as a data processor), a storage device 422, an output device 424, an input device 426, and a network interface device 428, all connected via a bus 430. The processor 420 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 420 executes instructions and includes that portion of the computer 410 that controls the operation of the entire computer. Although not depicted in FIG. 4, the processor 420 typically includes a control unit that organizes data and program storage in memory and transfers data and other information between the various parts of the computer 410. The processor 420 receives input data from the input device 426 and the network 414 reads and stores code and data in the storage device 422 and presents data to the output device 424.

Although the computer 410 is shown to contain only a single processor 420 and a single bus 430, the disclosed embodiment applies equally to computers that may have multiple processors and to computers that may have multiple busses with some or all performing different functions in different ways.

The storage device 422 represents one or more mechanisms for storing data. For example, the storage device 422 may include read-only memory (ROM), random access memory (RAM), magnetic disk storage media, optical storage media, flash memory devices, and/or other machine-readable media. In other embodiments, any appropriate type of storage device may be used. Although only one storage device 422 is shown, multiple storage devices and multiple types of storage devices may be present. Further, although the computer 410 is drawn to contain the storage device 422, it may be distributed across other computers, for example on a server.

The storage device 422 includes a controller (not shown in FIG. 4) and data items 434. The controller includes instructions capable of being executed on the processor 420 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 422 may also contain additional software and data (not shown), which is not necessary to understand the invention.

Although the controller and the data items 434 are shown to be within the storage device 422 in the computer 410, some or all of them may be distributed across other systems, for example on a server and accessed via the network 414.

The output device 424 is that part of the computer 410 that displays output to the user. The output device 424 may be a liquid crystal display (LCD) well-known in the art of computer hardware. But, in other embodiments the output device 424 may be replaced with a gas or plasma-based flat-panel display or a traditional cathode-ray tube (CRT) display. In still other embodiments, any appropriate display device may be used. Although only one output device 424 is shown, in other embodiments any number of output devices of different types, or of the same type, may be present. In an embodiment, the output device 424 displays a user interface.

The input device 426 may be a keyboard, mouse or other pointing device, trackball, touchpad, touch screen, keypad, microphone, voice recognition device, or any other appropriate mechanism for the user to input data to the computer 410 and manipulate the user interface previously discussed. Although only one input device 426 is shown, in another embodiment any number and type of input devices may be present.

The network interface device 428 provides connectivity from the computer 410 to the network 414 through any suitable communications protocol. The network interface device 428 sends and receives data items from the network 414.

The bus 430 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 410 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 410. For example, other peripheral devices such as audio adapters or chip programming devices, such as EPROM (Erasable Programmable Read-Only Memory) programming devices may be used in addition to, or in place of, the hardware already depicted.

The network 414 may be any suitable network and may support any appropriate protocol suitable for communication to the computer 410. In an embodiment, the network 414 may support wireless communications. In another embodiment, the network 414 may support hardwired communications, such as a telephone line or cable. In another embodiment, the network 414 may support the Ethernet IEEE (Institute of Electrical and Electronics Engineers) 802.3x specification. In another embodiment, the network 414 may be the Internet and may support IP (Internet Protocol). In another embodiment, the network 414 may be a local area network (LAN) or a wide area network (WAN). In another embodiment, the network 414 may be a hotspot service provider network. In another embodiment, the network 414 may be an intranet. In another embodiment, the network 414 may be a GPRS (General Packet Radio Service) network. In another embodiment, the network 414 may be any appropriate cellular data network or cell-based radio network technology. In another embodiment, the network 414 may be an IEEE 802.11 wireless network. In still another embodiment, the network 414 may be any suitable network or combination of networks. Although one network 414 is shown, in other embodiments any number of networks (of the same or different types) may be present.

A user computer 450 can interact with computer 410 through network 414. The user computer 450 includes at least a processor 452, a storage device 454, and an input/output device 456. Other hardware may also be included in user computer 414. The description related to processor 420 and storage device 422 is applicable to processor 452 and storage device 454. As an example, the user computer 450 can be a personal computer, laptop computer, or the like, operated by an individual or as a part of an automated system.

According to some embodiments, the various systems used in a transaction may be implemented using the user computer 450 or the computer 410 in FIG. 4, or a combination of the two. For example, in a transaction between a user and a relying party, the user device may be implemented by the user computer 450, and the relying party device can be implemented by the computer 410. In transactions that additionally include an identity repository, the identity repository can be implemented using the computer 410. For example, using the user computer 450, an account holder can interact with computer 410 operated by a bank through the network 414 to access account information. Additionally, using the user computer 450, the account holder can interact with another computer 410 operated by an identity repository.

Figure 5:
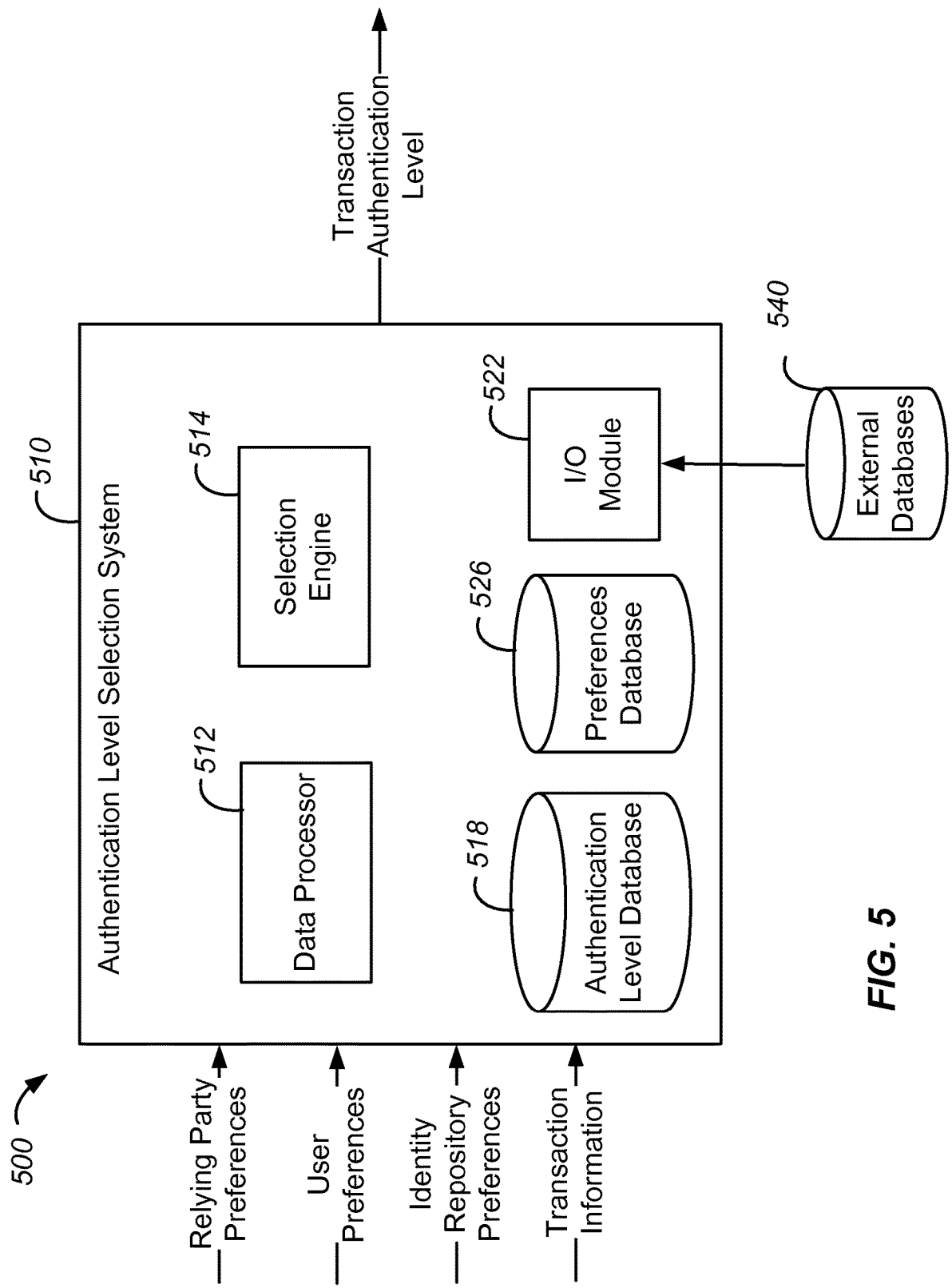
FIG. 5 is a high level block diagram of an apparatus for determining an authentication level in a transaction in accordance with an example embodiment.

FIG. 5 is a high level block diagram 500 of an apparatus for determining an authentication level in a transaction, referred to as an authentication level selection system 510, in accordance with an example embodiment. In an embodiment, the authentication level selection system 510 can be an element of a computer system operated by a relying party, a user, or an identity repository. While not illustrated in FIG. 5, such computer systems, in accordance with embodiments of the present invention, typically contain other systems that which can interact with the authentication level selection system 510 shown in FIG. 5. In some embodiments, such systems may further include other ancillary systems that are not necessary for understanding the present invention.

Referring to FIG. 5, the authentication level selection system 510 receives multiple inputs. For example, relying party preferences can be received by the authentication level selection system 510, which can be stored in a preferences database 526. The relying party preferences can be received from the relying party as a part of a transaction. Alternatively, the relying party preferences can be received prior to the transaction taking place as a part of initializing communications between the relying party and a user device. User preferences may also be received by the authentication level selection system 510, and stored in the preferences database 526. The user preferences may be received as a part of the transaction, or may be previously received, such as when a user installs software on the user's computer, or when registering with the identity repository. In one embodiment, identity repository preferences may also be received and stored in the preferences database 526. In other embodiments, preferences may be established automatically using default settings, and may be overridden by expressly entering replacement or additional preferences. The preferences can also be established on behalf of the parties to the transaction. For example, a parent may establish preferences for an account used by a child.

The preferences database 526 stores data associated with the preferences of each party in a transaction. For example, the preferences database 526 may store a plurality of relying party preferences, each corresponding to an individual website. The preferences database 526 can also store preferences for multiple users. For example, several family members using a family computer can each have their own account, which can be associated with different user preferences for each user. The identity repository preferences can similarly be stored in the preferences database 526 individually for each identity repository. In some embodiments, multiple identity repositories using a common interface are available, and each identity repository can have its own preferences.

The authentication level selection system 510 can also include an authentication level database 518. The authentication level database 518 stores authentication levels that may be applied to transactions. The authentication levels in the authentication level database 518 can be populated by the identity repository, by a user, or by a relying party. In one embodiment, authentication levels can be received as part of the transaction from one of the parties involved. Also, authentication levels may be preloaded as a part of installing or developing the authentication level selection system 510.

The authentication level selection system 510 can also include an I/O module 522 configured to interface with external databases 540. The external databases 540 can provide preferences and authentication levels in addition to those provided by the parties of the transaction. In one embodiment, transactions may be subject to government regulations or technical standards that include specific authentication level requirements and/or preferences. The external databases 540 can include databases operated by governments, charities, professional organizations, standard-setting organizations, or the like. Preferences and authentication levels retrieved by the I/O module 522 may be used as inputs in a manner similar to the preferences stored in the preferences database 526 and the authentication levels stored in the authentication level database 518.

Although external databases 540 are illustrated in FIG. 5, these need not be required by embodiments of the present invention. In some embodiments, sufficient information related to determining an authentication level is maintained internally within the authentication level selection system 510. In some embodiments, data from both internal and external sources is integrated to provide data that balance security and convenience; however, this is not required by the present invention.

Utilizing the illustrated inputs, a data processor 512 and a selection engine 514 interact with the illustrated databases to facilitate the authentication level selection system 510, resulting in a transaction authentication level to be used in the transaction. The data processor 512 accesses information stored in the authentication level database 518 and the preferences database 526, which can be one of several databases utilized in conjunction with other system elements. As described more fully throughout the present specification, the I/O module 522, the data processor 512, the authentication level database 518, the preferences database 526, and/or the external databases 540 can be utilized to receive the illustrated inputs and determine the transaction authentication level.

Figure 6A:
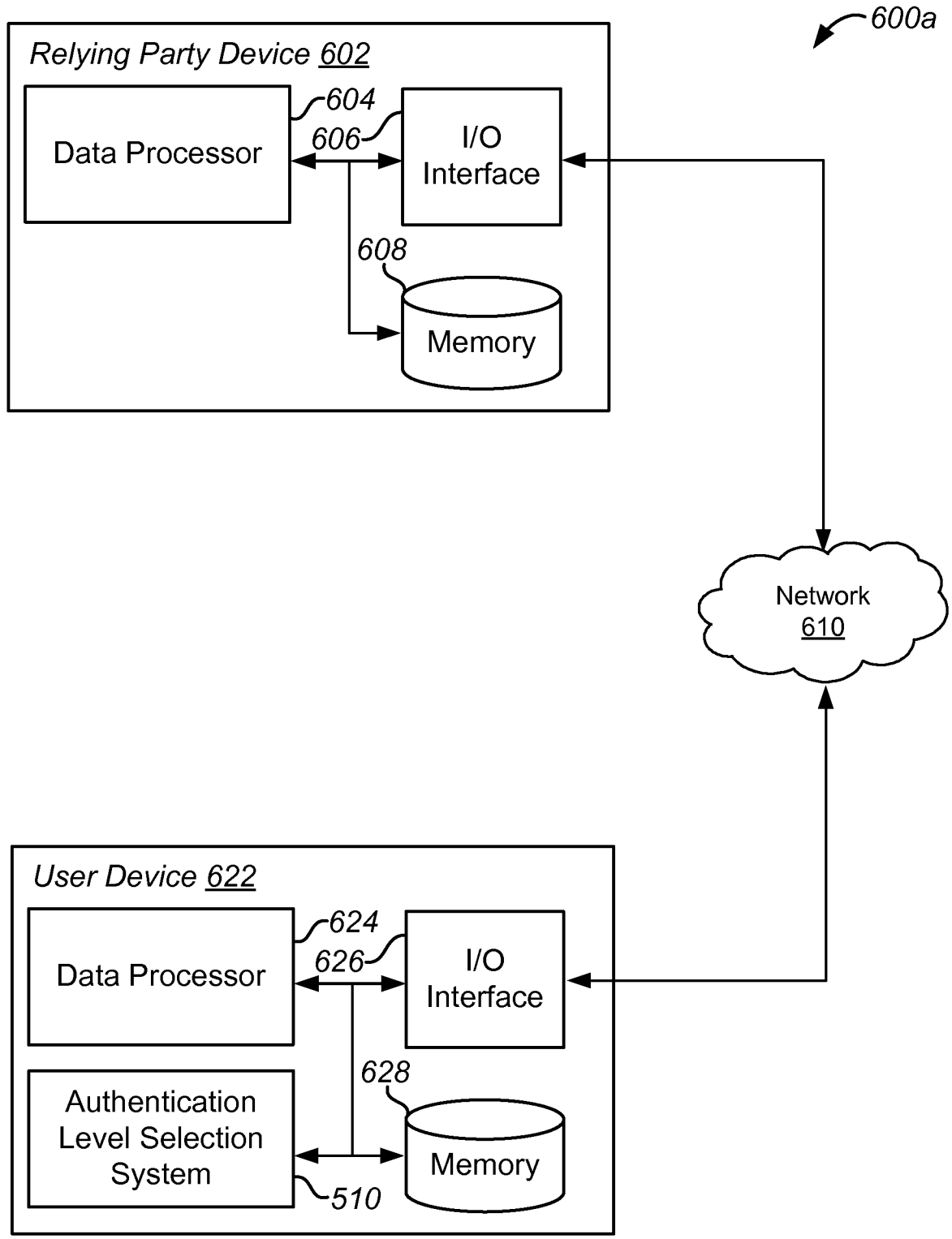
FIGS. 6A-6B are high level schematic diagrams illustrating authentication level determination systems according to embodiments of the present invention.

FIG. 6A is a high level schematic diagram 600*a* illustrating various devices configured to determine an authentication level for a transaction according to an embodiment of the present invention. In this embodiment, a relying party device 602 includes at least a data processor 604, an I/O interface 606, and a memory 608, along with possibly other components. The relying party device 602 may be implemented using the computer 410 from FIG. 4, or another similar computer system. The relying party device 602 can comprise a Web server operated by a bank, social network, member organization, retailer, wholesaler, government, or the like.

The relying party device 602 can be configured to take requests from multiple users, and can engage in various transactions with the multiple users concurrently. The requests and transactions involving users are received through the I/O interface 606, which is connected to a network 610. The description of the network 414 in FIG. 4 is also applicable to network 610. In one embodiment, the relying party device 602 engages in transactions and receives requests over the Internet from users or customers of the relying party.

A user device 622 includes at least a data processor 624, an I/O interface 626, and a memory 628, along with other components. The user device 622 may be implemented by the user computer 450 or the computer 410 from FIG. 4, or another similar computer system. In some embodiments, the user device 622 comprises a personal computer, a laptop computer, a tablet computer, a smart phone, a PDA, a thin client, a workstation, a terminal, or the like. In this embodiment, the user device 622 further includes the authentication level selection system 510 from FIG. 5. The authentication level selection system 510 can be implemented in the user device 622 using the existing components, or may be implemented using specialized hardware and/or software. Although the authentication level selection system 510 is shown in FIG. 6A as a separate module, it can be combined with other modules or components within the user device 622.

The user device 622 communicates over the network 610 through the I/O interface 626 to engage in transactions with the relying party device 602. In this embodiment, the relying party device 622 sends the transaction information and the relying party preferences to the user device 622 through the network 610. The authentication level selection system 510 resides on the user device 622, therefore the user device 622 determines the authentication level that will be used for the transaction. Although not shown in FIG. 6A the opposite configuration is also used by other embodiments. In other words, the authentication level selection system 510 can operate on the relying party device 602, which will determine the authentication level for the transaction. In this embodiment, the user device 622 may send user preferences to the relying party device 602.

Figure 6B:
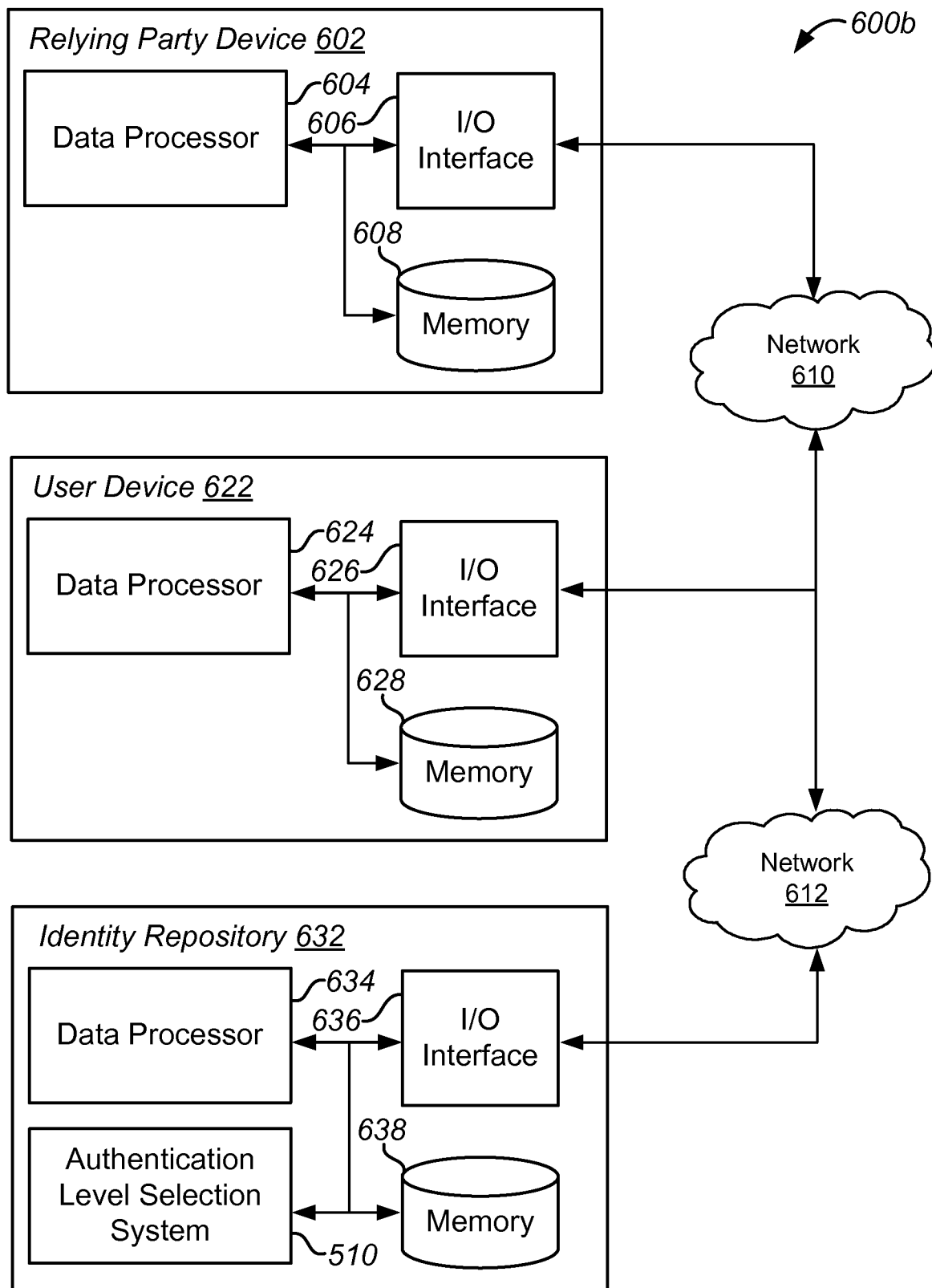

FIG. 6B is a high level schematic diagram 600*b* illustrating various devices in another configuration for determining an authentication level for a transaction according to an embodiment of the present invention. This embodiment differs from the embodiment of FIG. 6A by including an identity repository 632. The identity repository 632 may also be referred to as an identity server, or a data repository. The identity repository comprises a computer system configured to store data associated with the user identities, and in some embodiments, to aid in authenticating identities and implementing/enforcing authentication levels. In one embodiment, the identity repository may be implemented by the OneID online identity management system. The OneID system may include an app designed for smart phones and tablet computers that may be downloaded from an online app store. The OneID system is described extensively elsewhere in this disclosure. In one embodiment, the OneID system app running on a mobile device can be referred to as a user module operating on a user device. In another embodiment, the user module comprises code running in a web browser on a user device. In some embodiments, the identity repository is remotely located, such that it is physically separate from both the user device and the relying party. In one implementation, the identity repository is separated by a significant geographic distance from the other entities.

In this embodiment, the identity repository 632 includes at least a data processor 634, an I/O interface 636, and a memory 638, along with possibly other components. Additionally, the identity repository 632 can include the authentication level selection system 510. In this embodiment, the identity repository 632 determines an authentication level for the transaction. Therefore, the user device 622 sends the user preferences, the relying party preferences, and the transaction information to the identity repository 632 through a network 612. The description of the network 414 in FIG. 4 is also applicable to network 612. Network 612 may be the same as network 610, or network 612 and a network 610 may be separate networks. For example, network 612 could be a payment system network, and network 610 could be the Internet. In one embodiment, the relying party device 602 does not communicate directly with the identity repository 632, but instead uses the user device 622 as an intermediary. However, in other embodiments each of the devices involved in a transaction can communicate with each other independently.

Figure 7:
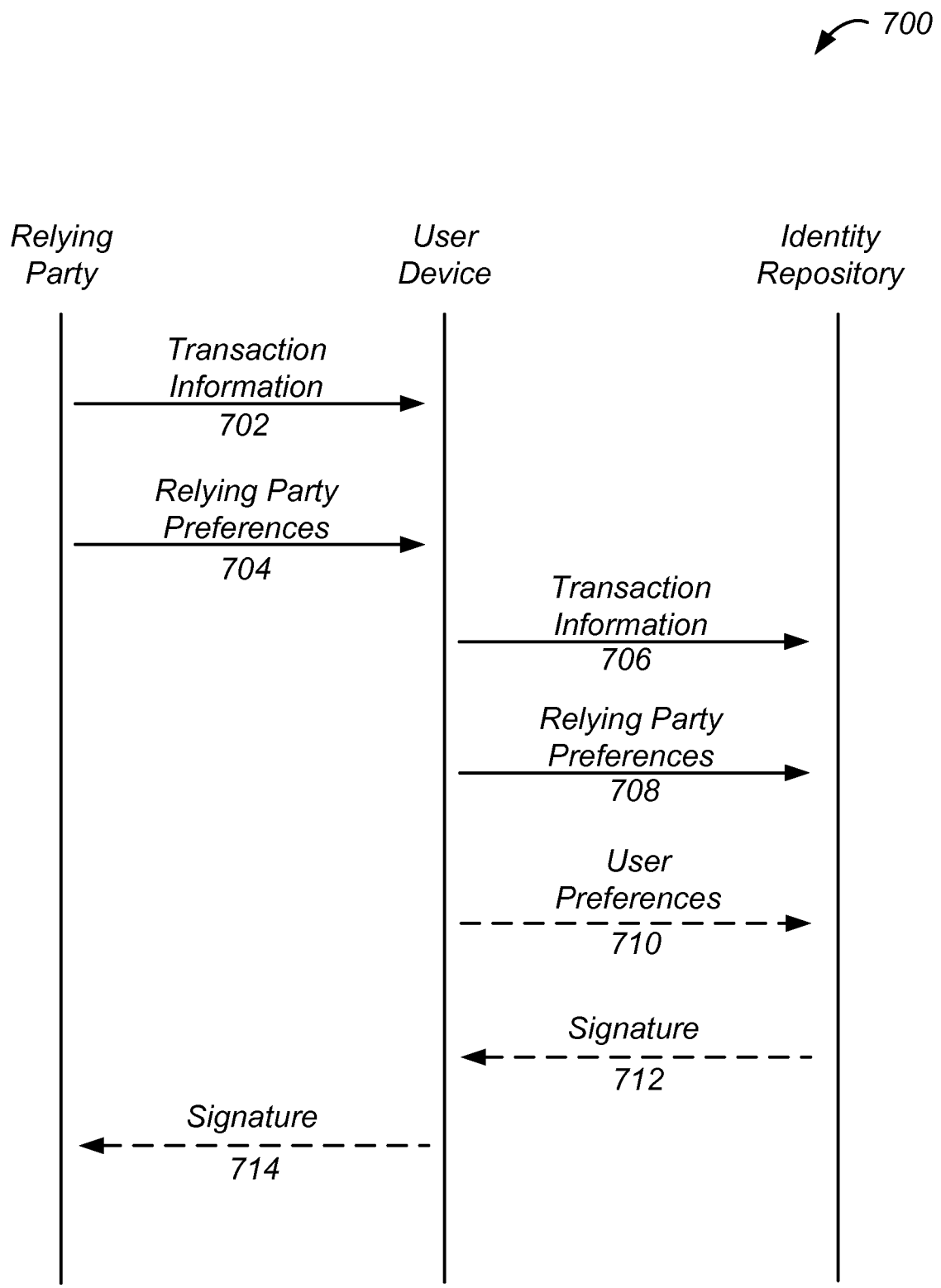
FIG. 7 is a simplified sequence diagram illustrating a method for determining an authentication level according to an embodiment of the present invention.

FIG. 7 is a simplified sequence diagram 700 illustrating a method for determining an authentication level according to an embodiment of the present invention. As illustrated in FIG. 7, transaction information is sent from the relying party to the user device (702). In some implementations, this is preceded by back-and-forth communications between the relying party and a user device, which can include browsing a website, selecting items for purchase, selecting an account to access, or the like. In an alternate embodiment (not shown), the transaction information is sent from the user device to the relying party. In this case, the transaction information can comprise a purchase order from the user specifying the details of the transaction.

The relying party transmits the relying party preferences to the user device (704). The relying party preferences may be sent in the same data package as the transaction information, or may be sent separately. In one embodiment, the relying party preferences are sent far in advance of the transaction information. For example, when a user registers with a website, the website could send the relying party preferences to be stored on the user device. Therefore, it is not required by embodiments of this invention that the relying party preferences be sent near the same time as the transaction information. Also not shown in FIG. 7, the relying party can transmit additional authentication levels to the user device for use in the transaction.

According to the embodiment shown in FIG. 6A the authentication level selection system 510 operates on the user device 622. At this point in the sequence diagram 700, the user device may have the minimum information necessary to determine an authentication level. According to the embodiment shown in FIG. 6B, the authentication level selection system 510 is operated by the identity repository 632. In this embodiment, the user device transmits the transaction information to the identity repository (706), along with the relying party preferences (708). As was the case with the transmissions between the relying party and the user device, some embodiments do not require that the transaction information in the relying party preferences be transmitted near the same time. However, in other embodiments these are sent as part of a single data packet.

Optionally, user preferences are transmitted from the user device to the identity repository (710). In one embodiment, the identity repository stores user preferences in a local database, and it is not necessary to retrieve them from the user device for every transaction. User preferences need only be transmitted if the identity repository does not store them, or if the stored version is out-of-date. In one embodiment, user preferences are transmitted with every transaction in order to standardize the communication protocol and simplify programming. If identity repository preferences are used, they are typically stored locally by the identity repository, and thus do not require additional transmissions. At this point in the sequence, the identity repository may have the minimum information necessary to determine an authentication level for the transaction.

In one embodiment, the identity repository enforces the determined authentication level by providing a signature that is transmitted to the user device (712), the relying party (714), or both. For example, if a bank (the relying party) prefers that a password is required for high-value transactions, and an authentication level is selected that requires a password, then the identity repository will only sign the transaction if a correct password is received from a user or user device. In embodiments where the user device enforces the authentication level, the user device can similarly sign the transaction.

Figure 8:
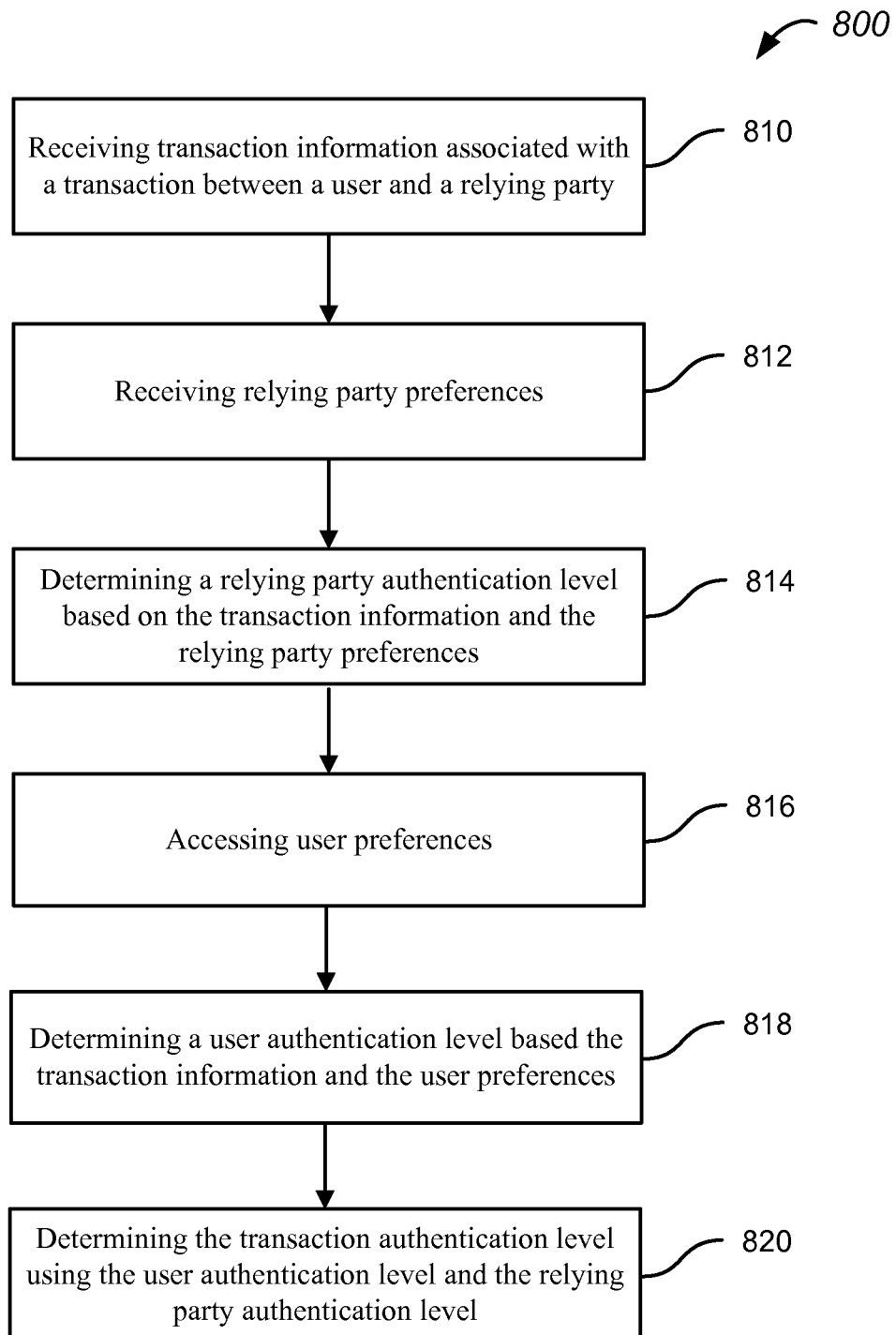
FIG. 8 is a simplified flowchart illustrating a method for determining an authentication level according to an embodiment of the present invention.

FIG. 8 is a simplified flowchart illustrating a method for determining an authentication level according to an embodiment of the present invention. The method 800 can be performed by the relying party, the user device, and/or the identity repository. The method 800 includes receiving transaction information associated with a transaction between a user and a relying party (810). The transaction information can be sent from the user device to the identity repository, from the relying party to the identity repository, or from the relying party to the user device, depending upon the embodiment.

In one embodiment, the transaction comprises verifying the identity of the user to the relying party. For example, the transaction can comprise a social network verifying the identity of an account holder during a sign-in procedure. The transaction can also comprise a purchase made by the user from the relying party. In other embodiments, the transaction comprises electronically signing documents, ratifying electronic agreements, sending e-mails, transferring money, making payments, or the like. Generally, the transaction can comprise any online transaction between two parties.

The transaction information comprises any information specific to the transaction itself. In one embodiment, the transaction information comprises a description, cost, and/or quantity of goods sold. In another embodiment, the transaction information comprises an account number. In other embodiments, the transaction information can comprise payment methods, shipping addresses, billing addresses, usernames, cumulative totals, e-mail addresses, contact information, credit card numbers, routing numbers, signed documents, dates, devices involved in the transaction, user permissions, or the like. Generally, transaction information can comprise any data associated with the transaction. Therefore, this list of examples is merely exemplary and not meant to be limiting.

The method also includes receiving relying party preferences (812). As stated above, some embodiments do not require that the relying party preferences be received concurrently with the transaction information. Therefore, the relying party preferences could be stored in a database locally on the computer system performing this method. The method additionally includes determining a relying party authentication level based on the transaction information and the relying party preferences (814).

To determine the relying party authentication level, the relying party preferences can include information related to devices owned or operated on behalf of the user, or devices authorized for the user, with limits on how devices can be used in the transaction. For example, a desktop computer in a secure work area may have a higher transaction value limit than a mobile device. A mobile device with a password-to-unlock feature may have a higher transaction value limit than an unlocked mobile device. One of ordinary skill in the art would recognize many variations, modifications, and alternatives.

The relying party preferences can include information related to preferences established by the relying partly or on behalf of the relying party, including transaction value limits, time periods during which transactions are initiated, geographic locations where the transaction is initiated, histories of returns or invalidated transactions, user reputations, number of transactions within a particular time period, or the like. The relying party preferences can also include cumulative data, including thresholds for the number of items in a single purchase, cumulative costs of items in a single transaction, cumulative amount spent in a particular time period, and/or the like. Therefore, the relying party preferences can comprise a cost threshold for a single transaction, a cumulative cost threshold for transactions during a time period, or a time limit since a password was provided to a user device. These preferences are used to define almost every aspect of a transaction, such that a relying party can set specified authentication levels that add security to high-value transactions or transactions where the risk of fraud is high. It should be noted that if preferences received from a party contradict preferences already stored on the device executing this method, the more conservative or secure preferences can be used in the transaction.

Relying party preferences can also include conditions related to types of transactions. For example, purchasing certain types of goods, such as jewelry, cars, software, collectibles, or the like, that are more likely to be involved in theft and fraud can require higher levels of authentication. The preferences can also include conditions on payment options. For example, purchasing items with a credit card may require a first authorization level, while paying for items with a debit card may require a second authorization level. The preferences can also include conditions on methods of shipping, or shipping locations. For example, shipping items to a PO Box or to an address different from the billing address may require a higher authorization level.

Each of the relying party preferences can be associated with authentication levels. If the condition embodied by the preference is met, then the specified authentication level (or a higher authentication level) should be used in the transaction. An authentication level can comprise requiring an indication that the transaction is approved to be received by a user module operating on a user device. For example, a user may be required to provide input indicating that they have reviewed the transaction and approve. An authentication level can also comprise notifying additional devices that are associated with the user. For example, a notification can be sent to a user's cell phone or tablet computer for a transaction that was initiated on the user's desktop computer. An authentication level can comprise requiring a PIN or password to be received by one or more of the additional devices associated with the user. An authentication level can comprise a waiting period between initiating the transaction and final approval. In one embodiment, an authentication level may require human contact by a representative of the relying party. In another embodiment, an authorization level can require a third-party to authenticate the transaction, such as the identity repository.

In order to determine the relying party authentication level based on the transaction information and the relying party preferences, each of the conditions embodied by the relying party preferences is evaluated. The authentication levels associated with these conditions are candidates for use in the transaction. In one embodiment, the candidate authentication level that is the most secure is selected as the relying party authentication level. If none of the conditions embodied by the relying party preferences are met, then a default authentication level can be used. Generally, authentication levels that require more devices, more passwords, more time, more inputs, or the like, are considered more secure than those requiring less.

The method may additionally include accessing user preferences (816). In one embodiment, the user preferences are retrieved/received from the user device. In another embodiment, the user preferences are stored on the device executing this method. Furthermore, the method includes determining a user authentication level based on the transaction information and the user preferences (818). The above description of the relying party preferences applies equally to the user preferences. Likewise, the process of determining a relying party authentication level described above applies equally to the process of determining a user authentication level. One having skill in the art will understand that certain differences between the two types of preferences may exist. For example a user preference may include conditions on the type of relying party involved in transaction, i.e. logging into a bank account may require a higher authentication level than logging into an e-mail account.

The method also includes determining the transaction authentication level using the user authentication level and the relying party authentication level (820). The transaction authentication level comprises the authentication level that should be used for the transaction to go forward. Note that by using both the user authentication level and the relying party authentication level, this method allows both parties to influence the transaction authentication level. In one embodiment, the transaction authentication level is selected based on which of the user authentication level and the relying party authentication level is most secure. For example, if a bank requires only a password to be entered, but a user requires that a PIN be entered from the second user device, then the user's authentication level will be required for the transaction because it is more secure.

Figure 9:
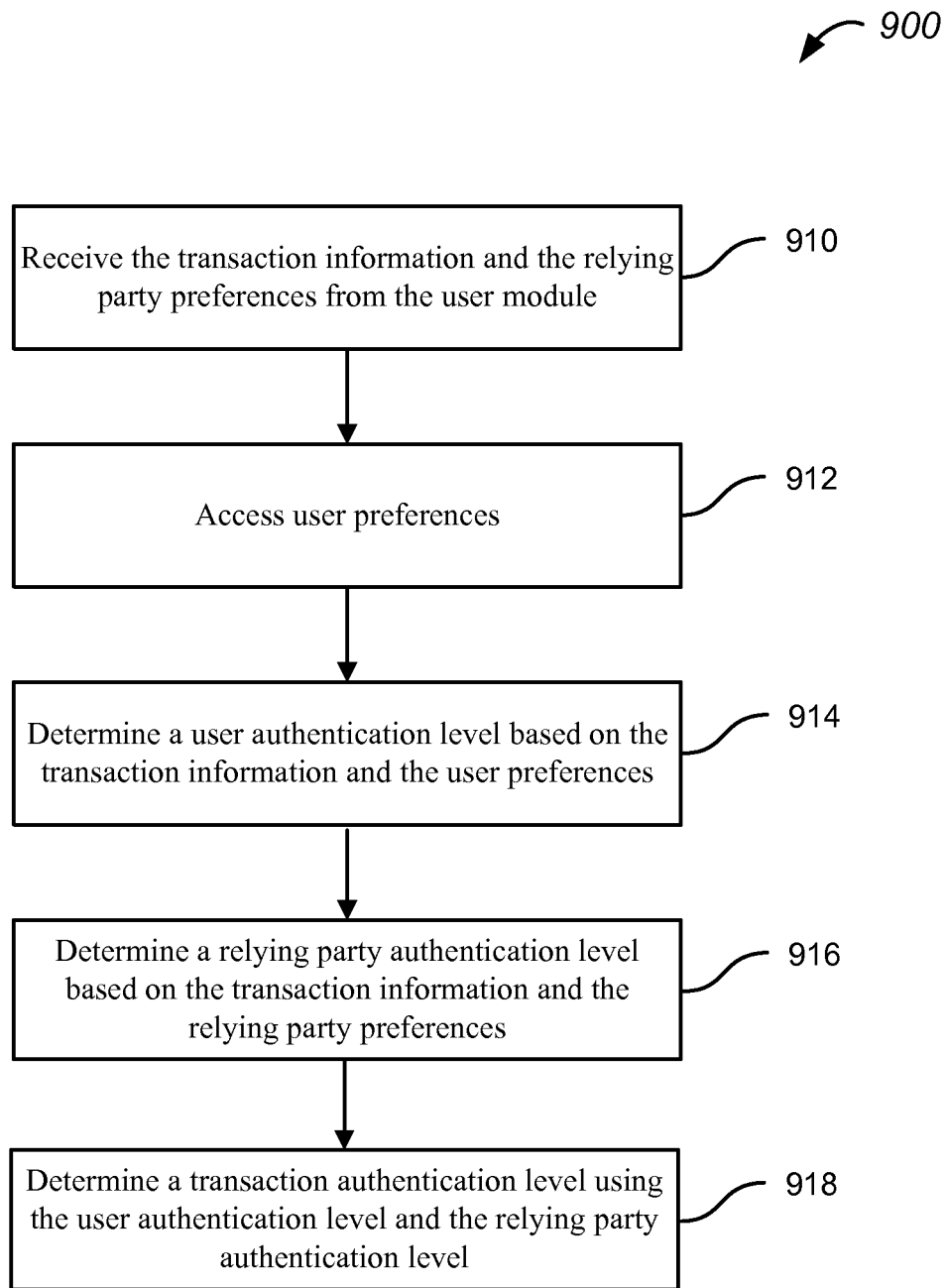
FIG. 9 is a simplified flowchart illustrating a method for determining an authentication level with an identity repository according to an embodiment of the present invention.

FIG. 9 is a simplified flowchart illustrating a method for determining an authentication level with an identity repository according to an embodiment of the present invention. The method 900 is executed by an identity repository. The method includes receiving the transaction information in the relying party preferences from the user module (910). Note that both the transaction information and the relying party preferences may have originated at the relying party. However, in this embodiment the relying party does not communicate directly with the identity repository, so the information is sent first to the user device, then to the identity repository. The method also includes accessing user preferences (912). In one embodiment, the identity repository stores user preferences, along with other personal information in an encrypted form in a database. The user device may send an encryption key that can be used to decrypt the user preferences for the purpose of providing authentication for the transaction. Once the transaction is over, the decrypted information can be erased from the identity repository.

The method additionally includes determining a user authentication level based on the transaction information and the user preferences (914), determining a relying party authentication level based on the transaction information and the relying party preferences (916), and determining a transaction authentication level using the user authentication level and the relying party authentication level (918). It should be noted that these portions of method 900 are similar to those recited above for method 800. As such, the above description applies equally to this portion of method 900. Because the method 900 is being carried out by the identity repository, identity repository preferences may also be incorporated. Identity repository preferences are similar to the other types of preferences discussed in this disclosure, and may be used in a similar fashion.

It should be appreciated that the specific steps illustrated in FIG. 8 and FIG. 9 provide particular methods of determining an authentication level for transactions according to embodiments of the present invention. Other sequences of steps may also be performed according to alternative embodiments. For example, alternative embodiments of the present invention may perform the steps outlined above in a different order. Moreover, the individual steps illustrated in FIG. 8 and FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

It will be understood in light of this disclosure that the examples and embodiments described herein are for illustrative purposes only and that various modifications or changes in light thereof will be suggested to persons skilled in the art and are to be included within the spirit and purview of this application and scope of the appended claims.

Fully Encrypted Repository

Embodiments of the present invention relate to technologies that facilitate a fully encrypted repository. Technologies related to embodiments of the present invention provide a method and system for storing encrypted data separately from an associated encryption key. The encryption key can be stored on a user device, and the encrypted data can be stored on a remotely located data repository, the relevant contents of which are completely encrypted.

Online transactions are becoming increasingly more popular and convenient. From online purchases, to social media, to e-commerce, to Internet relationships, online transactions usually require at least some form of personal or business information to be transferred. In most cases, online transactions require web forms to be filled out, payment options to be provided, and/or identifying information to be verified. Although used for different purposes, and in different environments, the information provided by users for each of these transactions is often very similar. For example, users may find themselves repeatedly filling out web forms with their addresses, credit card information, purchasing preferences, or usernames and passwords. Repeating the data entry process for each transaction can generate mistakes and frustrate users.

Additionally, because information provided by users is often typed into a web form with the keyboard, the process is susceptible to fraud and theft. Keyboard loggers, viruses, and other types of malware can be configured to search a user's computer for personal and financial information that can easily be exploited. Compounding the problem is the fact that many users choose to store their personal and financial information on their computers. While this is convenient for users, it creates an easy target for hackers that are able to infect a user's computing device.

Embodiments of the present invention implement an improved mechanism for storing, accessing, and using personal and financial information. Instead of storing this information on a user's computing device, the information can be stored remotely at a data repository. Furthermore, the information is not stored in the clear, but rather first encrypted before it is sent to the data repository. The key used to encrypt the information is stored separately from the encrypted data.

In one embodiment, the architecture is set up so that the encrypted data is stored at the data repository, while the encryption key is stored locally on the user device. This creates an arms-length separation between the data and the means for accessing the data. Even if the user's device were compromised, the attacker would not have access to the encrypted data because it is securely stored at the data repository. More importantly, an attacker breaching the data repository would not gain any useful information because any data stored therein would be encrypted, and the associated encryption keys would be stored on the individual user devices. This prevents massive data compromises from resulting from a single security breach at the data repository. In one embodiment, the data repository is a fully encrypted data store, and any data stored thereon is encrypted. The associated encryption keys are stored remotely in other locations and on other devices that are not controlled or operated by the data repository.

In one implementation, three parties interact to use a fully encrypted repository system. First, a software module operating on a user device can generally receive information from a user to be used in transactions. Second, a data repository can store encrypted data associated with the information at a remote location. Third, a remote device, often operated by a merchant, bank, or other similar party, can make a request for the information from the user device. The encrypted data can be decrypted and sent from the data repository, to the user device, and then to the remote device. Each of these three parties and their respective devices will be described in more detail below. Note that in other implementations, other parties may also be involved, and may communicate with each other in different ways that will be clear in light of this disclosure.

Figure 10:
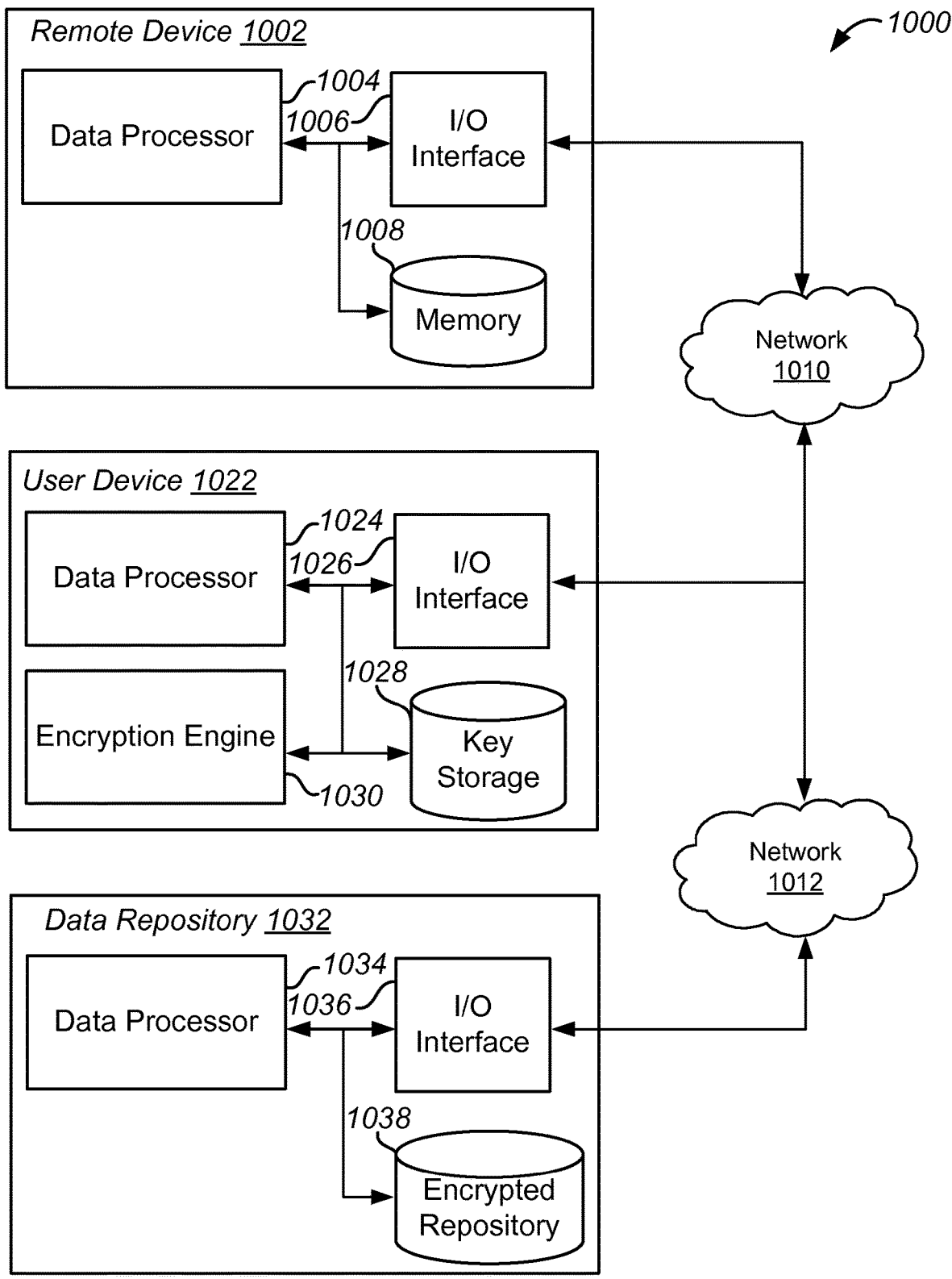
FIG. 10 is a high level schematic diagram illustrating a fully encrypted repository system according to an embodiment of the present invention.

FIG. 10 is a high level schematic diagram illustrating a fully encrypted repository system 1000 according to an embodiment of the present invention. In this embodiment, a user device 1022 includes at least a data processor 1024, an I/O interface 1026, and a key storage 1028, along with other components. The user device 1022 may be implemented by the user computer 45 or the computer 410 from FIG. 4, or another similar computer system. For instance, data processor 1022 may be implemented by processor 420 or processor 452 from FIG. 4, and so forth. In some embodiments, the user device 1022 comprises a personal computer, a laptop computer, a tablet computer, a smart phone, a PDA, a thin client, a workstation, a terminal, or the like.

The user device 1022 is configured to receive inputs from a user, comprising information to be used in transactions. Alternatively, the user device 1022 receives information from various public databases, or by extracting information from past transactions and/or e-mails sent by a particular user. While the user device 1022 can receive this information, storing it on the user device would leave the information vulnerable to unintentional or malicious disclosure. In this embodiment, the user device 1022 also includes an encryption engine 1030. The encryption engine 1030 can be implemented in the user device 1022 using the existing components, or may be implemented using specialized hardware and/or software. Although the encryption engine 1030 is shown in FIG. 10 as a separate module, it can be combined with other modules or components within the user device 1022. In one embodiment, the encryption engine 1030 is implemented by a software routine that instructs the data processor 1024 to encrypt information. The key storage 1028 may be implemented using any storage device, such as storage device 422 or storage device 454 in FIG. 4, and may be represented as a database. Key storage 1028 stores the encryption keys used to encrypt the data associated with the information for a transaction.

The user device 1022 communicates through a network 1012 using the I/O interface 1026. Communicatively coupled to the network 1012 is a data repository 1032. The data repository 1032 may also be referred to as an identity server or an identity repository. The data repository comprises a computer system configured to store data associated with the user information in a fully encrypted form. In one embodiment, the data repository is implemented by the OneID® online identity management system. The OneID system includes an app designed for smart phones and tablet computers that can be downloaded from an online app store. The OneID system is described extensively elsewhere in this disclosure. In one embodiment, the OneID system app running on a mobile device is referred to as a user module operating on a user device. In another embodiment, the user module comprises code running in a web browser on a user device. In some embodiments, the data repository is remotely located, such that it is physically separate from both the user device and a remote device. In another embodiment, the data repository is separated by a significant geographic distance from the other entities involved in the transaction.

The data repository 1032 includes at least a data processor 1034, an I/O interface 1036, and an encrypted repository 1038, along with possibly other components. Using the I/O interface 1034, the data repository 1032 communicates through network 1012 with the user device 1022. The description of the network 414 in FIG. 4 is also applicable to network 1012. In this embodiment, the encryption engine 1030 is operated by the user device 1022. Therefore, user device 1022 encrypts data associated with the information, stores the encryption key in the key storage 1028 on the user device 1022, and sends the encrypted data through the network 1012 to the data repository 1030 for storage. The user device 1022 then deletes the information from any of its storage devices. In some embodiments, the user device 1022 deletes the information and the encrypted data. In this configuration, the keys are stored at the user device 1022, and the encrypted data is stored by the data repository 1032 in its encrypted repository 1038. This configuration separates the key storage 1028 from the encrypted data stored in the encrypted repository 1038, and also does not require transmission of encryption keys across the network 1012 where they could be intercepted and exploited.

In an alternative embodiment not shown in FIG. 10, the encryption engine 1030 can be implemented by the data repository 1032. In this embodiment, the user device 1022 sends the encryption key with the information over the network 1012 to the data repository 1032. The data repository 1032 then encrypts data associated with the information using the encryption key and stores the encrypted data in the encrypted repository 1038. The encryption key is then permanently deleted from any storage devices in the data repository, so that in order to decrypt the encrypted data the encryption key must be resent from user device 1022. This configuration may be advantageous for resource-intensive encryption algorithms that are better run on the data repository 1032 compared to the user device 1022.

Also in this embodiment, a remote device 1002 includes at least a data processor 1004, an I/O interface 1006, and a memory 1008, along with possibly other components. The remote device 1002 may be implemented using the computer 410 from FIG. 4, or another similar computer system. The relying party device 1002 can comprise a Web server operated by a bank, a social network, a member organization, a retailer, a wholesaler, a government organization, or the like. The remote device may also be referred to as a relying party.

The remote device 1002 can be configured to engage in transactions with the user device 1022, using the I/O interface 1006 to communicate through network 1010. Network 1012 may be the same as network 1010, or network 1012 and a network 1010 may be separate networks. For example, network 1012 could be the Internet, and network 1010 could be a private LAN. As a part of a transaction, the remote device 1002 may request information from the user device 1022, such as credit card information, a billing address, a name, etc. Alternatively, the user device 1022 may send this information to the remote device 1002 without requiring an explicit request. Such may be the case when the user device 1022 submits purchase orders, or other similar orders, to remote device 1022.

Note that in this embodiment, the remote device 1002 communicates with the user device 1022, and the user device 1022 in turn communicates with the data repository 1032. However, in other configurations each of the remote device 1002, the user device 1022, and the data repository 1032 are able to communicate with each other individually and independently, without restriction.

Figure 11:
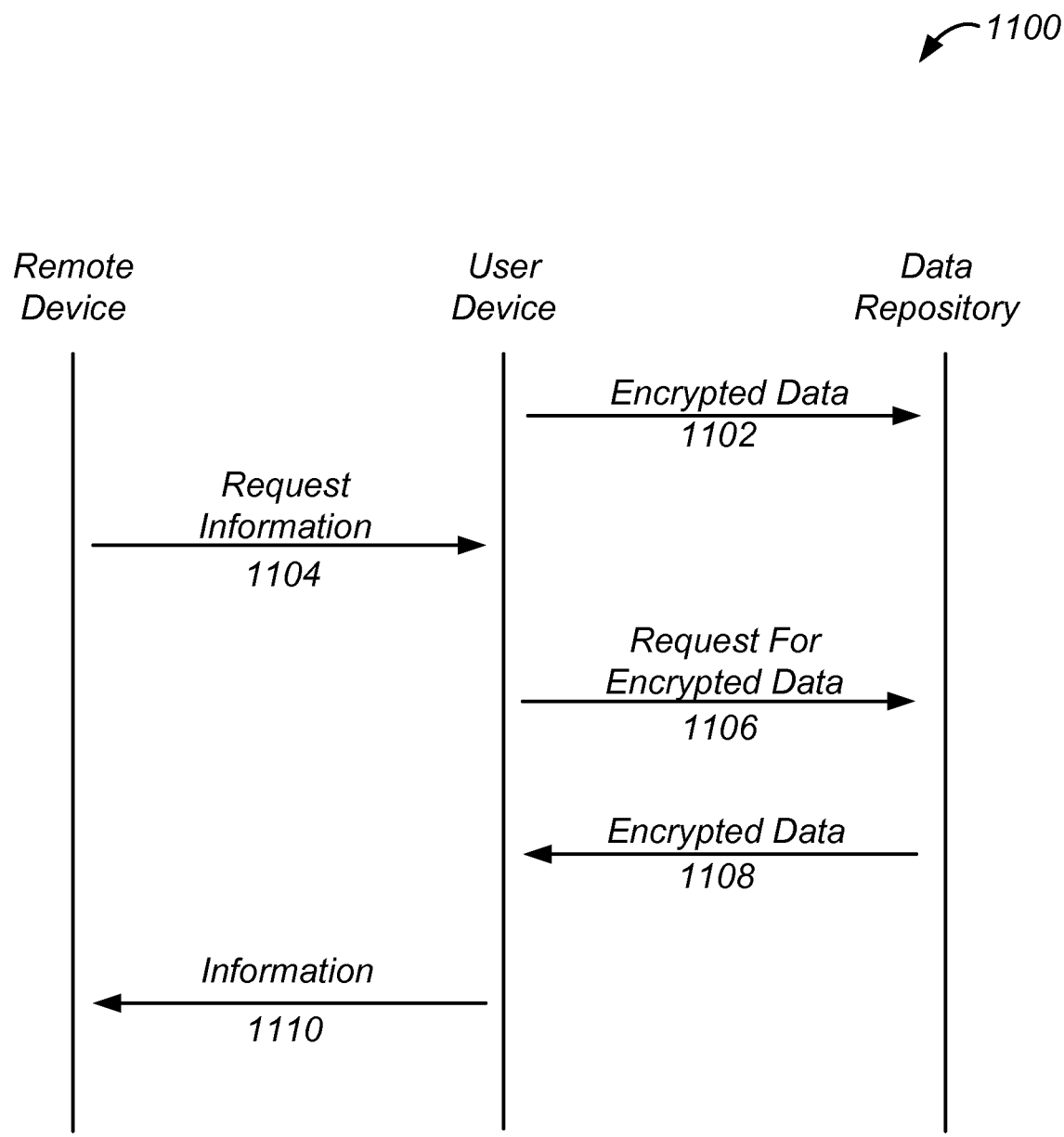
FIG. 11 is a simplified sequence diagram illustrating a method for protecting encrypted data according to an embodiment of the present invention.

FIG. 11 is a simplified sequence diagram 1100 illustrating a method for protecting encrypted data according to an embodiment of the present invention. As illustrated in FIG. 11, the user device sends encrypted data to the data repository (1102). In some implementations, this will be preceded by the user device receiving information from a user, or from some other source. In this embodiment, the user device first encrypts data associated with the information, and then sends the encrypted data to the data repository. Note that in the alternative embodiment discussed above, the user device could instead send the information and encryption key to the data repository, where the data repository would handle the encryption.

A remote device sends a request for information to the user device (1104). Typically, the request for information from the remote device need not be contemporaneous with the user device sending the encrypted data to the data repository. Also, multiple remote devices may send requests for information to a single user device. In other words, a single user device can engage in transactions with multiple remote devices, and may need the same or different information for each remote device. In one configuration, the user provides information to the user device and the encrypted data is sent to the data repository in one session. Thereafter, each subsequent request for information from a remote device accesses a common set of encrypted data at the data repository.

The user device sends a request for the encrypted data to the data repository (1106). This request can be contemporaneous with the request for information from the remote device, and may be part of completing an online transaction. In one embodiment, the entire contents of the encrypted data are requested by the user device. In another embodiment, the user device only requests data from specific field-value pairs within the encrypted data. In response, the data repository sends the encrypted data to the user device (1108). If only a portion of the encrypted data was requested by the user device, then only that portion will be returned to the user device. In other embodiments, the entire contents of the encrypted data are sent to the user device. Note that according to an alternative embodiment described above, instead of requesting encrypted data, the user device could instead send the encryption key to the data repository. The data repository could then decrypt the data and send the data associated with information (or the information itself) to the user device, thereafter deleting the encryption key.

The user device receives the encrypted data, recovers the information for the transaction from the encrypted data, and sends the information to the remote device (1110). In one embodiment, only a portion of the information needs to be sent to the remote device. Therefore, the user device selects the relevant portions of the information and sends them to the remote device.

Figure 12:
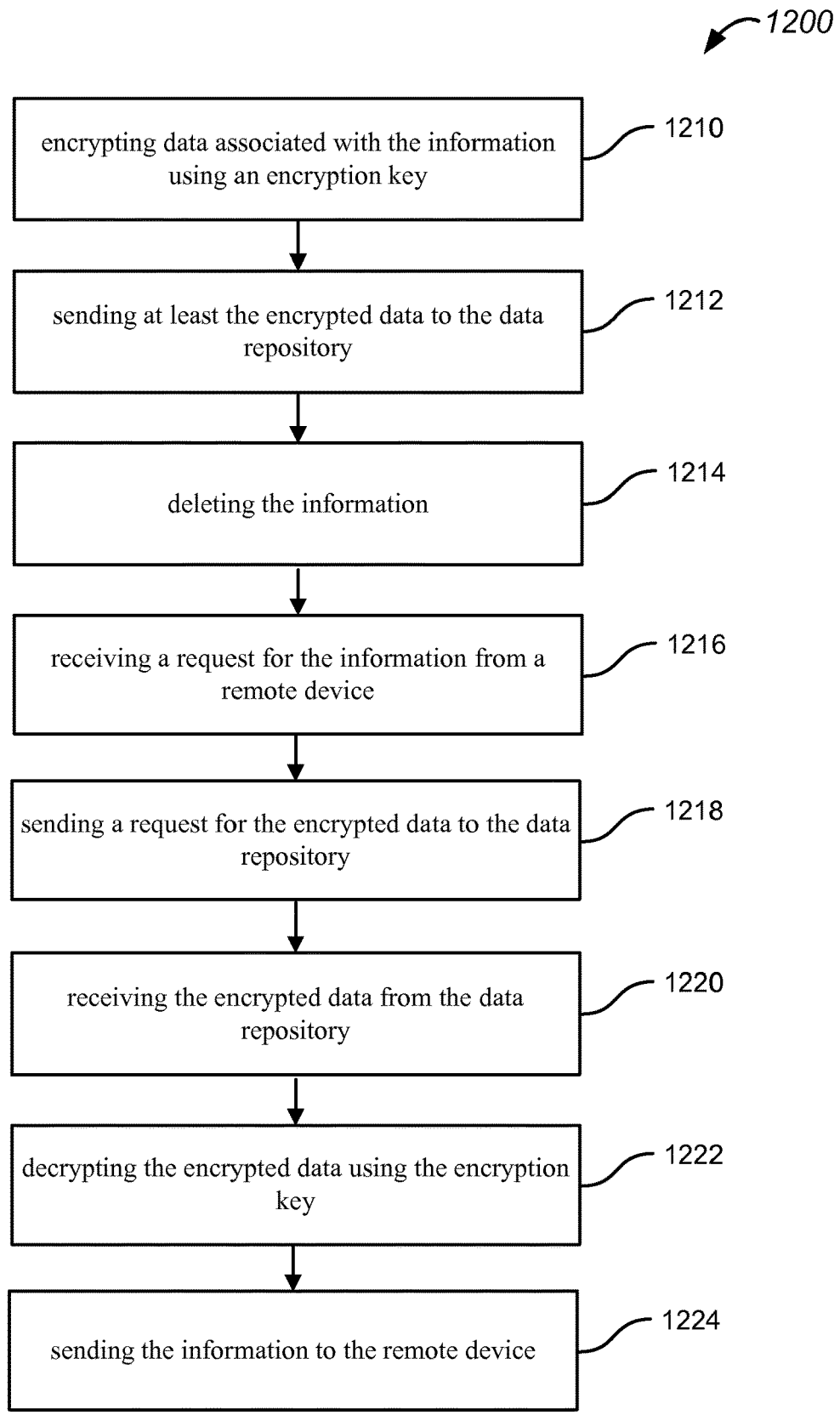
FIG. 12 is a simplified flowchart illustrating a method for using information in conjunction with a data repository according to an embodiment of the present invention.

FIG. 12 is a simplified flowchart illustrating a method 1200 for using information in conjunction with a data repository according to an embodiment of the present invention. The method 1200 includes encrypting data associated with the information using an encryption key (1210). The information comprises any information describing a characteristic of a user, a user system, or any other information that may be useful in a transaction. In one embodiment, the transaction information comprises an account number. In other embodiments, the transaction information can comprise payment methods, an address associated with a user, shipping addresses, billing addresses, usernames, money spent, reward or loyalty numbers, e-mail addresses, contact information, credit card numbers, routing numbers, signed documents, dates, devices involved in the transaction, user permissions, shopping histories, reputations, user ratings, other purchased items, business associations, family members, friends and associates, major cars or appliances owned, subscriptions, prescriptions, frequent purchases, medical histories or information, favorite retailers, or the like. Generally, transaction information can comprise any information that can be associated with a transaction. Therefore, this list of examples is merely exemplary and not meant to be limiting.

Data associated with the information may include portions of the information, or may rearrange or alter the format of the information. For example, the data associated with the information can reorganize the information into a list of field-value pairs. Additionally, the data associated with the information can append values to certain fields in the information, such as appending the indicators "AMEX" or "VISA" to a credit card number. The data associated with the information can also remove information that is redundant or stored elsewhere on a computer system. For example, the data could store a single address if the billing address, shipping address, work address, and/or home address are the same. In one embodiment, the data associated with the information comprises the information itself without addition or subtraction.

In one embodiment, the information is used in a transaction between a user and the remote device. The transaction can comprise the user making a purchase from the remote device, or from an operator of the remote device. The transaction can also comprise authenticating the identity of the user to the remote device, such as logging into an account. The encryption key can be a symmetric encryption key or an asymmetric encryption key. One having skill in the art will readily recognize many different encryption algorithms that can be used to encrypt the data.

The method also includes sending at least the encrypted data to the data repository (1212). In one embodiment, additional information is also sent with the encrypted data to the data repository, such as user's account number with the data repository, or other identifying information so that the data repository can store the information in the correct location. The encrypted data can be sent over a secure network connection, or it can be sent in the clear because it is encrypted, depending on the embodiment.

The method also includes deleting the information (1214). For security reasons, the information is not maintained on the user device in an unencrypted form. In one embodiment, the information resides in secure memory on the user device, such that other applications are not allowed to access information. Additionally, the information can be deleted by repeatedly writing random data in the information's memory location, such that no representation of the information can be found on the user device, including in freed/unallocated memory. In one embodiment, the method further includes deleting the encrypted data from the user device. Like the information, the encrypted data can be stored in secure memory and deleted using procedures similar to those described above. This prevents both the encryption key and the associated encrypted data from being stored on the same device.

The method further includes receiving a request for the information from a remote device (1216). The request may be received as part of logging into a website, part of initiating or completing a transaction, or as part of establishing a relationship with a party associated with the remote device. In one embodiment, the request for information can be implied, either by custom or by previous transactions. For example, a website may advertise an online bill pay service that requires users to fill out a form and submit the form by e-mail. It will be understood by a user that they will need to fill out the form and return it in order to participate in the online bill pay service. Therefore, by making public expectations known, the user may be considered to have received a request for information from the website. Similarly, if a user is expected to provide information to a remote device that is operated by employer on a regular monthly basis, this expectation may be considered receiving a request from the employer to provide information. Therefore, receiving a request for the information need not be a formal request, but can be interpreted to broadly include other implied forms of inviting information.

The method additionally includes sending a request for the encrypted data to the data repository (1218). In embodiments where the encryption takes place on the user device, the request does not need to include the encryption key. In one embodiment, the data associated with the information comprises a field and a value. The user module operating on the user device is configured to encrypt a field associated with the request from the remote device. The encrypted field is then sent with the request for the encrypted data to the data repository. The data repository is further configured to retrieve the encrypted data by comparing the encrypted data to the encrypted field. For example, to represent a name, the data associated with the information includes a field-value pair of <name><"Steve">. If the remote device only needs the user's name, then the user device can encrypt the field value of "name" and send this to the data repository. The data repository can then compare the encrypted "name" fields with the other encrypted fields in the encrypted data and return only the associated encrypted value ("Steve"). In another embodiment, the user device simply requests all of the encrypted data.

The method further includes receiving the encrypted data from the data repository (1220). Note that depending on the request, this can include the entire contents of the encrypted data, or any encrypted values that are associated with specifically requested fields. The method also includes decrypting the encrypted data using the encryption key (1222). If the entire contents of the encrypted data were sent from the data repository, then the user device can selectively decrypt only the needed portions of the encrypted data. Otherwise, the entire contents of the encrypted data can be decrypted. The method also includes sending the information to the remote device (1224). In one embodiment, sending the information to the remote device comprises automatically filling out an online form by populating fields in the form with matching fields in the information. For example, a button can be provided with an online web form, that when selected by a user, automatically carries out the method of FIG. 12 to populate the form data with the user's information that is stored at the data repository in an encrypted form.

In one embodiment, the data repository will only release the encrypted information to an endpoint, such as a user module operating on a user device, if rules associated with particular fields are met. Each field/value pair can have one or more rules associated with its release from the data repository. If a request from a user module comprises multiple fields, then the rules for each field may need to be satisfied. If rules for some fields are satisfied while rules for other fields are not satisfied, then the data repository has the option of releasing only the fields with rules that were satisfied. For example, if fields A, B and, C were requested by a user module, and only the rule(s) associated with A are met, then the data repository can only send the encrypted value associated with A to the user module. Therefore, the data repository can both store and enforce rules associated with each field. It should be noted that other embodiments may release fields without regard for rules, or may send all requested fields if any single rule is met.

Many different types of rules for releasing values associated with fields are used by various embodiments. In one embodiment, a user module can prove that it is operating on a valid device. A valid device may include devices that are registered with the data repository. The user module could send a hash of a device specific ID that is "salted" with a deterministic value that can be compared to a value at the data repository. In another embodiment, a user may be required to supply a PIN on an out-of-band device, such as a smart phone, tablet computer, mobile computing device, or the like. In another embodiment, the user may be required to prove to the data repository that the user knows a password associated with a virtual identity by using asymmetric proof supplied by the data repository. Elsewhere in this disclosure, these rules may be referred to as "authentication levels," and can include any of those requirements discussed herein. If multiple fields require multiple rules to be satisfied, or if there are multiple rules associated with a single field, then the data repository may determine that some rules supersede others. In one embodiment, only the most secure rule is required to be satisfied. In another embodiment, rules requiring a PIN or password may obviate rules requiring mere acknowledgment of a transaction. In other words, the data repository can analyze multiple rules and determine that only a subset of those rules needs to be satisfied in order to release all of the values associated with the requested fields.

In one embodiment, the rules for releasing values to a user's device are specified by the user. In another embodiment, the rules for releasing values may also be influenced or determined by the data repository itself. In another embodiment, the remote device may also determine rules associated with certain fields. It should be emphasized that in one embodiment, the data repository includes only encrypted data, which includes encrypted fields and encrypted values. User devices request data from the data repository by encrypting one or more fields (or field names, or other identifiers of the fields that are stored at the data repository in encrypted form) and sending the encrypted fields to the data repository. The data repository then compares the encrypted fields with encrypted fields previously stored by the user at the data repository. If matches are found, the encrypted values associated with the encrypted fields are returned to the user module. The encrypted values are then decrypted at the user module. If the values/fields were encrypted using symmetric encryption, then the same encryption key used to encrypt the field/values can be used for decryption. If asymmetric encryption was used, then a decryption key associated with the encryption key can be used to decrypt the value/fields. This disclosure may, in places, refer to data that is decrypted using an encryption key. If asymmetric encryption is used, then the "encryption key" refers to a decryption key, which is often a private key. It should be noted that in other embodiments data is not necessarily encrypted in field-value pairs, but is instead stored in different formats, and in different ways.

Furthermore, in one embodiment no encrypted data is stored on the user device. Data may be stored in RAM or in secure memory, and may be erased immediately after it is encrypted and sent to the data repository. In one embodiment, field names may be stored on the user device so that they can be encrypted and sent to the data repository in order to request the associated values.

The description of the method of FIG. 12 makes reference to a user device. This description applies equally to a software module, or user module, operating on a user device. The user module may be provided by an entity associated with the data repository. For example, the OneID system described elsewhere in this disclosure may be associated with the data repository, and can provide an app to operate on a mobile computing device that will interact with the data repository. Additionally, the OneID system can provide code that runs in a web browser on a user's desktop computer, or like device.

Figure 13:
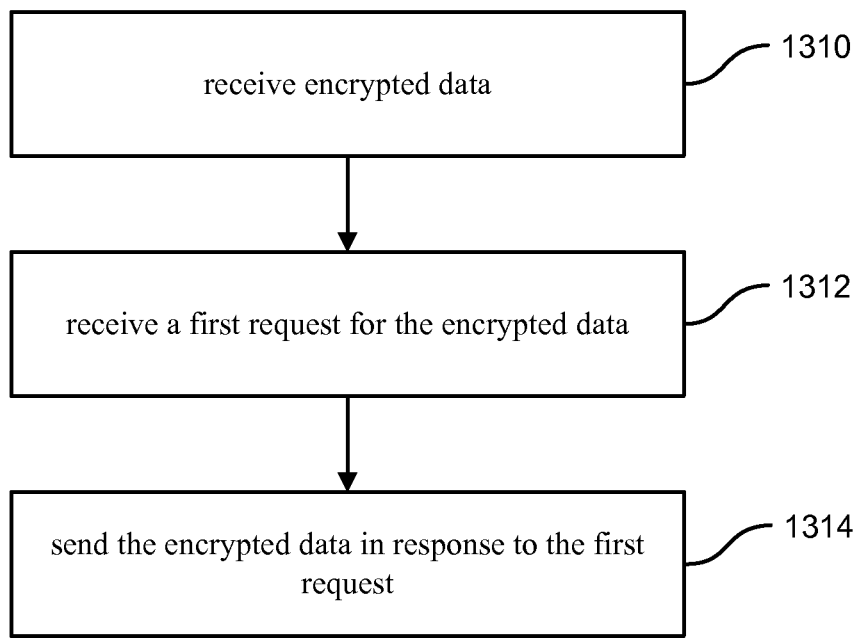
FIG. 13 is a simplified flowchart illustrating a method for storing encrypted data using a data repository according to an embodiment of the present invention.

FIG. 13 is a simplified flowchart illustrating a method 1300 for storing encrypted data using a data repository according to an embodiment of the present invention. This method describes the operations that may be carried out by the data repository on the other end of the transaction described in the method of FIG. 12. The method includes receiving encrypted data (1310). The encrypted data can be received as described above. In one embodiment, the user device prevents the encryption key from being stored in the data repository. This can be accomplished by ensuring that the encryption key is not transmitted to the data repository. The data repository can comprise a fully encrypted data store. Thus, no information received from a user, including encryption keys can be maintained in the clear on the data repository. In these embodiments, the data repository is not capable of decrypting information received from a user device. The data repository may be remotely located from both the user device and a remote device. Often, this will entail a server operating at a physical site that is not associated with either the user or the operator of the remote device. The method also includes receiving a first request for the encrypted data (1312), and sending the encrypted data in response to the first request (1314).

It should be appreciated that the specific steps illustrated in FIG. 12 and FIG. 13 provide particular methods of using an encrypted repository according to embodiments of the present invention. Other sequences of steps may also be performed according to alternative embodiments. For example, alternative embodiments of the present invention may perform the steps outlined above in a different order. Moreover, the individual steps illustrated in FIG. 12 and FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

It will be understood in light of this disclosure that the examples and embodiments described herein are for illustrative purposes only and that various modifications or changes in light thereof will be suggested to persons skilled in the art and are to be included within the spirit and purview of this application and scope of the appended claims.

Delayed Authentications

Embodiments of the present invention provide methods and systems for enabling delayed authorization of online transactions. After the initiation of a proposed transaction, a predetermined time period is provided in which notifications are transmitted and communications can be subsequently received to reject the proposed transaction.

Sensitive transactions (e.g., bank transfers of money out of your account) can be delayed using embodiments of the present invention to provide for enhanced security for users. As described more fully throughout the present specification, these sensitive transactions may be posted to a user's OneID account and then notifications related to the transaction can be pushed to one or more of the user's devices. The devices can authorize the transaction and any single device can cancel the transaction. As described herein, a predetermined time period is provided during which the transaction is delayed in order to facilitate a waiting period during which cancellation of the transaction can occur. The waiting period is user-definable in some embodiments and can be modified, for example, changed at any time as long as the user waits for the current wait period.

Figure 14:
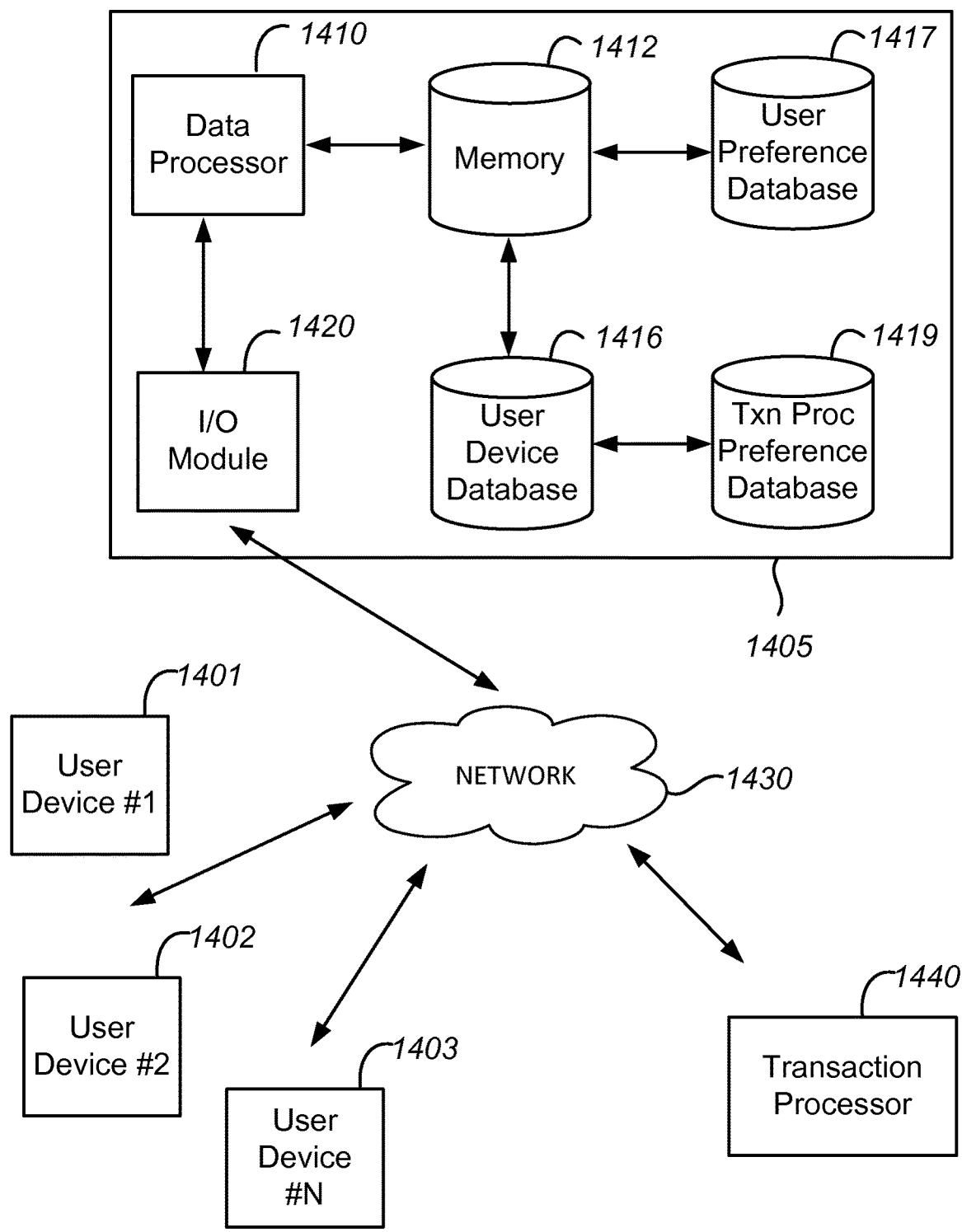
FIG. 14 is a high level block diagram of an apparatus for enabling delayed authorization according to an embodiment of the present invention.

FIG. 14 is a high level block diagram of an apparatus for enabling delayed authorization according to an embodiment of the present invention. As illustrated in FIG. 14, multiple user devices 1401, 1402, and 1403 interact with an identity server 1405 through a network 1430. The user devices, which can also be referred to as control devices or access devices, can be associated with a single user or entity or multiple entities. Thus, in an implementation, a child with user device #1 (1401) could interact with the system, with notifications being provided to the child's parent with user device #2 (1402). A transaction processor 1440, which can be a financial services provider, a merchant, a charity, a government agency, or the like, interacts with the user devices 1-N (1401-1403) and the identity server 1405 through network 1430.

The identity server 1405, also referred to as the OneID service includes an input/output module 1420, a data processor 1410, a memory 1412, and a user device database 1416. The system also includes a user preference database 1417 and a transaction processor preference database 1419. As described more fully throughout the present specification, the various databases can be utilized to manage notifications related to requested transactions. Other databases and systems may be utilized by the identity server as appropriate to the particular application.

The data processor 1410 can be a general purpose microprocessor configured to execute instructions and data, such as a processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The memory 1412 can be local or distributed as appropriate to the particular application. Memory 1412 may include a number of memories including a main random access memory (RAM) for storage of instructions and data during program execution and a read only memory (ROM) in which fixed instructions are stored. Thus, memory 1412 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

Data on users, including devices associated with users and their capabilities, users' preferences for security levels for authorization, and transaction processor preferences can be stored in the databases utilized by the identity server 1405. Additionally, external databases (not shown) can be utilized as appropriate to the particular application.

Embodiments of the present invention provide security for transactions, even in the context of one or more of a user's devices being compromised. Referring to FIG. 14, if devices 1401 and 1402 are compromised, for example, under the control of a malicious third party, these devices could be utilized to initiate a fraudulent transaction. Because device 1403 is not compromised and still under the control of the authorized user, the user is able to receive the notification of the proposed transaction and can utilize device 1403 to reject the proposed transaction.

In some embodiments, approval from one or more of the user's devices is required in order to complete the processing of the proposed transaction. Although a malicious third party controlling some of the user's devices could communicate an approval from one of these compromised devices, the user would be able to object to the proposed transaction.

In some embodiments, the predetermined time period is varied depending on one or more factors, including the value of the transaction, the time period since the last transaction, or the like. In various embodiments, the predetermined time period ranges from several minutes to several hours to several days or longer periods. As an example, the predetermined time period could be set at 6 hours for transactions under $1,000, 12 hours for transactions between $1,000 and $5,000, and 24 hours for transactions over $5,000.

As an example, an address change transaction can be performed as follows. A user device, for example, a desktop computer, is used to initiate an address change at a bank's website. For this particular transaction, a waiting period of 24 hours is set by either the bank, the identity server, or the user. Preferences for any of these entities can be stored at the identity server or using other suitable memory systems. When the bank receives the request to change the address, a notification is sent to the identity server indicating the request for the address change transaction. A notification is returned to the user device, indicating that the request has been received and will be processed in 24 hours if either all user device approve the transaction or none of the user devices reject the transaction within the 24 hour window. Notifications related to the address change are also transmitted to the user's other devices, including mobile devices.

Assuming that a malicious third party initiates the request using the user's computer and controls one or more of the user's additional devices, the malicious third party can approve the address change using the devices under their control. However, if the user is still in control of one of their devices, the user can reject the transaction in response to the notification received at the device under the user's control.

If, upon expiration of the waiting period of 24 hours, no rejections have been received, then the transaction will proceed, effecting the desired address change. Thus, embodiments of the present invention provide for powerful authorization control systems since, even if all but one of a user's devices are compromised, the user still possesses the ability to reject proposed transactions initiated by malicious entities.

According to some embodiments of the present invention, the security level imposed by the system is determined as the highest security level provided by any of the devices. As an example, if a transfer of $10,000 from a bank account is requested by a user using their mobile device, the security level imposed will be the highest security level provided by the user's mobile device, the user's desktop computer, the user's tablet computer, etc.

The user device database 1416 stores data on devices that are associated with a user, which may be referred to as associated with a user's identity. During performance of the methods described herein, any of the devices associated with the user can be involved in the transaction approval process.

In some embodiments, the transaction provider can determine that the transaction is a high security transaction and can initiate the notification of the user's other devices of the transaction. In other embodiments, data stored in the identity server 1405, for example, in either the user preference database 1417 or the transaction processor preference database 1419 can be used to determine the time period associated with the waiting period, the devices that are to be notified, or the like.

As an example, when a transaction request is received at the transaction processor 1440, a notification related to the transaction can be sent to the identity server 1405. The identity server, in turn, will determine the notification preferences, using, for example, the user preference database 1417 and/or the transaction processor database 1419, and determine the devices that are to be notified, using, for example, the user device database 1416. Notifications will then be sent through the network to the user's devices or other suitable devices, notifying the user that the transaction will be processed if not rejections are received within the predetermined time period (e.g., 24 hours).

Transaction processors are not limited to financial institutions, but can include stores, charities, banks, government agencies, or the like.

Although only devices associated with a user are illustrated in FIG. 14, other embodiments can utilize other devices that are associated with other users. In this example, when a first person initiates a transaction, notifications can be delivered to that person's devices, as well as other devices associated with another person, for example, a parent, a spouse, a co-signor, or the like. Thus, notifications, approvals, and rejections are not limited to devices associated with only one person or entity.

The user device database 1416 can include information related to devices owned or operated on behalf of the user, devices authorized for the user, with limits on authorization for various devices. For example, a desktop computer in a secure work area may have a higher transaction value limit than a mobile device. A mobile device with a password to unlock may have a higher transaction value limit than an unlocked mobile device. One of ordinary skill in the art would recognize many variations, modifications, and alternatives.

The user preference database 1417 can include information related to preferences established by the user or on behalf of the user, including transaction value limits, time periods during which transaction values are raised, for example, the evening if this is the time that at the user typically pays bills and conducts financial transactions. The user preference database can also indicate when notification of other users is appropriate for a particular transaction. Additionally, for certain transaction types, the user may set a preference for security that is higher than the security preferences set as default values by either the identity server or the transaction processor, thus enabling the user to override the security preferences and increase the level of security, the waiting time, or the like. Thus, one or several entities can set the security rules so that when a high value transaction is requested (e.g., a $10,000 money transfer), the waiting period is set at the default value or increased or decreased as appropriate. One of ordinary skill in the art would recognize many variations, modifications, and alternatives.

It should be noted that if a user preference stored in the device contradicts the user preferences stored in the user preference database, the more conservative user preference will typically trump the other user preference. Since a mobile device can be hacked, with the hacker shortening the time period associated with a transaction, the original longer time period stored in the user preference database 1416 would be used to ensure that security is not impacted adversely by the reprogramming of the user device.

The sensitivity of the transaction, which can drive the waiting time, the number of devices notified, including devices other that those associated with the user, and the like, can be determined based on inputs from the user, from the identity server, by the transaction processor, combinations thereof, or the like.

In an embodiment, once the user requests the transaction, (implying approval on the part of the user), the transaction will not proceed until either the identity server or the transaction processor fail to receive a rejection (i.e., a negative approval) within the predetermined time period.

In some implementations, the value of the transaction, the time at which the request was received, or the like can be compared to the user preferences, the transaction processor preferences, and/or the identity server preferences to determine the notifications that are sent. As an example, the user preferences may specify that notifications for transactions under $100 only have to be sent to the user's mobile phone and not to other user devices. The transaction processor (e.g., a bank) may not apply the waiting period for transactions less than $500 and the identity server may not apply the waiting period for transactions less than $250. When the user initiates a transaction for $50, then neither of the rules associated with the transaction processor or the identity server are impacted and only a single notification is sent to the user's mobile phone based on the user's preferences. When the user initiates a transaction for $1,000, notifications will be sent to more devices than the user's mobile phone and the waiting periods defined by the user, the identity server, and the transaction processor will both be examined to find the longer of the various waiting periods.

Table 1 illustrates thresholds and actions suitable for use with embodiments of the present invention. As shown in Table 1, for transactions under $100, the user and identity server preferences trump the transaction processor preferences, with notifications only being sent to the user's mobile phone. For transactions greater than $1,000 but less than $10,000, the user preferences are trumped by the other preferences that result in the notification of all user devices. Notifications are not limited to user devices as illustrated by the notification of a spouse's devices for transactions over $10,000.

TABLE 1

| Transaction Value | User Preferences | Transaction Processor Preferences | Identity Server Preferences |
| --- | --- | --- | --- |
| <$100 | Only mobile phone notified | No notifications | Only mobile phone notified |
| $100-$1,000 | Only mobile phone notified | No notifications | Only mobile phone notified |
| $1,001-$10,000 | Only mobile phone notified | All user devices notified | All user devices notified |
| >$10,000 | All user devices notified + Spouse's devices notified | All user devices notified | All user devices notified |

Although transaction value is illustrated in Table 1, similar preferences can be defined for the predetermined time period, the time at which the transaction is initiated, the frequency with which transactions are initiated, cumulative transaction value as a function of time, and the like. In some embodiments, specific authorizations from specific devices may be required, for example, not only notification and lack of rejection from the user's mobile phone, but an affirmative approval from the user's mobile phone. As noted above, the various preferences can be inter-related with higher value transactions being associated with longer waiting times, etc. One of ordinary skill in the art would recognize many variations, modifications, and alternatives.

Figure 15:
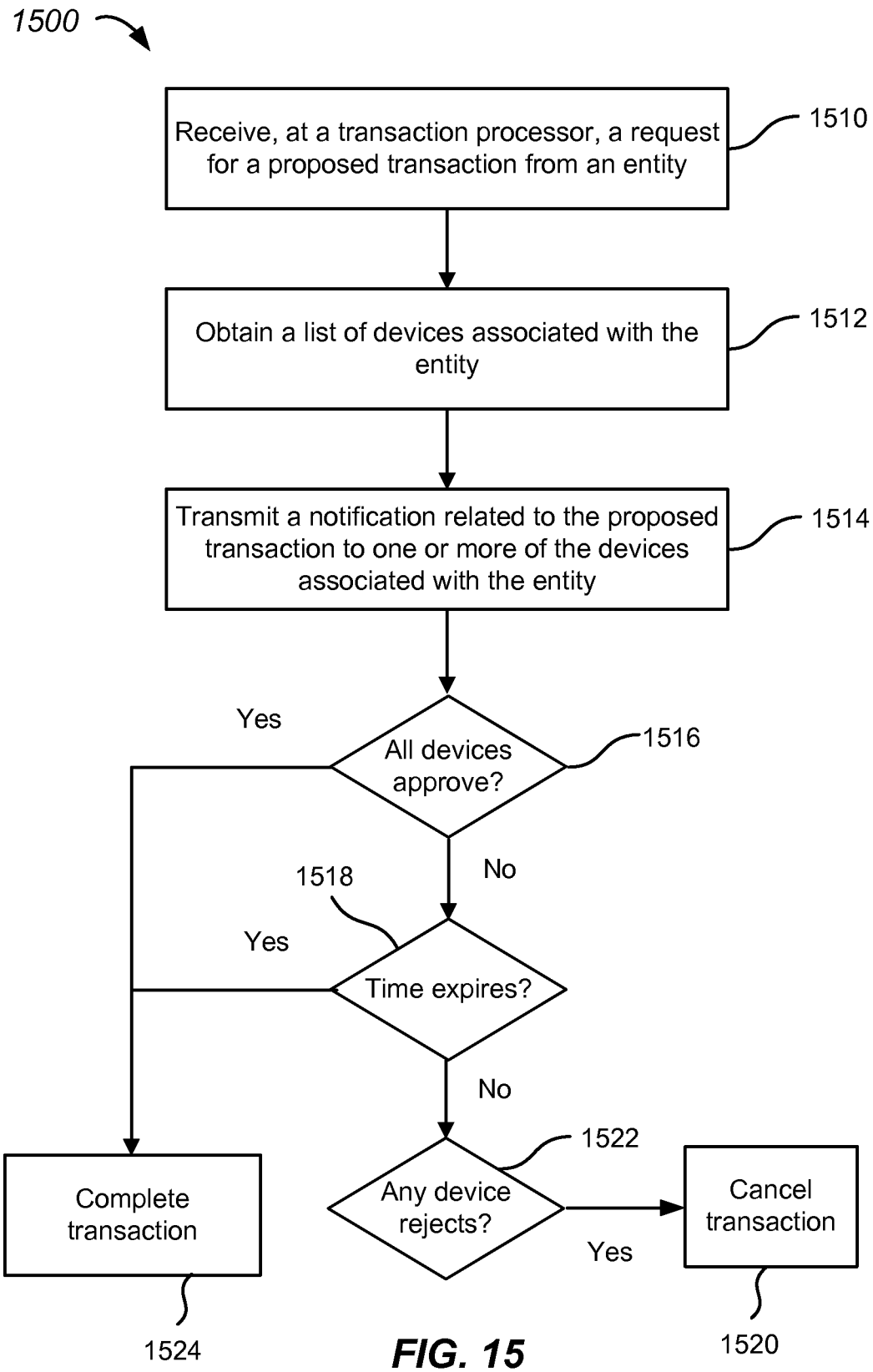
FIG. 15 is a simplified flowchart illustrating a method of processing a transaction according to an embodiment of the present invention.

FIG. 15 is a simplified flowchart illustrating a method of processing a transaction according to an embodiment of the present invention. The method 1500 includes providing a processor and receiving a request for a proposed transaction from an entity (1510). The entity can be a user, a company, a customer, or the like and the request can be received at a transaction processor such as a financial institution. The method also includes obtaining a list of devices associated with the entity (1512).

In an embodiment, the request is received at a transaction processor and in order to obtain the list of devices associated with the entity, the transaction processor transmits a request to an identity server and receives the list of devices from the identity server in return. In other embodiments, the transaction processor maintains a list of devices associated with the entity, which can be provided by the entity, cross-referenced with the identity server, or the like. In an example, the request is received from a first device of the devices associated with the entity (a desktop computer) and the rejection is received from a second device of the devices associated with the entity (a mobile phone). The transaction processor may transmit a notification related to the request for the proposed transaction to the identity server.

The method further includes transmitting a notification related to the proposed transaction to the devices associated with the entity (1514). The notification can include information including the transaction request, the amount of the transaction, information on past transactions, and the like. The method includes determining, using the processor, (a) that an approval is received from all the devices associated with the entity to which the notifications were sent (1516) or (b) that a predetermined time period has expired (1518). The predetermined time period can be a function of a value of the proposed transaction. If either of these conditions are met, then the proposed transaction is processed (1524).

Alternatively, a determination could be made, using the processor, that a rejection is received from one or more of the devices associated with the entity (1522). In this case, the proposed transaction is canceled (1520).

It should be appreciated that the specific steps illustrated in FIG. 15 provide a particular method of processing a transaction according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
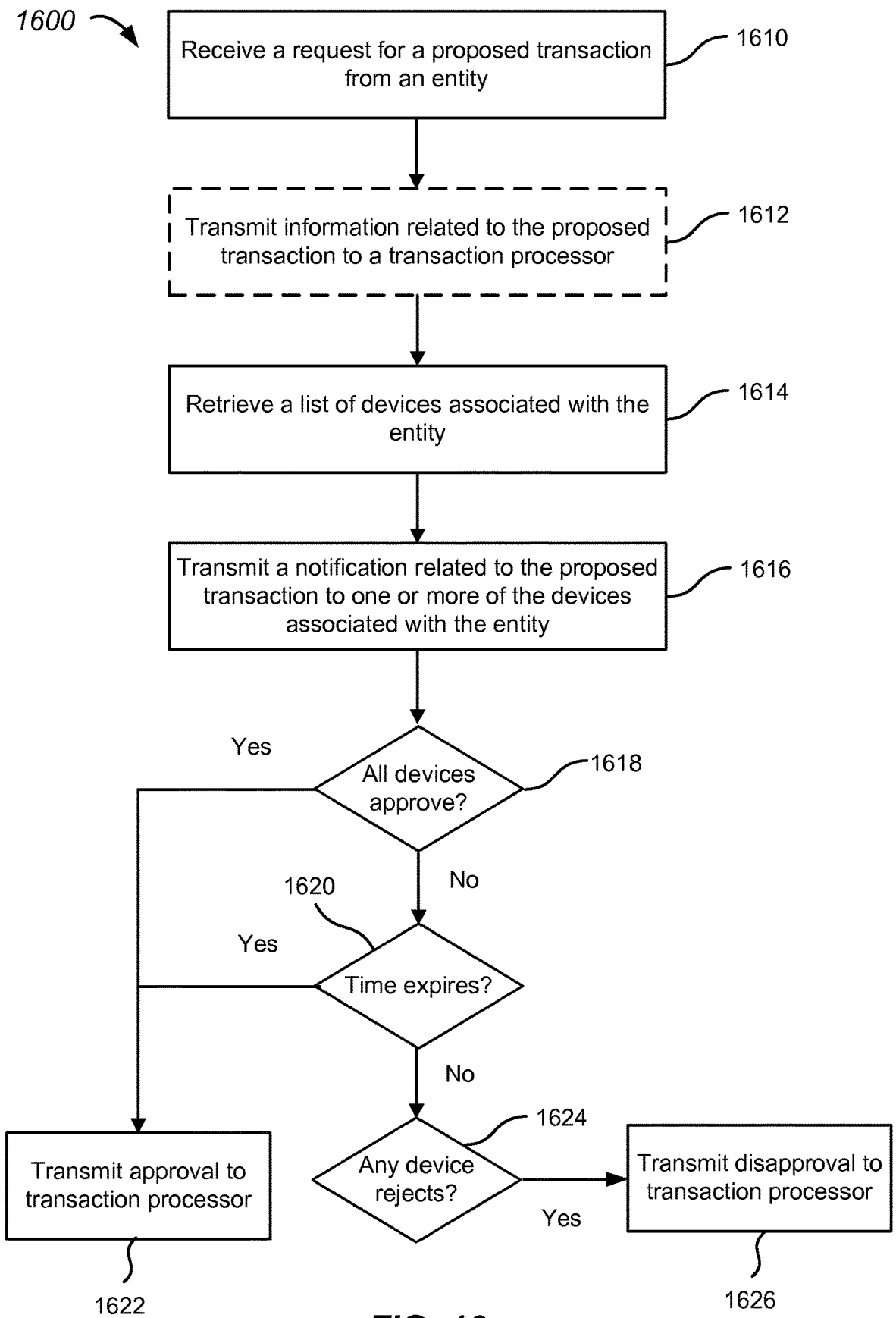
FIG. 16 is a simplified flowchart illustrating a method of authorizing a transaction according to an embodiment of the present invention.

FIG. 16 is a simplified flowchart illustrating a method of authorizing a transaction according to an embodiment of the present invention. The method 1600 includes providing a processor, receiving a request for a proposed transaction from an entity (1610), and retrieving a list of devices associated with the entity (1614). The list of devices associated with the entity can be predefined by the entity.

In an embodiment, the request is received at an identity protection system, or an identity management system, that is coupled, through a network to a variety of users and a variety of transaction processors such as merchants, websites, and the like. In some embodiments, the method can include transmitting information related to the proposed transaction to the transaction processor.

The method also includes transmitting a notification related to the proposed transaction to the devices associated with the entity (1616) and determining, using the processor, (a) that an approval is received from all the devices associated with the entity (1618) or (b) that a predetermined time period has expired (1620). The predetermined time period can be a function of a value of the proposed transaction. If either of these conditions are met, then an approval of the proposed transaction is transmitted to a transaction processor (1622), such as a financial institution. In some embodiments, a notification related to the proposed transaction and information related to the predetermined time period is transmitted to the transaction processor before transmitting the approval of the proposed transaction to the transaction processor.

Alternatively, if the determination is made that a rejection is received from one or more of the devices associated with the entity (1624), then a disapproval of the proposed transaction is transmitted to the transaction processor (1626).

In embodiments in which the request is initially transmitted to the identity server, the identity server can implement the security rules, enforcing the cooling off period or waiting period before authorization for the transaction is transmitted to the transaction processor. As an additional level of security, the identity server could notify the transaction processor of the request and the length of the waiting period near the time the request is received. In this example, the transaction processor could then verify the expiration of the waiting period when the authorization is subsequently received by comparing the time the notification of the request was received and the time that the authorization was received.

It should be appreciated that the specific steps illustrated in FIG. 16 provide a particular method of authorizing a transaction according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
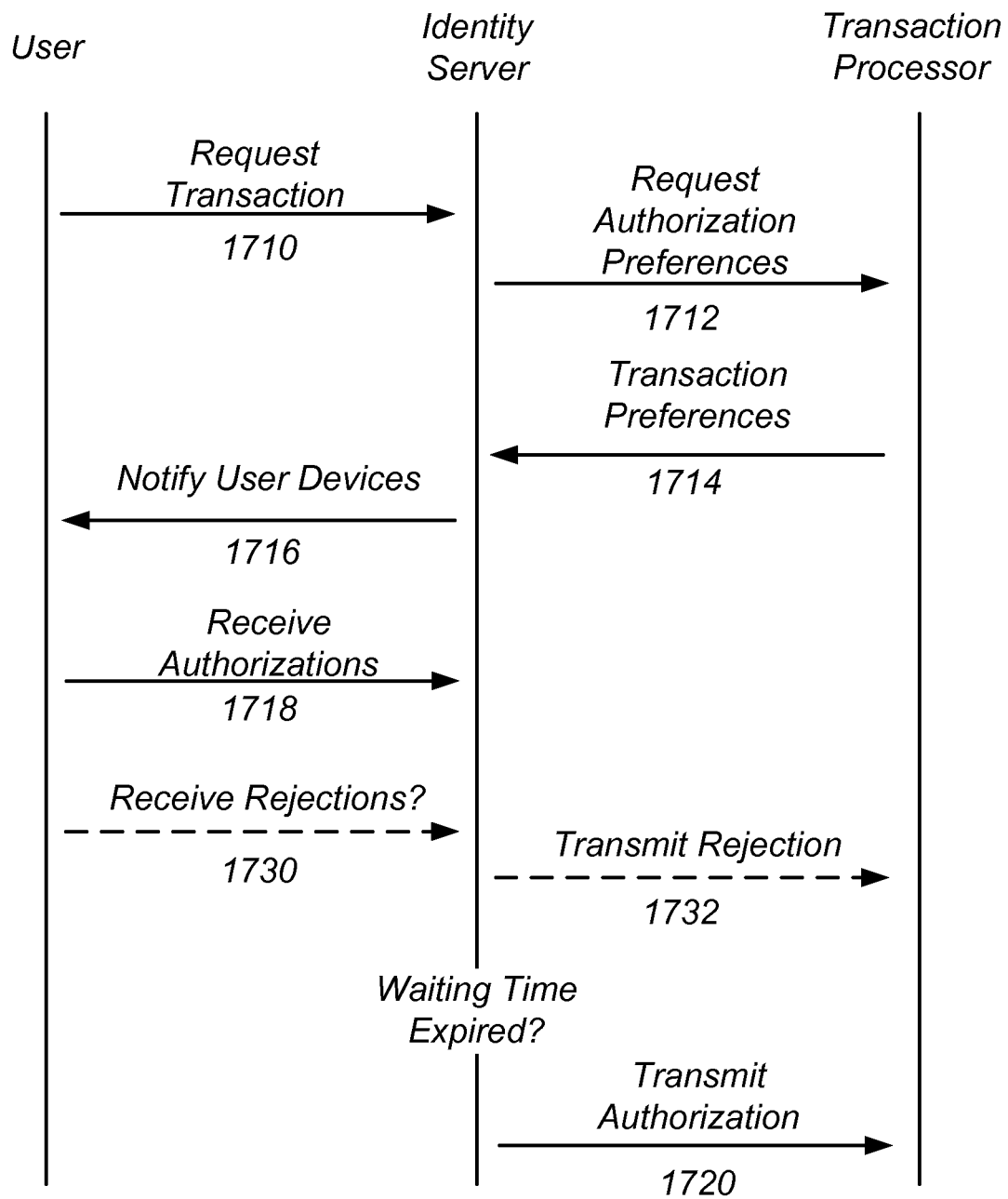
FIG. 17 is a simplified sequence diagram illustrating a method of authorizing a transaction according to an embodiment of the present invention.

FIG. 17 is a simplified sequence diagram illustrating a method of authorizing a transaction according to an embodiment of the present invention. As illustrated in FIG. 17, a request for a transaction is received from the user at the identity server (1710). In some implementations, the transaction request is sent to the identity server in conjunction with the transmission of the request to the transaction processor, which can be a bank, a store, a charity, or the like.

The identity server transmits a request for authorization preferences to the transaction processor (1712), which responds with its transaction preferences (1714). Typically, the request for authorization preferences will include some information related to the requested transaction since, as described above, the security preferences can depend on the value of the transaction, and the like. The identity server compares the transaction preferences from the transaction processor with transaction preferences associated with the user as well as transaction preferences associated with the identity server, all in the context of the transaction request that was received. As an example, the transaction preferences for the particular transaction as specified by the transaction processor can be more conservative than other preferences, including the number of devices to be notified, the waiting time period, specific authorizations that are required, or the like.

Depending on the outcome of the above comparison, user devices are notified with information related to the requested transaction (1716). In some implementations, notification of the proposed transaction is delivered to multiple devices associated with a user. In some embodiments, a subset of the user's devices are notified, whereas in other embodiments, all of the user's devices are notified. In addition, some embodiments notify devices other than the user's devices, for example, a spouse's device, a parent's device, a co-worker's device, or the like. Authorizations can be received from one or more devices (1718) but typically, the authorizations will not result in completion of the transaction. In some implementations, an affirmative reply from all notified devices can result in transmission of authorization for the transaction.

Additionally, rejections can optionally be received from one or more of the notified devices (1730), which will result in a transmission of a transaction rejection message to the transaction processor (1732). Assuming that no rejections are received, after a predetermined time period has expired, for example, 24 hours, the requested transaction is authorized (1720). In some embodiments, the transaction processor monitors the time from the request of the authorization preferences (1712), which may provide enough information on the transaction for the transaction processor to complete the transaction after the expiration of the waiting time assuming no rejections have been submitted. Thus, if no objection is raised by any of the devices within the predetermined time period, the proposed transaction is completed.

In some implementations, a provisional approval is provided and transmitted to the user. Additionally, although the implementation illustrated in FIG. 17 channels communications through the identity server, this is not required by the present invention and the user can interact directly with the transaction processor to submit authorizations and rejections. Thus, some of the processing can be shifted to the transaction processor as appropriate to the particular application. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of securely authorizing an electronic transaction by an identity protection system, the method comprising:

receiving a proposed transaction involving a user;

accessing a list of devices associated with the user, the list identifying a plurality of devices that have been preselected by the user, wherein the plurality of devices includes a new device, the new device having been approved by two pre-existing devices in the plurality of devices or approved in advance by a preset time interval by one pre-existing device in the plurality of devices;

causing presentation of (1) the proposed transaction and (2) an option to approve or disapprove the proposed transaction to each respective person using each of the plurality of devices, wherein responses to the presented option, if provided, are transmitted to the identity protection system by the plurality of devices;

receiving the responses from at least a subset of the plurality of devices; and causing completion of the proposed transaction after a predetermined amount of time if all of the received responses approve the proposed transaction, wherein the predetermined amount of time is dynamically determined at a time of receiving the proposed transaction, wherein the predetermined amount of time is based on a security level of the proposed transaction, and wherein the security level of the proposed transaction is set to a highest security level associated with the plurality of devices.

2. The method of claim 1, wherein the subset of the plurality of devices includes at least one of a mobile device, a desktop computer or a tablet computer.

3. The method of claim 1, wherein the predetermined amount of time is dynamically determined based on a value of the proposed transaction.

4. The method of claim 1, further comprising:
causing a cancelation of the proposed transaction if a response is not received from at least one of the devices identified in the list.

5. The method of claim 1, further comprising:
causing a cancelation of the proposed transaction if at least one of the received responses indicates that the respective person of the subset of the plurality of devices that transmitted the response disapproved the proposed transaction.

6. The method of claim 1, wherein the plurality of devices identified in the list includes at least one device associated with the user.

7. The method of claim 1, wherein the plurality of devices identified in the list includes at least one device associated with a second user.

8. The method of claim 1, wherein the proposed transaction is an address change transaction.

9. The method of claim 1, wherein an authorized transaction value limit of the proposed transaction is based on at least one of password unlocking access, a secure work location or a mobility associated with at least one of the plurality of devices.

10. The method of claim 1, wherein the dynamic determination of the predetermined amount of time at the time of receiving the proposed transaction uses a selection of one of a number of predetermined amounts of time, the selection being based on an attribute of the proposed transaction.

11. An identity protection system for authorizing a transaction, comprising:
one or more processors configured to:
receive a proposed transaction involving a user;
access a list of devices associated with the user, the list identifying a plurality of devices that have been preselected by the user, wherein the plurality of devices includes a new device, the new device having been approved by two pre-existing devices in the plurality of devices or approved in advance by a preset time interval by one pre-existing device in the plurality of devices;
cause presentation of (1) the proposed transaction and (2) an option to approve or disapprove the proposed transaction to each respective person using each of the plurality of devices, wherein responses to the presented option, if provided, are transmitted to the identity protection system by the plurality of devices;
receive the responses from at least a subset of the plurality of devices; and
cause completion of the proposed transaction after a predetermined amount of time if all of the received responses approve the proposed transaction,
wherein the predetermined amount of time is dynamically determined at a time of receiving the proposed transaction,
wherein the predetermined amount of time is based on a security level of the proposed transaction, and
wherein the security level of the proposed transaction is set to a highest security level associated with the plurality of devices.

12. The identity protection system of claim 11, wherein the subset of the plurality of devices includes at least one of a mobile device, a desktop computer or a tablet computer.

13. The identity protection system of claim 11, wherein the predetermined amount of time is dynamically determined based on a value of the proposed transaction.

14. The identity protection system of claim 11, wherein the one or more processors are further configured to cause a cancelation of the proposed transaction if a response is not received from at least one of the devices identified in the list.

15. The identity protection system of claim 11, wherein the one or more processors are further configured to cause a cancelation of the proposed transaction if at least one of the received responses indicates that the respective person of the subset of the plurality of devices that transmitted the response disapproved the proposed transaction.

16. The identity protection system of claim 11, wherein the plurality of devices identified in the list includes at least one device associated with the user.

17. The identity protection system of claim 11, wherein the plurality of devices identified in the list includes at least one device associated with a second user.

18. The identity protection system of claim 11, wherein the proposed transaction is an address change transaction.

19. The identity protection system of claim 11, wherein an authorized transaction value limit of the proposed transaction is based on at least one of password unlocking access, a secure work location or a mobility associated with at least one of the plurality of devices.

20. The identity protection system of claim 11, wherein the dynamic determination of the predetermined amount of time at the time of receiving the proposed transaction uses a selection of one of a number of predetermined amounts of time, the selection being based on an attribute of the proposed transaction.

* * * * *